United States Patent [19]
Saito et al.

[11] Patent Number: 5,796,240
[45] Date of Patent: Aug. 18, 1998

[54] POWER UNIT AND ELECTRONIC APPARATUS EQUIPPED WITH POWER UNIT

[75] Inventors: Yutaka Saito; Masataka Shinogi; Kenji Kato, all of Chiba, Japan

[73] Assignee: Seiko Instruments Inc., Japan

[21] Appl. No.: 605,735

[22] Filed: Feb. 22, 1996

[30] Foreign Application Priority Data

| Feb. 22, 1995 | [JP] | Japan | 7-034121 |
| Aug. 17, 1995 | [JP] | Japan | 7-209820 |
| Oct. 4, 1995 | [JP] | Japan | 7-257765 |
| Oct. 27, 1995 | [JP] | Japan | 7-280638 |

[51] Int. Cl.$^6$ .................................................. H02P 9/04
[52] U.S. Cl. ......................... 322/10; 322/29; 322/99; 290/44
[58] Field of Search ..................... 322/99, 29, 10; 290/44; 320/5

[56] References Cited

U.S. PATENT DOCUMENTS

| 3,675,113 | 7/1972 | Bader et al. | 322/28 |
| 3,937,001 | 2/1976 | Berney | 58/23 D |
| 4,703,189 | 10/1987 | DiValentin et al. | 290/44 |
| 4,731,545 | 3/1988 | Lerner et al. | 290/54 |
| 4,799,003 | 1/1989 | Tu et al. | 322/29 |
| 5,029,288 | 7/1991 | Kubota et al. | 322/29 |
| 5,563,497 | 10/1996 | Iwatani et al. | 322/99 |
| 5,621,300 | 4/1997 | Sato et al. | 320/5 |

FOREIGN PATENT DOCUMENTS

| 1344633 | 10/1963 | France . |
| 2355178 | 1/1978 | France . |
| 4333767 | 4/1994 | Germany . |

OTHER PUBLICATIONS

Patent Abstracts of Japan, vol. 002, No. 51 (E-78) (1003) Apr. 12, 1978.

Primary Examiner—Steven L. Stephan
Assistant Examiner—Nicholas Ponomarenko
Attorney, Agent, or Firm—Adams & Wilks

[57] ABSTRACT

A power unit comprises an input mechanism for inputting kinetic energy as a rotary motion, a storing mechanism connected to the input mechanism for storing the kinetic energy as rotary motion, a first speed-regulating mechanism connected to the storing mechanism for increasing the speed of the rotary motion released from the storing mechanism, and a second speed-regulating mechanism connected to the first speed-regulating mechanism for braking the rotary motion to regulate the speed of the rotary motion. A converting mechanism is connected to the first speed-regulating mechanism for converting the rotary motion whose speed has been increased into electricity. A control circuit is connected to the converting mechanism for controlling the generated electricity, and a positive electrode output terminal and a ground electrode terminal are connected to the control circuit.

103 Claims, 70 Drawing Sheets

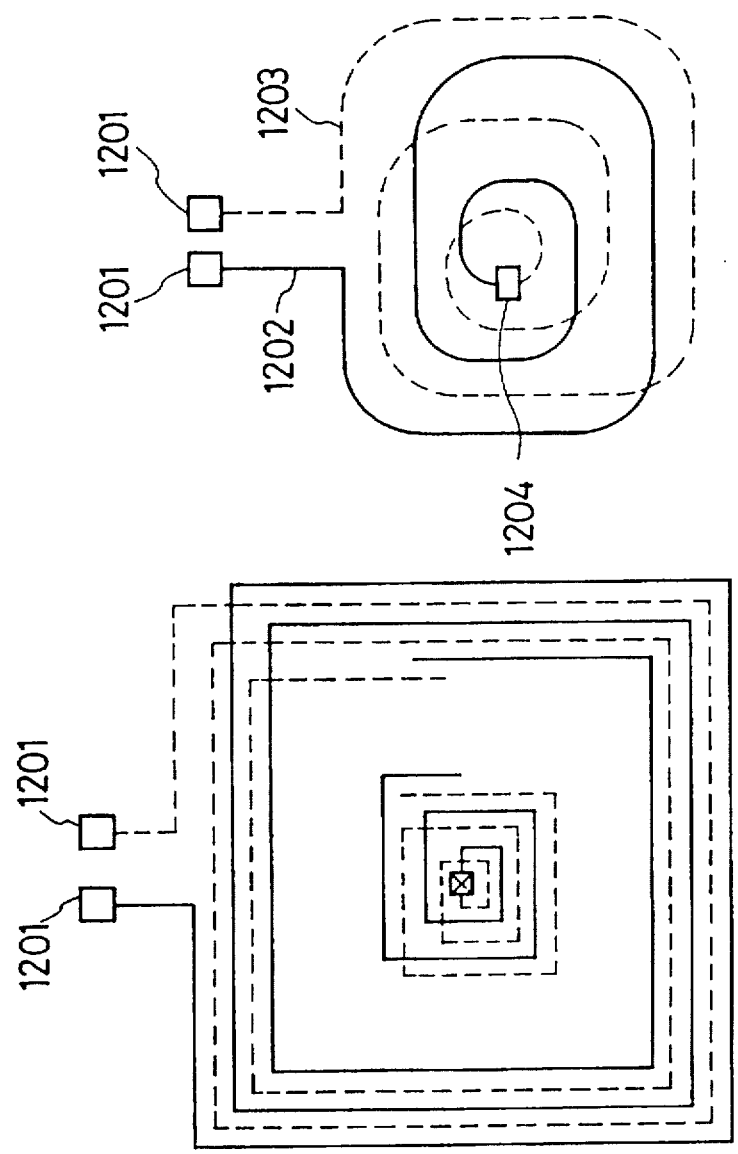

F I G. 1 6 A
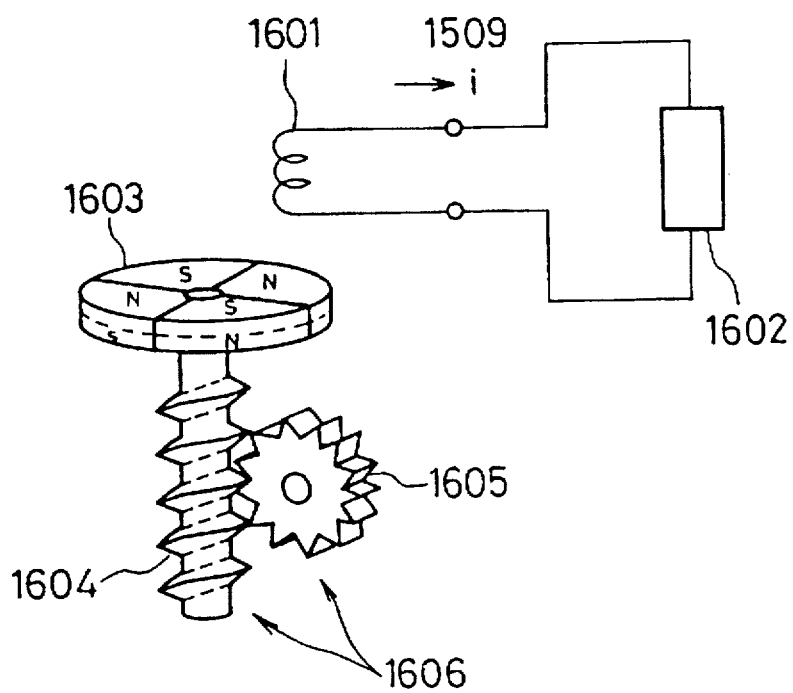
F I G. 1 6 B
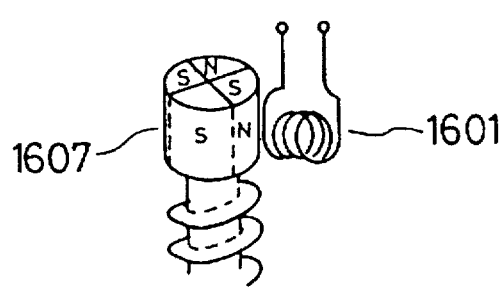
F I G. 1 6 C
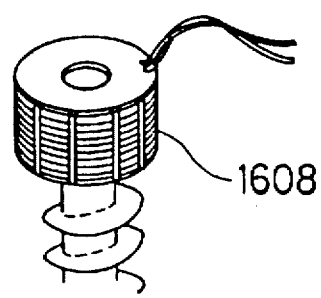

FIG. 60A
FIG. 60B
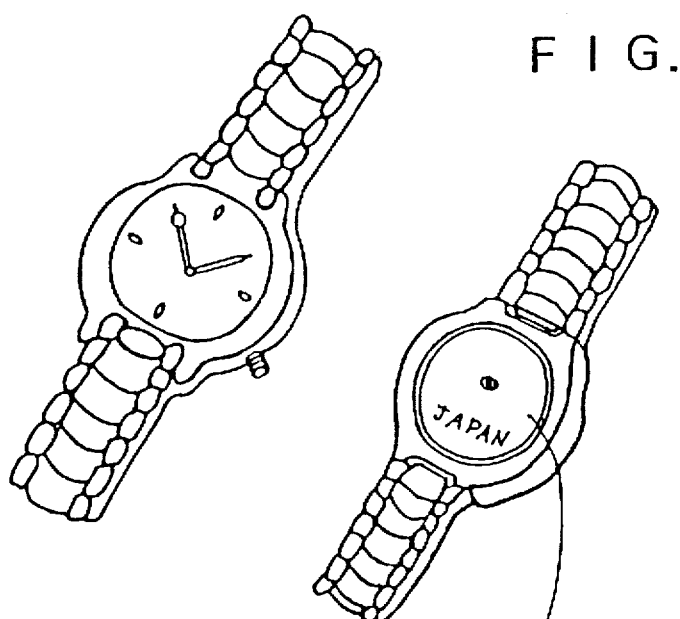
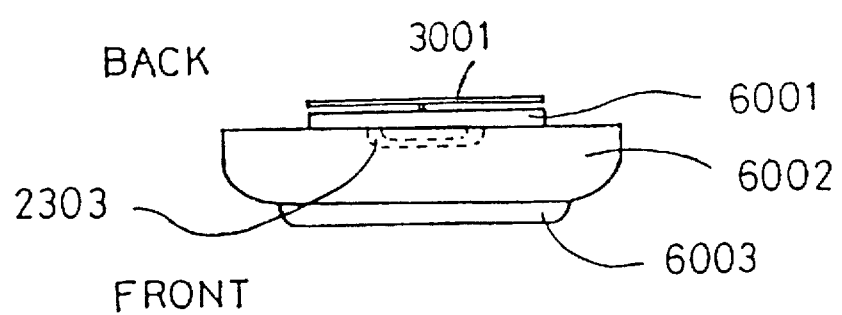
FIG. 60C 5,796,240

POWER UNIT AND ELECTRONIC APPARATUS EQUIPPED WITH POWER UNIT

BACKGROUND OF THE INVENTION

The present invention relates to a structure of a power source section of an electronic equipment or apparatus and a structure thereof as an independent power unit.

Hitherto, dry cells typified by a manganese dry cell and an alkali dry cell are known to be generally used as a power unit and a coil type lithium cell is used for a small equipment in particular.

A generator is a very large equipment and it has been impossible to install in a portable equipment. Even if it is downsized, it is difficult to utilize it because it will generate only a small amount of energy which will be used up very soon.

Accordingly, cells are often used as a power unit of a portable equipment. However, the prior art cell has a problem that its electricity is discharged when it is used. FIG. 80 shows discharge characteristics of a manganese dry cell and an alkali dry cell when they are discharged continuously at 10Ω. A solid line represents the discharge characteristics of the manganese dry cell and a broken line represents that of the alkali dry cell. As shown in the figure, a life of the manganese dry cell is about 8 hours and that of the alkali dry cell is about 20 hours. Due to that, there arises a problem of disposal after their use. It is posing a very large social problem because the problem of disposal of waste has been highlighted in these days. On the other hand, a rechargeable battery also has a problem that its charging function deteriorates.

The cell has another problem that when its energy is used up, it causes a trouble when using the equipment in emergency situations for example. It also causes a problem when using such equipment in countries where there is no such cell. Accordingly, there has been a demand for means which allows such equipment to be operated without a cell.

Further, with the demand for portable equipments today, there has been a deep-rooted desire of always charging full to avoid any risk and it has been necessary to meet with such demand.

Accordingly, it is an object of the present invention to solve the aforementioned problems by providing a power unit which the features that:

1) it allows such equipment to be used even if its cell is used up by charging it in a short time;

2) it allows the cell to be charged without a charger;

3) it enhances safety;

4) it causes no problem of disposal;

5) it allows the cost of the equipment to be lowered and the waste thereof to be avoided because the cell is a throw-away cell; and 6) it can meet with the desire of always charging full to avoid any risk.

SUMMARY OF THE INVENTION

In order to solve the aforementioned problems, the present invention adopts the following means:

[1] In a power unit comprising a mechanism (input mechanism) for inputting kinetic energy as a rotary motion; a mechanism (speed-increasing mechanism), in succession to the input mechanism, for increasing a speed of the rotation; a mechanism (generator), in succession to the speed-increasing mechanism, for converting the rotation whose speed has been increased into electricity; a circuit (control circuit), in succession to the generator, for controlling the generated electricity; a battery (secondary cell) repeatedly chargeable and dischargeable, in succession to the control circuit; and a positive electrode output terminal (Vdd terminal) and a ground electrode terminal (GND terminal) in succession to the control circuit: a speed increasing factor in the speed-increasing mechanism is set at a value from 50 to 100 times of the input rotation; the electricity generated by the generator is a direct current; the control circuit has a rectifier element (series rectifier element) whose anode terminal is connected with an output of the generator and whose cathode terminal is connected with the Vdd terminal in series between the generator and the Vdd output terminal and a rectifier element (parallel rectifier element) whose cathode terminal is connected between the generator and the series rectifier element and whose anode terminal is connected to the GND terminal; and the positive electrode of the secondary cell is connected with the cathode terminal of the series rectifier element and the negative electrode of the secondary cell is connected with the GND terminal.

[2] In the means, a reverse withstand voltage of the parallel rectifier element is 1.8±0.15 V.

[3] In the means 1 and 2, at least one of the series rectifier element and the parallel element is composed of a MOS transistor.

[4] In the means, the series rectifier element has a constant-voltage outputting mechanism comprising a reference voltage section, an error amplifying circuit, an output voltage feedback resistor, a MOS transistor in which a transistor substrate (Sub) is floating and a GND terminal.

[5] In a power unit comprising a mechanism (input mechanism) for inputting kinetic energy as a rotary motion; a mechanism (storing mechanism), in succession to the input mechanism, for storing the kinetic energy; a mechanism (speed-increasing mechanism), in succession to the storing mechanism, for increasing a speed of the rotation released out of the storing mechanism; a mechanism (speed-regulating mechanism), succession to the speed-increasing mechanism, for braking the rotation to regulate a speed of the rotation; a mechanism (generator), in succession to the speed-increasing mechanism, for converting the rotation whose speed has been increased into electricity; a circuit (control circuit), in succession to the generator, for controlling the generated electricity; and a positive electrode output terminal (Vdd terminal) and a ground electrode terminal (GND terminal) in succession to the control circuit: the generator is constructed so as to generate the electricity by having field magnetons, magnetized into a plurality of poles, which rotate and move on the both sides of an armature comprising wired layer coil elements formed on a semiconductor substrate via an insulating film.

[6] In the means 5, the control circuit has a function of electrically controlling the speed-regulating mechanism corresponding to a voltage of the output Vdd terminal.

[7] In the means 5, it further comprises a battery (secondary cell) repeatedly chargeable/dischargeable in succession to the control circuit.

[8] In a power unit comprising a mechanism (input mechanism) for inputting kinetic energy as a rotary motion; a mechanism (storing mechanism), in succession to the input mechanism, for storing the kinetic energy; a mechanism (speed-increasing mechanism), in succession to the storing mechanism, for increasing a speed of the rotation released out of the storing mechanism; a mechanism (speed-changing mechanism). in succession to the speed-increasing mechanism, for changing a speed multiplying factor; a mechanism (generator). in succession to the speed-increasing mechanism, for converting the rotation whose speed has been changed into electricity; a circuit (control circuit). in succession to the generator, for controlling the generated electricity; and a positive electrode output terminal (Vdd terminal) and a ground electrode terminal (GND terminal) in succession to the control circuit; the control circuit is constructed so as to have a function of electrically controlling the speed-changing mechanism corresponding to a voltage of the output Vdd terminal.

|9| In the means a. it further comprises a battery (secondary cell) repeatedly chargeable/dischargeable in succession to the control circuit.

|10| In a power unit comprising a mechanism (input mechanism) for inputting kinetic energy as a rotary motion; a mechanism (storing mechanism). in succession to the input mechanism, for storing the kinetic energy; a mechanism (speed-increasing mechanism). in succession to the storing mechanism, for increasing a speed of the rotation released out of the storing mechanism; a mechanism (speed-changing mechanism). in succession to the speed-increasing mechanism, for changing a speed multiplying factor; a mechanism (generator). in succession to the speed-increasing mechanism, for converting the rotation whose speed has been changed into electricity; a circuit (control circuit). in succession to the generator, for controlling the generated electricity; and a positive electrode output terminal (Vdd terminal) and a ground electrode terminal (GND terminal) in succession to the control circuit; the generator is constructed so as to generate the electricity by having field magnetons which are magnetized (excited) when a current (field current) is flown and an armature comprising at least three coils connected in Y connection and by rotating and moving the field magnetons as against the armature; and the control circuit is constructed so as to have a function of controlling the field current corresponding to a voltage of the output terminal Vdd.

[11] In the means 10. it further comprises a battery (secondary cell) repeatedly chargeable/dischargeable in succession to the control circuit.

[12] In the means 10 or 11. the generator has a function of controlling the speed-changing mechanism corresponding to the field current.

[13] In the means 10 or 11. the control circuit has a function of electrically controlling the speed-changing mechanism corresponding to a voltage of the output Vdd terminal.

[14] In a power unit comprising a mechanism (input mechanism) for inputting kinetic energy as a rotary motion; a mechanism (storing mechanism). in succession to the input mechanism, for storing the kinetic energy; a mechanism (speed-increasing mechanism). in succession to the storing mechanism, for increasing a speed of the rotation released out of the storing mechanism; a mechanism (speed-regulating mechanism). in succession to the speed-increasing mechanism, for braking the rotation to regulate a speed of the rotation; a mechanism (generator). in succession to the speed-increasing mechanism, for converting the rotation whose speed has been changed into electricity; a circuit (control circuit). in succession to the generator, for controlling the generated electricity; and a positive electrode output terminal (Vdd terminal) and a ground electrode terminal (GND terminal) in succession to the control circuit; the generator is constructed so as to generate the electricity by having field magnetons which are magnetized (excited) when a current (field current) is flown and an armature comprising at least three coils connected in Y connection and by rotating and moving the field magnetons as against the armature; and the control circuit is constructed so as to have a function of controlling the field current corresponding to a voltage of the output terminal Vdd.

|15| In the means 14. it further comprises a battery (secondary cell) repeatedly chargeable/dischargeable in succession to the control circuit.

|16| In the means 14 or 15. the generator has a function of controlling the speed-regulating mechanism corresponding to the field current.

|17| In the means 14 or 15. the control circuit has a function of electrically controlling the speed-regulating mechanism corresponding to a voltage of the output Vdd terminal.

|18| In the means 5 through 17. it comprises an antenna; a radio receiving circuit; hand type time indicating mechanism; a mechanism for detecting positions of the hands; and a mechanism for correcting the positions of the hands corresponding to a time signal from the radio after when an electrical output is output from the Vdd output terminal.

|19| In the means 7, 9, 11 or 15. it further comprises a light receiving section or a radio receiving section and a device (light/radio-to-electricity transducer) for transducing light or radio into an electricity; and the control circuit has a function of controlling the light/radio-to-electricity transducer and a function of charging the transduced electricity to the secondary cell.

[20] In the means 10 through 17. the control circuit has a device for rectifying the generated electricity and a rectifying element which composes the rectifier device is a MOS transistor.

[21] In the means 10 through 17. the field current control is pulse width modulation.

[22] In the means 10 through 17. the field current control is frequency modulation.

[23] In the means 12 and 16. the plane where the field magneton faces to the armature has an angle from 15° to 45°.

|24| In the means 12 and 16. wherein the speed-changing mechanism or the speed-regulating mechanism has a hysteresis in the speed increasing/decreasing operation.

|25| In the means 5 through 17. the field magneton has an inertia wheel (flywheel) which turns coaxially with the rotor shaft.

[26] In the means 7, 9, 11, 15 and 19. the control circuit has a switching function for outputting power output from the secondary cell to the Vdd output terminal corresponding to a voltage of the Vdd output terminal.

[27] In the means 7, 9, 11, 15 and 19. the control circuit controls the speed-changing mechanism or the speed-regulating mechanism by having a hysteresis in increasing/decreasing the speed and controls the hysteresis to be varied corresponding to a voltage of the secondary cell.

[28] In a power unit comprising a mechanism (input mechanism) for inputting kinetic energy as a rotary motion; a mechanism (speed-increasing mechanism). in succession to the input mechanism, for increasing a speed of the rotation; a mechanism (generator). in succession to the speed-increasing mechanism, for converting the rotation whose speed has been increased/decreased into electricity; a circuit (control circuit). in succession to the generator, for controlling the generated electricity; and a positive electrode output terminal (Vdd terminal) and a ground electrode terminal (GND terminal) in succession to the control circuit; the generator is constructed so as to generate the electricity by having an electrode (charged electrode) for applying charges, an electrode (take-out electrode) for taking out the charge and a dielectric rotor between the charged electrode and the take-out electrode and by rotating the rotor with the rotation whose speed has been increased.

[29] In a power unit comprising a water storing mechanism (dam) as means for storing potential energy; a mechanism (water amount regulating mechanism) for regulating an amount of water to be discharged from the dam; a mechanism (water turbine) for converting the flow of the discharged water into a rotary motion; a mechanism (generator), in succession to the water turbine, for converting the rotation into electricity; a control circuit, in succession to the generator, for controlling the generated electricity; a circuit (DC/AC inverter), in succession to the control circuit, for converting the generated electricity into an AC current having a constant frequency; and at least two poles of AC output terminals in succession to the DC/AC inverter; the generator is constructed so as to generate the electricity by having field magnetons which are magnetized (excited) when a current (field current) is flown and an armature comprising at least three coils connected in Y connection and by rotating and moving the field magnetons as against the armature; the control circuit has a function of controlling the field current corresponding to a voltage of the AC output terminal; and the power unit has at least either one of a function of electrically controlling the water amount regulating mechanism corresponding to the voltage of the AC output terminal by the control circuit or of controlling the water amount regulating mechanism corresponding to the field current by the generator.

[30] In a power unit comprising a mechanism (input mechanism) for inputting kinetic energy as a rotary motion; a mechanism (speed-increasing mechanism), in succession to the input mechanism, for increasing a speed of the rotation; a mechanism (speed-changing mechanism), in succession to the speed-increasing mechanism, for changing a speed multiplying factor; a mechanism (generator), in succession to the speed-increasing mechanism, for converting the rotation whose speed has been changed into electricity; a circuit (control circuit), in succession to the generator, for controlling the generated electricity; a circuit (DC/AC inverter), in succession to the control circuit, for converting the generated electricity into AC current having a constant frequency; a battery (secondary cell) repeatedly chargeable and dischargeable, in succession to the control circuit; and at least two poles of AC output terminals in succession to the DC/AC inverter; the generator is constructed so as to generate the electricity by having field magnetons which are magnetized (excited) when a current (field current) is flown and an armature comprising at least three coils connected in Y connection and by rotating and moving the field magnetons as against the armature; and the power unit has at least either one of a function of electrically controlling the speed-changing mechanism corresponding to the voltage of the AC output terminal by the control circuit or of controlling the speed-changing mechanism corresponding to the field current by the generator.

[31] In the means 1 through 27, an electrical load is provided at the Vdd output terminal to compose an electronic equipment.

[32] In the means 1 through 27, an electronic equipment having an electrical load at the Vdd output terminal and having also a time indicating function is constructed.

[33] In the means 32, an input section has a mechanism for inputting kinetic energy by rotating a peripheral portion of the time indicating section.

[34] In the means 1, 4, 7, 9, 11 and 15, it is connected to a circuit (system reset circuit) having an electrical load at the Vdd output terminal; and a first rectifier element in series with the generator and the electrical load; and an anode terminal of the rectifier element is output from Vgen output terminal simultaneously and monitors a power voltage via a second rectifier element (entering to an anode terminal and going out of a cathode terminal) to stop the electronic equipment when the voltage becomes lower than a predetermined voltage (reset voltage); and has a function of changing a set value of a reset voltage corresponding to a voltage of a Vgen output terminal.

[35] In the means 5, 6, 10, 12, 13 or 14, it is connected to a circuit (system reset circuit) having a cell included in a control circuit so as to be removable; an electrical load at the Vdd output terminal; and a first rectifier element in series with the generator and the electrical load; and an anode terminal of the rectifier element is output from Vgen output terminal simultaneously and monitors a power voltage via a second rectifier element (entering to an anode terminal and going out of a cathode terminal) to stop the electronic equipment when the voltage becomes lower than a predetermined voltage (reset voltage); and has a function of changing a set value of a reset voltage corresponding to a voltage of a Vgen output terminal.

[36] In the means 5 through 28, the storing mechanism is what uses a spiral spring.

BRIEF DESCRIPTION OF THE DRAWINGS

FIGS. 12a and 12b are plan views showing a chip coil 1104 of a type wound by a first method of the generator in Part 1 of the second embodiment of the present invention;

FIGS. 16a, 16b and 16c are stereographic views showing a speed-regulating mechanism in Part 2 of the second embodiment of the present invention;

FIGS. 60a through 60c are sketch drawings showing a state wherein the inventive power unit is applied to an electronic watch;

DETAILED DESCRIPTION OF THE PREFERRED EMBODIMENT

Preferred embodiments of the present invention will be explained below based on the drawings.

Figure 1:
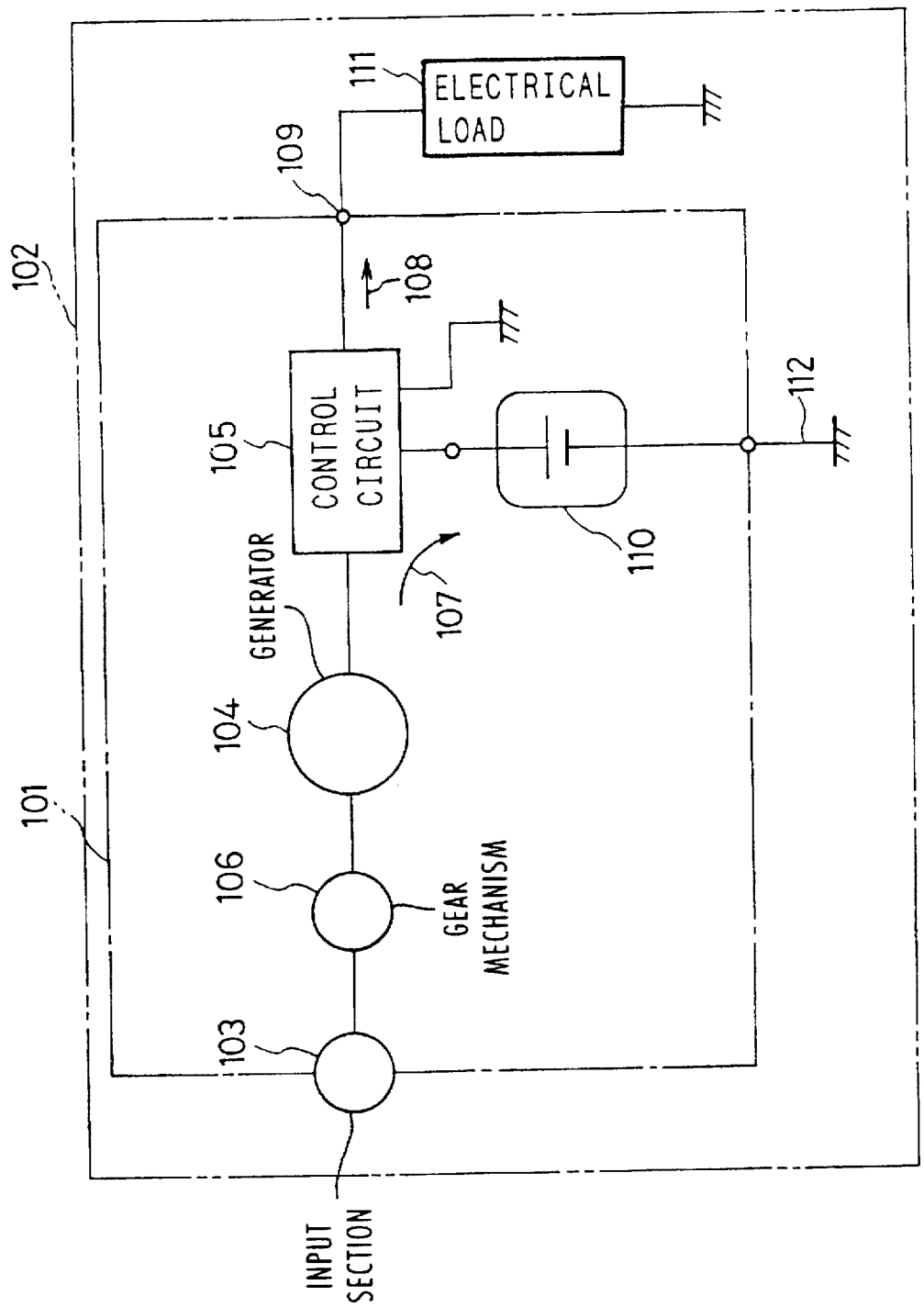
FIG. 1 is a system block diagram showing a power unit 101 and an electronic equipment 102 comprising the same according to Part 1 of a first embodiment of the present invention.

FIG. 1 is a system block diagram showing a power unit 101 and an electronic equipment 102 comprising the same according to Part 1 of a first embodiment of the present invention. The power unit 101 comprises an input means section (hereinafter referred to as an "input section") 103 for inputting kinetic energy and force and converting it into a rotary motion, a gear train (gear) mechanism 106, in succession thereto, as means for increasing a speed of the inputted rotation, a generator 104, in succession thereto, as means for converting the rotary motion energy into electricity, an electrical control circuit 105, in succession thereto, as means for stabilizing voltage and current of the generated electricity, a secondary cell (a battery repeatedly chargeable/dischargeable such as a nickel-hydrogen (Ni-MH) type cell, a nickel-cadmium (Ni-Cd) type cell or a lithium ion (Li ion) type cell using $LiCoO_2$) 110, in succession thereto, as means for charging/discharging electricity, a Vout output terminal 109 called Vdd or Vcc in succession to the control circuit, and a ground output terminal 112 called GND or Vss in succession to the control circuit and the secondary cell. The power unit 101 is connected to an electrical load 111 via the output terminal 109 and composes the electronic equipment 102. The reference numeral (108) denotes a load current Iout which flows from the Vout 109 to the electrical load 111, and (107) denotes a charging current $I_{CHG}$ which flows to the secondary cell 110.

Figure 2:
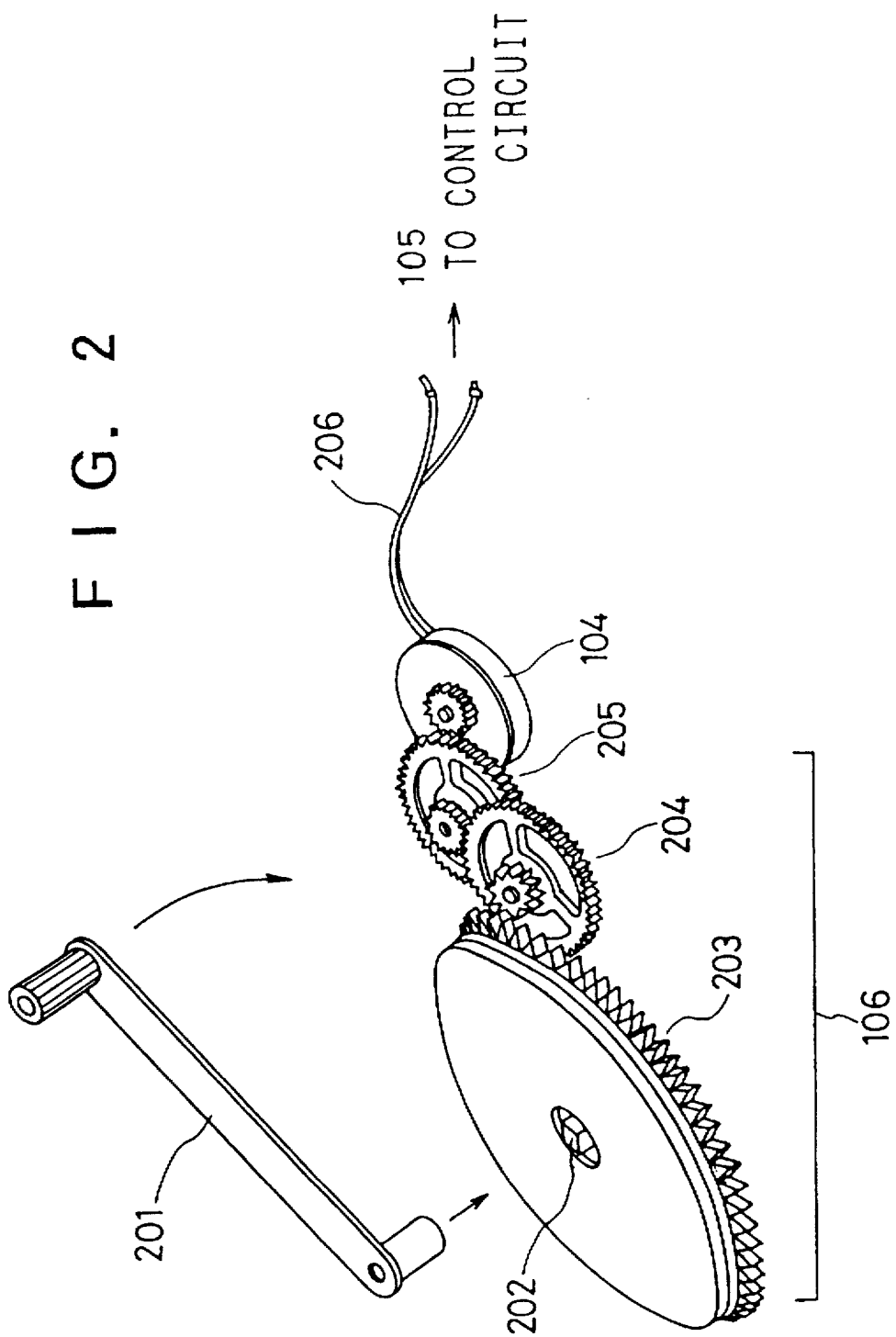
FIG. 2 is a stereographic view showing a structure of the power unit in Part 1 of the first embodiment of the present invention.

FIG. 2 is a stereographic view showing a structure of the power unit in Part 1 of the first embodiment of the present invention. A lever 201 (which may be a type of pulling a wound string or a grip lever instead of such rotary lever) and a connector portion for connecting it with a first gear train as means for inputting kinetic energy and converting it into a rotary motion constitute the input section described above and a first gear 203, a second gear 204 and a third gear 205 constitute the gear train and speed-increasing mechanism 106. It is then connected mechanically to the generator 104 which is connected electrically with the control circuit 105 through a generator output cable 206. Here, a number of revolutions of a rotor (described later) of the generator which rotates when the first gear rotates once will be called a speed multiplying factor. Although not shown, it is possible to provide a fourth or fifth gear depending on a required speed multiplying factor. It is also possible to provide a plurality of generators as necessary. Further, although the secondary cell 110 is shown as if it is included in the power unit in FIG. 1, it is possible to arrange so that it can be removed as necessary (to charge externally or to replace when it deteriorates).

Figure 3:
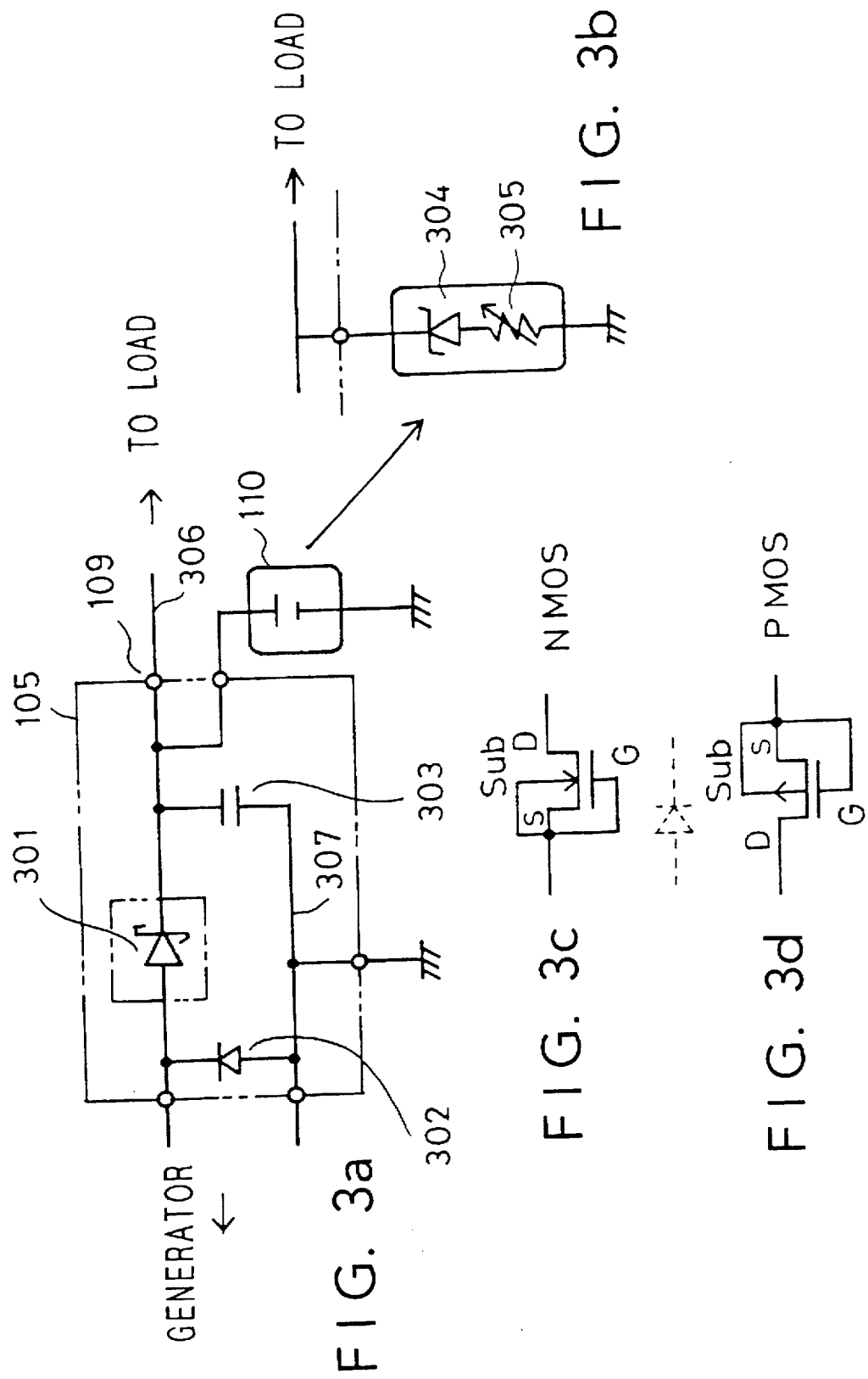
FIG. 3 is a circuit diagram showing the control circuit 105 in Part 1 of the first embodiment of the present invention.

FIGS. 3c and 3d are circuit diagrams showing the control circuit 105 in Part 1 of the first embodiment of the present invention. It comprises a Schottky diode 301 as means for preventing a reverse current (which flows reversely from the secondary cell to a rotor coil when the generator stops to generate power) in series within a Vdd line 306 and a diode 302 as means (flywheel diode) for releasing a reverse electromotive force (a potential having a reverse polarity which is generated from the coil when the rotor of the generator stops). A smoothing capacitor 303 stabilizes the voltage further, though it may be omitted.

FIG. 3b is an equivalent circuit for explaining a function of the secondary cell 110 in the present embodiment. The secondary cell has a function composed of a Zener function (voltage stabilizing function) 304 and a resistance function (internal resistance) 305 which varies depending on a charged energy. In the case of the present embodiment, it utilizes the Zener function as it is to stabilize the generated voltage and to supply it to the load. In such a case, it is preferable to use a nickel-hydrogen (Ni-MH) type cell as the secondary cell, because the Ni-Cd type cell has a larger voltage difference between charge and discharge than that of the Ni-MH cell and the Li ion type cell leads to a destruction of the cell unless charging/discharging current is fully controlled.

Figure 79:
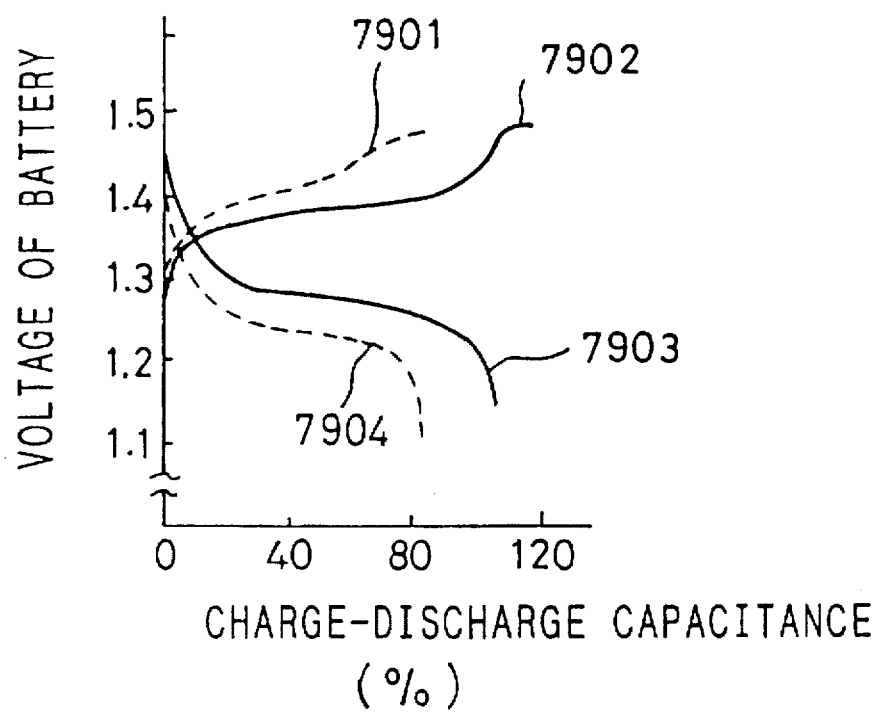
FIG. 79 is a graph showing discharge characteristics of a Ni-Cd type secondary cell and a Ni-MH type secondary cell.
Figure 80:
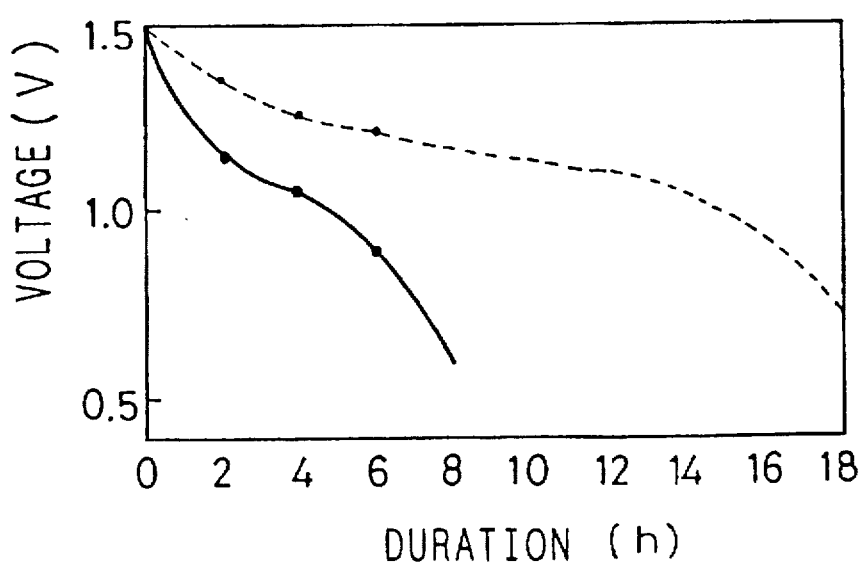
FIG. 80 shows discharge characteristics of a manganese dry cell and an alkali dry cell when they are discharged continuously at 10 Ω.

FIG. 79 is a graph showing discharge characteristics of the Ni-Cd type secondary cell and the Ni-MH type secondary cell. A broken line 7901 is a plot when the Ni-Cd is charged, a solid line 7902 is a plot when the Ni-MH is charged, a solid line 7903 is a plot when the Ni-MH is discharged and a broken line 7904 is a plot when the Ni-Cd is discharged. It can be seen that a difference of voltages at the time of charge and discharge of the Ni-MH is smaller than that of the Ni-Cd. Normally, many of electronic equipments in 1.2 V system apply a system reset when a cell voltage becomes 1.2 V or 1.0 V. However, when the inventive power unit is activated, the equipment is activated and the secondary cell is charged during charge (by moving or winding the lever) even after the secondary cell is discharged and the equipment is stopped. In the case of the Ni-Cd, however, the equipment stops its operation when the lever is stopped at a certain degree. It will not continuously operate unless the lever is wound up many more turns. In the case of the Ni-MH in the present embodiment, the equipment is activated by winding the lever just by about 5 turns and continuously operates thereafter in proportion to a degree charged. In that sense, practically, it may be essential to use the Ni-MH in the present embodiment.

However, because an overcharge current causes a deterioration of the cell also in the case of the Ni-MH cell, it is necessary to use 1.8 V (±0.15 V) Zener for the flywheel diode 302. In reality, the 1.8 V. Zener has a problem such that it causes much reverse leak, so that it is preferable to use a MOS transistor connected as shown in FIGS. 3c and 3d. At this time, it is preferable to use those adapted so as to have 1.8 V of transistor withstand voltage (BVDSS) by increasing a drain surface concentration by a gate-drain withstand voltage (BVS, surface breakdown withstand voltage). While the Schottky diode has been used as the reverse current preventing diode in order to suppress a forward voltage drop ($V_F$) as low as possible and $V_F$ of a Si diode is about 0.6 V and that of the Schottky diode is about 0.4 V, the use of the MOS transistor connected as shown in FIGS. 3c and 3d allows even lower $V_F$ to be obtained. $V_{TH}$ (threshold voltage) may be set at 0.3 V or less, though it depends on a current value.

FIG. 3c shows a rectifier element (direction from left to right in the figure is forward direction) of a type in which a source (S), a substrate (Sub) and a gate (G) of a N-channel MOS transistor are connected. (D) denotes a drain.

FIG. 3d shows a rectifier element (direction from left to right in the figure is forward direction) of a type in which a source (S), a substrate (Sub) and a gate (G) of a P-channel MOS transistor are connected. (D) denotes a drain.

Figure 4:
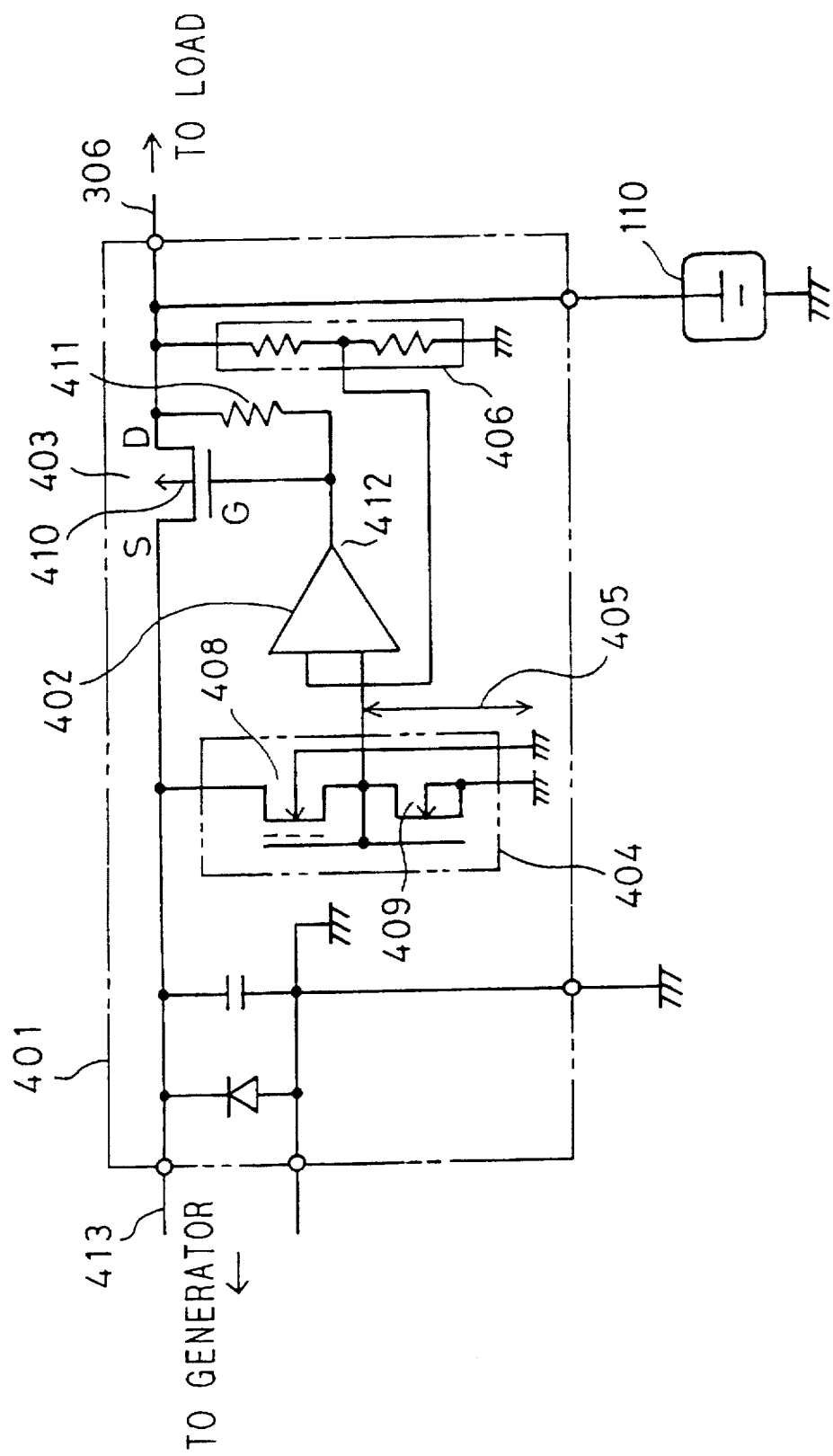
FIG. 4 is a circuit diagram showing a control circuit 401 in Part 2 of the first embodiment of the present invention.

FIG. 4 is a circuit diagram showing a control circuit 401 in Part 2 of the first embodiment of the present invention. It forms a series regulator circuit by having a circuit 404 comprising a depletion type NMOS 408 and an enhancement type NMOS 409, for generating a reference voltage (Vref) 405, an error amplifier 402, a feedback resistor section 406 for dividing and detecting an output voltage, and a P-channel type output transistor 403. While the Ni-MH is essential as the secondary cell 110 still from the reason described before even when the control circuit is arranged as such, the loss ($V_F$ drop) caused by the reverse current preventing function may be reduced further as compared to the case when the Schottky diode or the MOS transistor (FIGS. 3c and 3d) is used and it becomes possible to suppress a voltage difference of input and output of the P-channel MOS transistor 403 to 0.1 V or less.

However, the substrate (Sub, N-Sub, N substrate) 410 of the output P-channel MOS transistor 403 has to be floating (must not be clamped to the source S) at this time. Further, it is necessary to provide a function of reliably turning off the PMOS transistor 403 with a potential of the Vdd line 306 when the generator stops by pulling up an output Vamp 412 of the error amplifier to the Vdd 366 by using a resistor 411 for example. When it is not arranged so that the Vamp 412 of the error amplifier 402 which operates by receiving an output 43 from the generator becomes a high impedance when the Vin 413 becomes less than GND, it is also possible to provide a circuit, operated by the power source of the Vdd line 306, which monitors the Vin 413 and turns off the PMOS 403 when the Vin is off.

Figure 5:
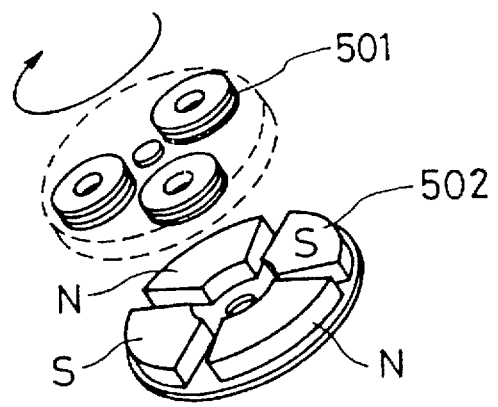
FIG. 5 is a stereographic view showing a generator of the first embodiment of the present invention.

FIG. 5 is a stereographic view showing the generator of the first embodiment of the present invention. It has a (coreless) structure in which four magnets, i.e., field magnetons, 502 (it is preferable to be a samarium-cobalt (Sm-Co) type magnet because a flux density per volume and surface area can be high and thereby its size and weight can be reduced) are disposed so that S and N alternate and three rotor coils 501 rotate facing to the magnets. By constructing as described above, the size and weight can be reduced as compared to a generator mechanism having a core (i.e., the size in the direction of the rotor shaft of the rotor can be reduced and thinned). To make it more clear, FIGS. 6a and 6b are shown.

Figure 6A:
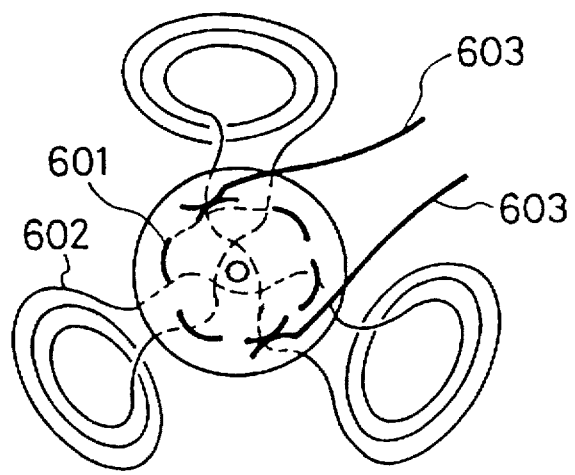
FIGS. 6a and 6b are diagrams showing a relationship among coils 602, output electrode brushes 603 and rotor rotary electrodes (6 electrodes) 601 in a rotor coil of the generator of the first embodiment of the present invention.
Figure 6B:
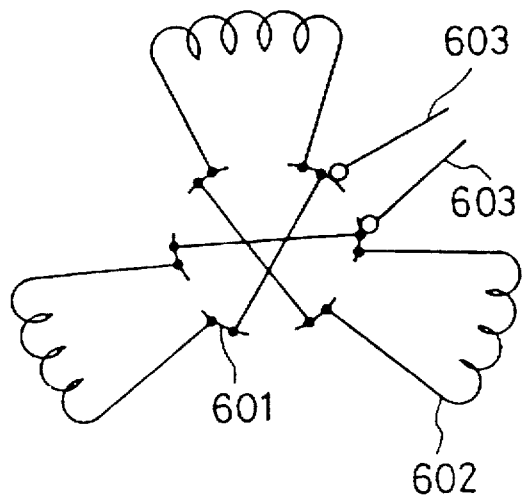

FIGS. 6a and 6b show the relationship among the coils 602, the output electrode brushes 603 and the rotor rotary electrodes (6 electrodes) 601 in the rotor coil of the generator of the first embodiment of the present invention. Such arrangement allows the output electrode brushes 603 to take out electricity as a direct current (DC) always from the all three coils simultaneously.

Figure 7:
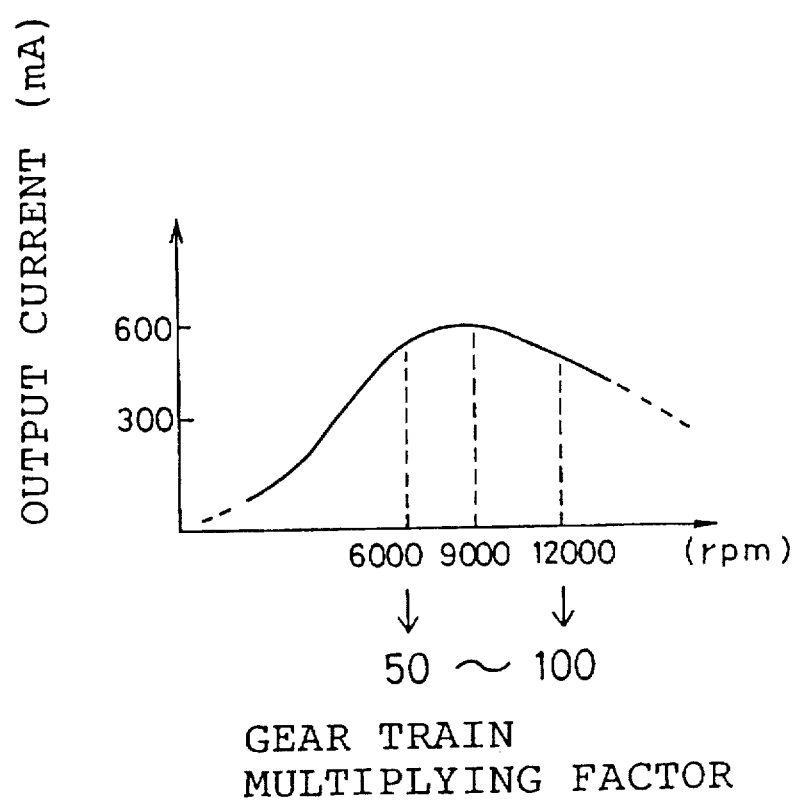
FIG. 7 is a graph showing a relationship between a number of revolutions of the rotor and an output current of the generator of the first embodiment of the present invention.

FIG. 7 is a graph showing a relationship between a number of revolutions of the rotor and an output current of the generator of the first embodiment of the present invention. A connected secondary cell was the Ni-MH one-cell gum type (rated 1.2 V) cell, the magnet of the generator was an Sm-Co type magnet of 3000 to 5000 gauss and, the coil was comprised of a cable of 0.3 mm Φ was wound 15 turns and having a 1 Ω of resistance. The graph shows a number of revolutions of the rotor and the output current obtained by changing the speed multiplying factor by the gear train by turning a manual lever of 5 cm in length for example by about 70 rpm with 3 to 5 kg-cm of torque at this time (these values are quite reasonable from the aspects of bodily sensation and practicality). It can be seen that there is a peak at 9000 rpm and that the output fades out suddenly from around 15000 rpm (the brush cannot follow up). Accordingly, it can be said that a range acceptable in terms of the power generating efficiency is from 6000 to 12000 rpm. Further, it can be said that it is essential to set a practical limit range of the gear train multiplying factor, in conjunction with the reasonability of the bodily sensation described above, from 50 to 100 times.

It is preferable to use plastics for certain part of the mechanical parts such as the gear train so long as the use condition accepts its durability because the weight and mechanical loss may be reduced in the present invention (and in the embodiments which follow).

Figure 8:
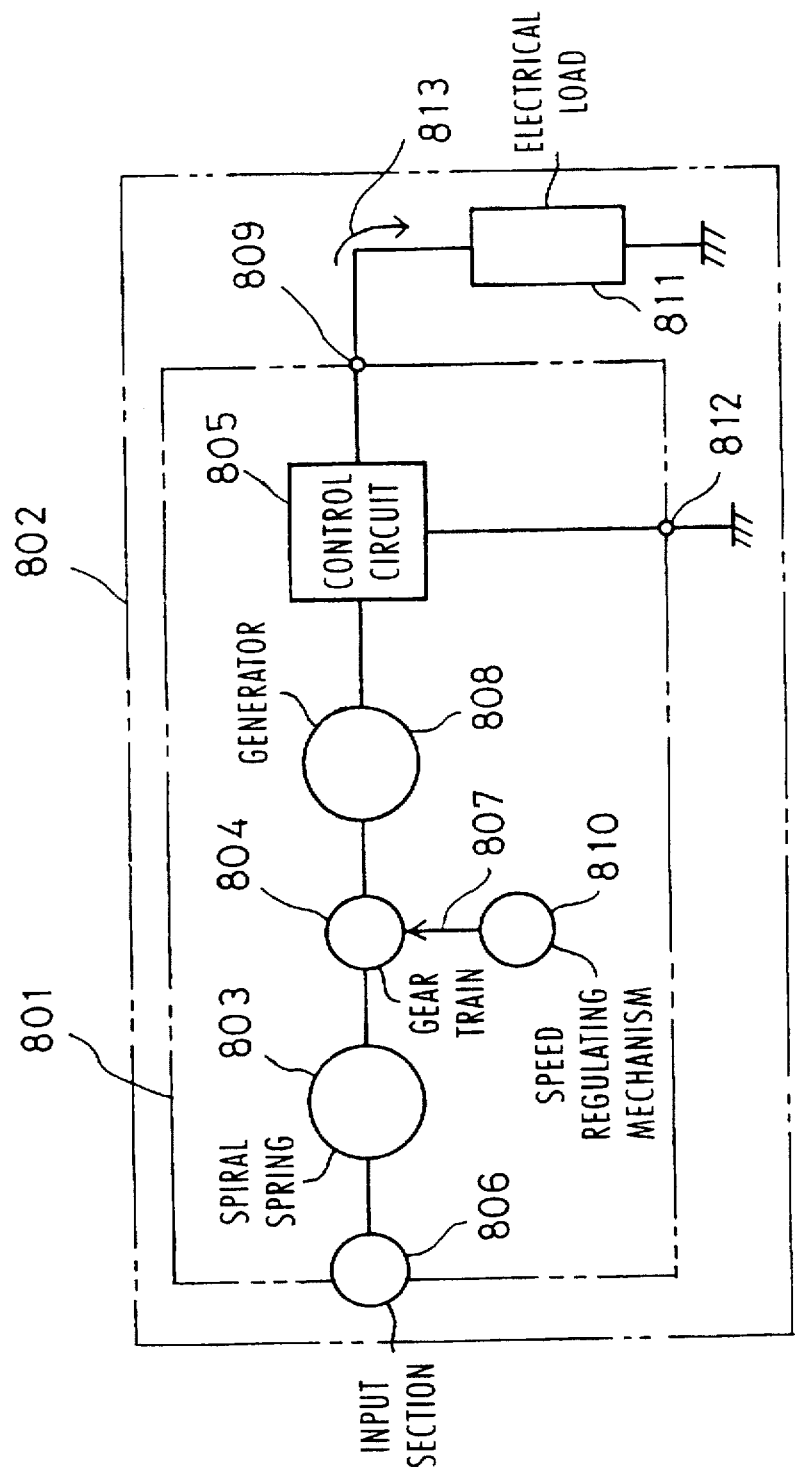
FIG. 8 is a system block diagram showing a power unit 801 and an electronic equipment 802 comprising the same according to Part 1 of a second embodiment of the present invention.

FIG. 8 is a system block diagram showing a power unit 801 and an electronic equipment 802 comprising the same according to Part 1 of a second embodiment of the present invention. The power unit 801 comprises an input section 806, a spiral spring (although it is conceivable to use a mechanical structure such as a coil spring, a plate spring and others or a tank of a compressed gas, this part will be explained as "spiral spring" hereinafter to make it simple) 803 as means for storing input kinetic energy, a gear train mechanism 804, a speed-regulating mechanism 810 as means for stopping the wound spiral spring 803 from being released or regulating (controlling) its speed, a generator 808, a control circuit 805, a $V_{OUT}$ output terminal 809, and a GND terminal. The power unit 901 is connected to an electrical load 811 via the Vout output terminal 809 and composes the electronic equipment 802.

Figure 9:
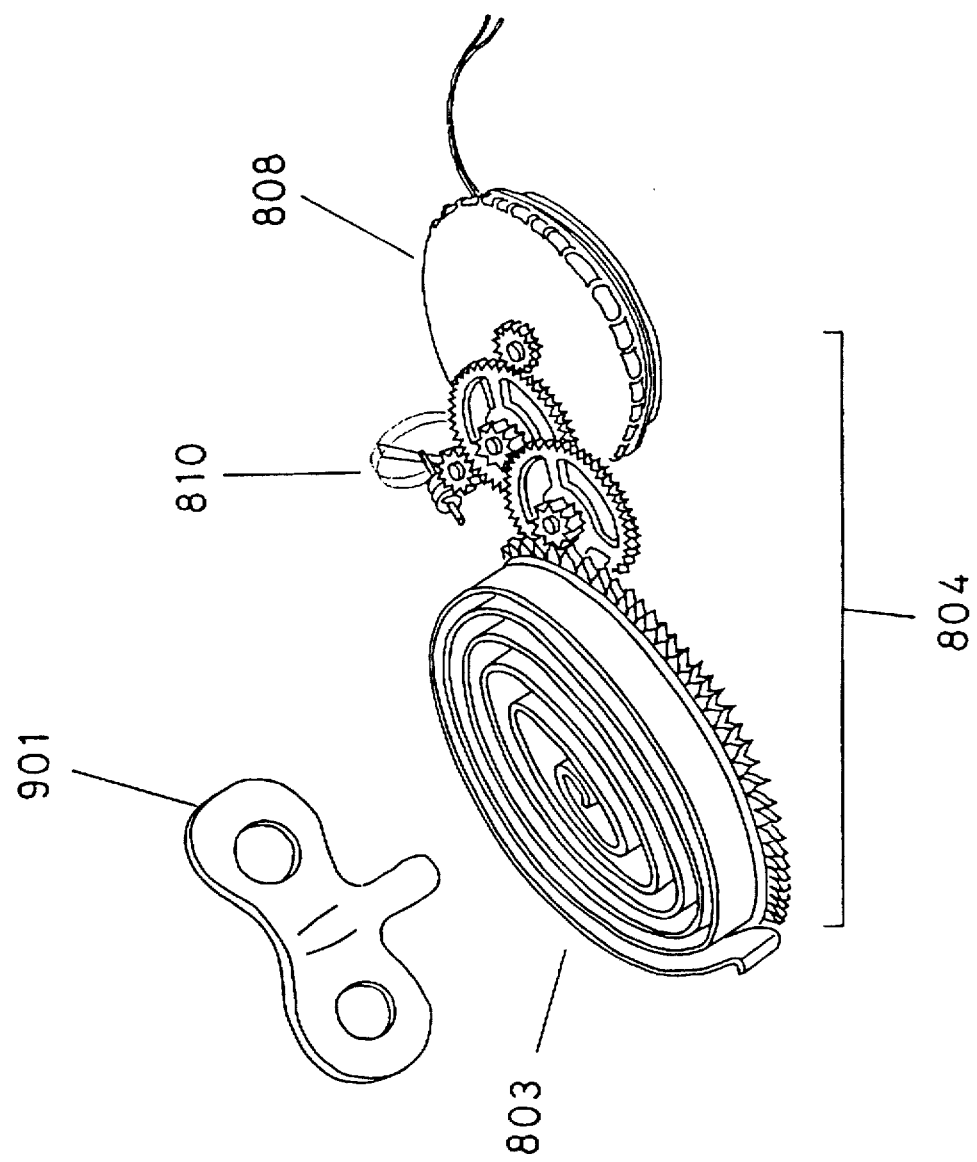
FIG. 9 is a stereographic view showing a structure of the power unit in Part 1 of the second embodiment of the present invention.

FIG. 9 is a stereographic view showing a structure of the power unit in Part 1 of the second embodiment of the present invention. FIG. 9 shows a state wherein a thumbscrew 901 as kinetic energy input means winds up the spiral spring 803 as the input means 806 via a mechanical connector section (not shown because it is identical with that shown with the first embodiment) (to store kinetic energy), the speed-regulating mechanism 810 exists in place of the gear train and speed-increasing mechanism 804, and the generator 803 connected mechanically with the gear train mechanism 804 exists.

Figure 10:
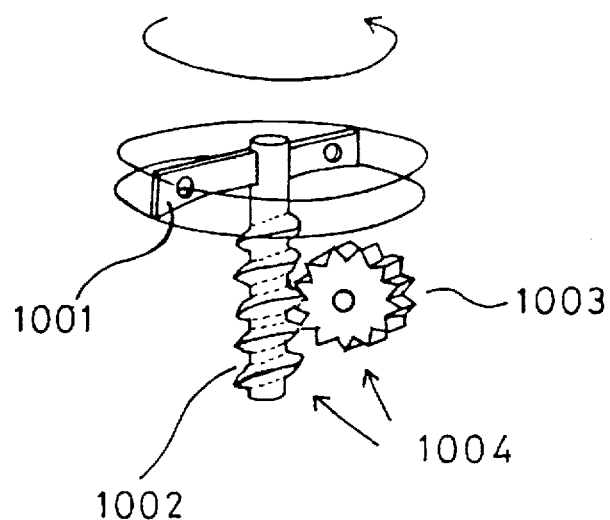
FIG. 10 is a stereographic view showing a speed-regulating mechanism 810 in Part 1 of the second embodiment of the present invention.

FIG. 10 is a stereographic view showing the speed-regulating mechanism 810 in Part 1 of the second embodiment of the present invention. It is constructed so that a pinion gear 1003 connected to the final gear drives a worm gear 1002 (thus structuring a rack-and-pinion drive 1004) to turn a wind mill 1001. The wind mill rotates at a maximum speed (saturation speed) which is decided by a number of revolutions and a torque of the worm gear 1002, a resistance of wind and an area of the wind mill. It rotates at a constant speed which is a releasing speed of the spiral spring. The spiral spring is released slowly when a multiplying factor of the gear train from the spiral spring to the worm gear 1002 is large and is released quickly when it is smaller. It means that the kinetic energy stored in the spiral spring is released as an action of agitating air (generating a wind). However, the essence may be readily understood by explaining it from a case when there is no speed-regulating mechanism. Friction of the rotor of the generator 808 connected to the electrical load 811 via the control circuit 805 increases, i.e., the number of revolutions of the rotor drops, as a load current $I_{OUT}$ 813 increases. In contrast, when the load current $I_{OUT}$ 813 decreases, the friction is reduced, thereby increasing the number of revolutions of the rotor. It means that the spiral spring is released instantly in an extreme case (switch OFF). Then, the speed-regulating mechanism is provided to set the releasing speed (of the rotor) at a speed slightly higher number of revolutions than that of the rotor when the load current $I_{OUT}$ 813 is maximum to prevent the spiral spring from being totally and wastefully released even if the load current $I_{OUT}$ 813 decreases. However, practically, it is also preferable to adopt a method of providing the secondary cell as described later to charge the secondary cell bit by bit always (trickle charge) with the remainder of the generated power which did not go to the load, which is decided by the speed-regulation, and to use it when the load current reduces or the spiral spring is released.

Figure 11:
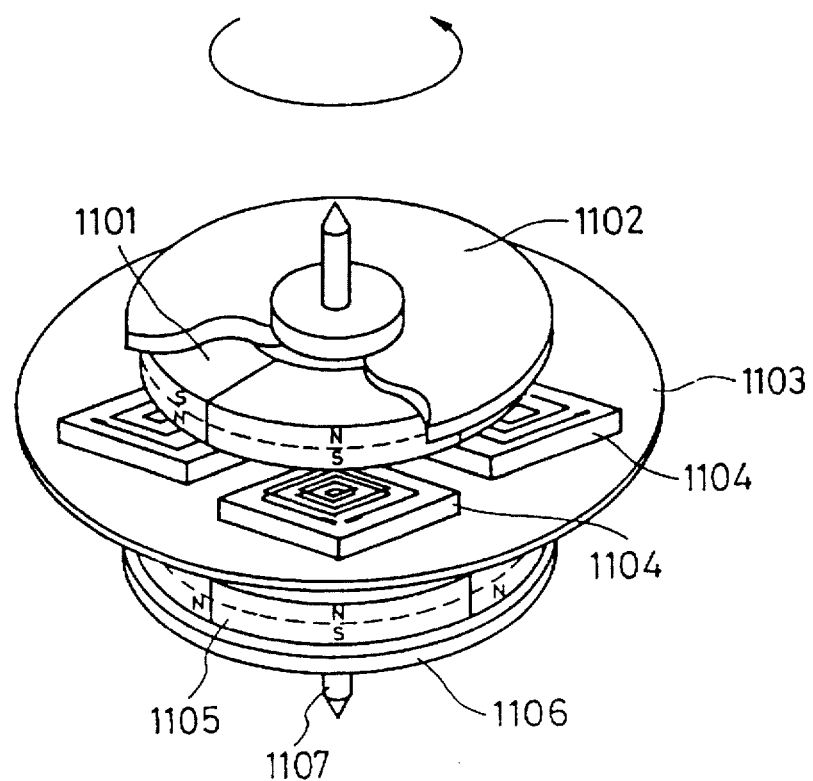
FIG. 11 is a stereographic view showing a generator in Part 1 of the second embodiment of the present invention.

FIG. 11 is a stereographic view showing the generator in Part 1 of the second embodiment of the present invention. It is basically the same as the coreless (faced type) DC generator which has been explained in the first embodiment except that it is downsized (thinned). It is constructed so that four chip coils 1104 (described later) are disposed (alternately with those whose winding direction is mirrored) on a substrate 1103 and magnets formed by disk-like four-pole magnetized magnets 1101 and 1105 contacting with back yokes 1102 and 1106 in a manner sandwiching the coils rotate with a rotor shaft 1107. Such arrangement allows the brush electrodes for taking out an electrode from the coils to be eliminated and, thereby, downsizing (thinning) of the generator and the high-speed rotary reaction (no brush jump occurs) to be realized.

FIGS. 12a and 12b are plan views showing the chip coil 1104 of a type wound by a first method of the generator in Part 1 of the second embodiment of the present invention. While FIG. 12a is a plan view close to the actual shape, it will be explained by using a schematic plan view of FIG. 12b to make it understandable.

A wire 1202 on the first layer is connected with one of an electrode 1201 and is disposed in spiral toward the center like a spiral of a mosquito-repellent incense. It is then connected to a wire on the second layer via a connector portion 1204 approximately at the center of the spiral. The wire is disposed in spiral toward the outside in the same spiral direction and is connected to the other electrode 1201. While a number of turns may be increased by multiplying the layers like a third and fourth layer, a series resistance increases if the thickness of the wire is the same. It is important to set the size, number of turns and the resistance corresponding to its use.

Figure 13A:
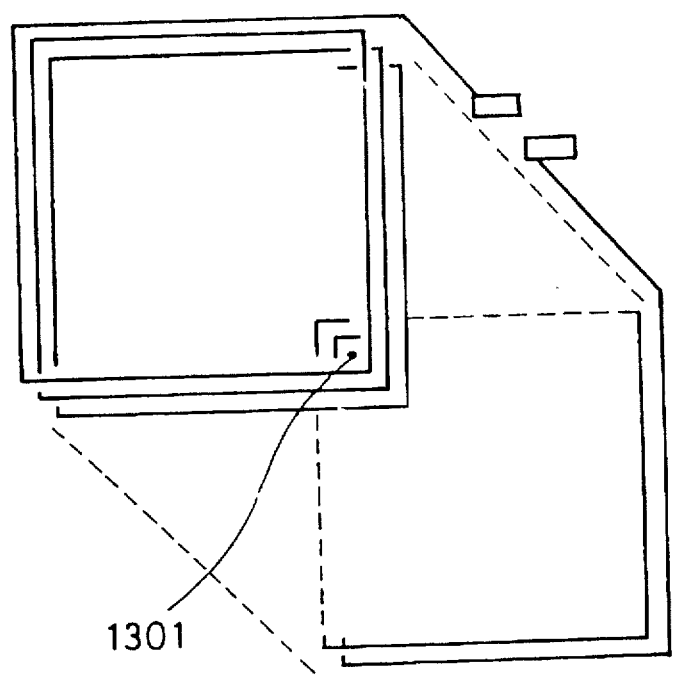
FIGS. 13a and 13b are plan views showing the chip coil 1104 of a type wound by a second method of the generator in Part 1 of the second embodiment of the present invention.
Figure 13B:
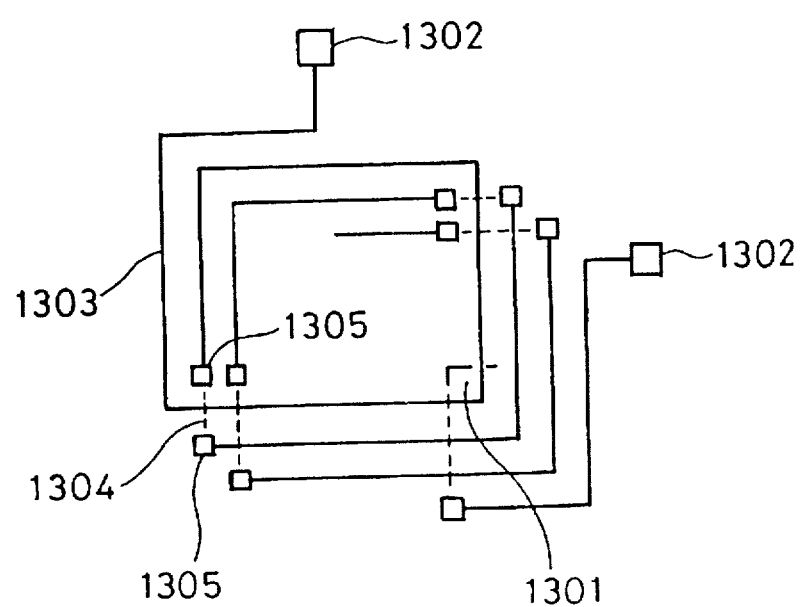

FIGS. 13a and 13b are plan views showing a chip coil of a type wound by a second method (which is different from the "mirrored" one described above, i.e., "mirror" means that right and left are reversed in plan) of the generator in Part 1 of the second embodiment of the present invention. While FIG. 13a is a plan view close to the actual shape, it will be explained by using a schematic plan view of FIG. 12b to make it understandable.

A wire 1303 on the first layer connected one electrode 1302 is disposed in spiral and is connected with a wire on the second layer when it crosses with the wire on the second layer via a connecting portion 1305. It then runs above own wire and is wound in spiral via the connecting portion 1305 as the wire on the first layer. By repeating this process, a plurality of coil turns having almost the same size per one turn is wound. It is then connected to the other electrode 1302 in the end. It may be easily understood if one imagines a spring coil squashed into a flat shape. What is important here is that the overlap portion 1301 of the first coil turn and the final coil turn has to be left and must not be crossed.

Figure 14:
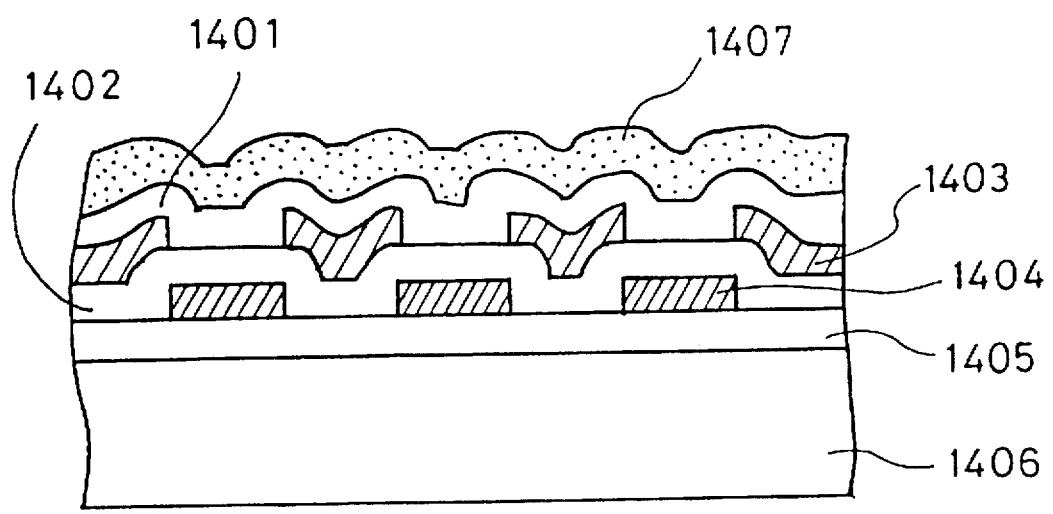
FIG. 14 is a schematic drawing showing a section of the chip coil 1104 of the generator in Part 1 of the second embodiment of the present invention.

FIG. 14 is a schematic drawing showing a section of the chip coil 1104 of the generator in Part 1 of the second embodiment of the present invention. It comprises an Al (aluminum) or poly-Si wire layer 1404 of the first layer on a semiconductor substrate (while it may be a silica or glass substrate, an influence of substrate eddy current may be ignored even with a Si semiconductor substrate used often in a semiconductor process because there is a difference of more than four digits in terms of specific resistance as compared to a coil wiring material if its specific resistance is 1 Ω-cm or more) 1406 via an insulating film 1405, an Al wire layer 1403 of the second layer via an inter-layer insulating film 1402 and a surface protective film layer 1401 thereon. The layer may be increased like a third or fourth layer or a magnetic film (formed of a compound film such as CoFeSiB by sputtering) 1407 may be used on the surface protective film as shown in the figure. About four times of inductance may be obtained with the same number of patterns.

Figure 15:
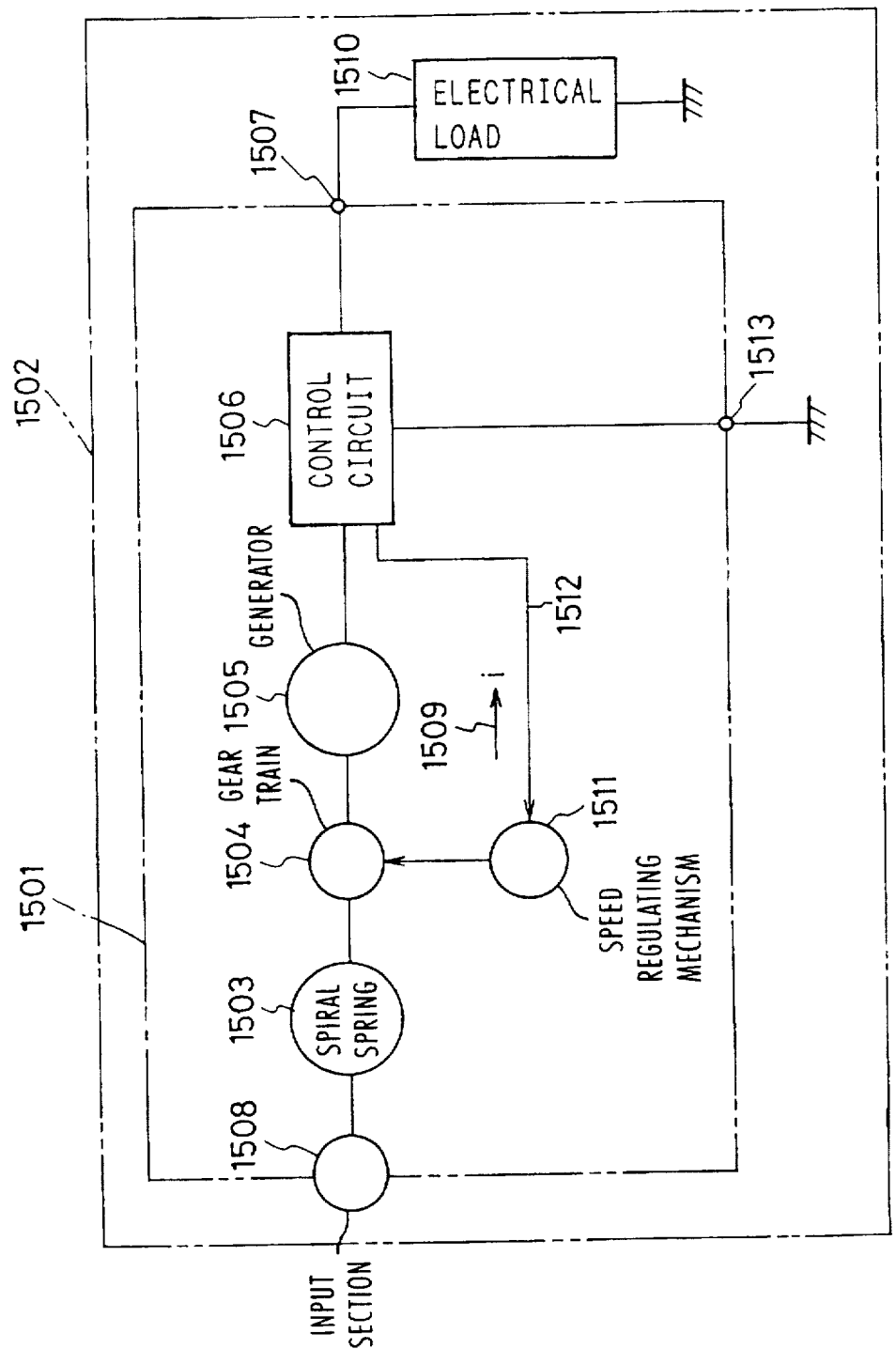
FIG. 15 is a system block diagram showing a power unit 1501 and an electronic equipment 1502 comprising the same according to Part 2 of the second embodiment of the present invention.

FIG. 15 is a system block diagram showing a power unit 1501 and an electronic equipment 1502 comprising the same according to Part 2 of the second embodiment of the present invention. The power unit 1501 comprises an input section 1508, a spiral spring 1503, a gear train mechanism 1504, a speed-regulating mechanism 1511, a generator 1505, a control circuit 1506 which has an electrical speed-regulating control 1512 function, a $V_{OUT}$ output terminal 1507, and a GND terminal 1513. The power unit 1511 is connected to an electrical load 1510 via the Vout terminal 1507 and composes the electronic equipment 1502.

FIGS. 16a, 16b and 16c are stereographic views showing the speed-regulating mechanism in Part 2 of the second embodiment of the present invention. Attached to a worm gear in a rack-and-pinion mechanism composed of the worm gear (screw gear) 1604 and a pinion gear 1605 at the final gear train is a disk-like four-pole magnetized magnet, instead of the wind mill described before. When a coil 1601 is provided in the proximity of the magnet, friction (caused by electromagnetic induction) caused by the worm gear of the speed-regulating mechanism varies depending on an impedance (load 1602 within the figure, which is a load for controlling the speed-regulation) of the circuit connected to the coil. That is, when the impedance is lowered, the friction increases, thereby acting toward stopping the spiral spring from being released (non-release side). When the impedance is increased, the friction decreases, thereby acting toward releasing the spiral spring (release side).

The magnet may be of cylindrical and radially field-magnetized as shown in FIG. 16b. At this time, its efficiency may be improved by surrounding around the magnet with a coil having an armature iron core as shown in FIG. 16c. For these structures, see a structure of a rotor of an AC generator (ACG) in a fourth embodiment described later.

Concerning to a multiplying factor of the gear train from the spiral spring to the final rotary magnet in the speed-regulating mechanism of the present embodiment, a return current i 1509 flows as can be seen and as shown in the figure on the side of stopping the spiral spring from being released in the present embodiment. This current becomes a current to be consumed (although it is ideal if this current could be controlled and recovered, it will not be assumed here because it results in a limitless repetition of the system). So it is preferable to keep it as a small power (current i 1509) as much as possible. Then, the multiplying factor of the gear train in the speed-regulating mechanism is set at 20 times or more in terms of the rotation of the rotor of the generator. If it is 10 times, it leads to a down of the efficiency of 10% in maximum, which is not negligible, but 5% of down with 20 times of multiplying factor may be within an acceptable range in this system. Although it may be set at 50 time or 100 times of course, the rotor of 1000 rpm rotates at 100,000 rpm when the multiplying factor is 100 times. A problem in the durability may come out if technology in spindle cannot follow up. Accordingly, while no upper limit will be indicated by a numerical value at this time, its rate is determined by a high-speed spindle technology to be used.

Although electromagnetic speed-regulation has been described, it is also possible to use an electrically viscous fluid whose viscosity varies corresponding to an applied voltage for example.

Figure 17:
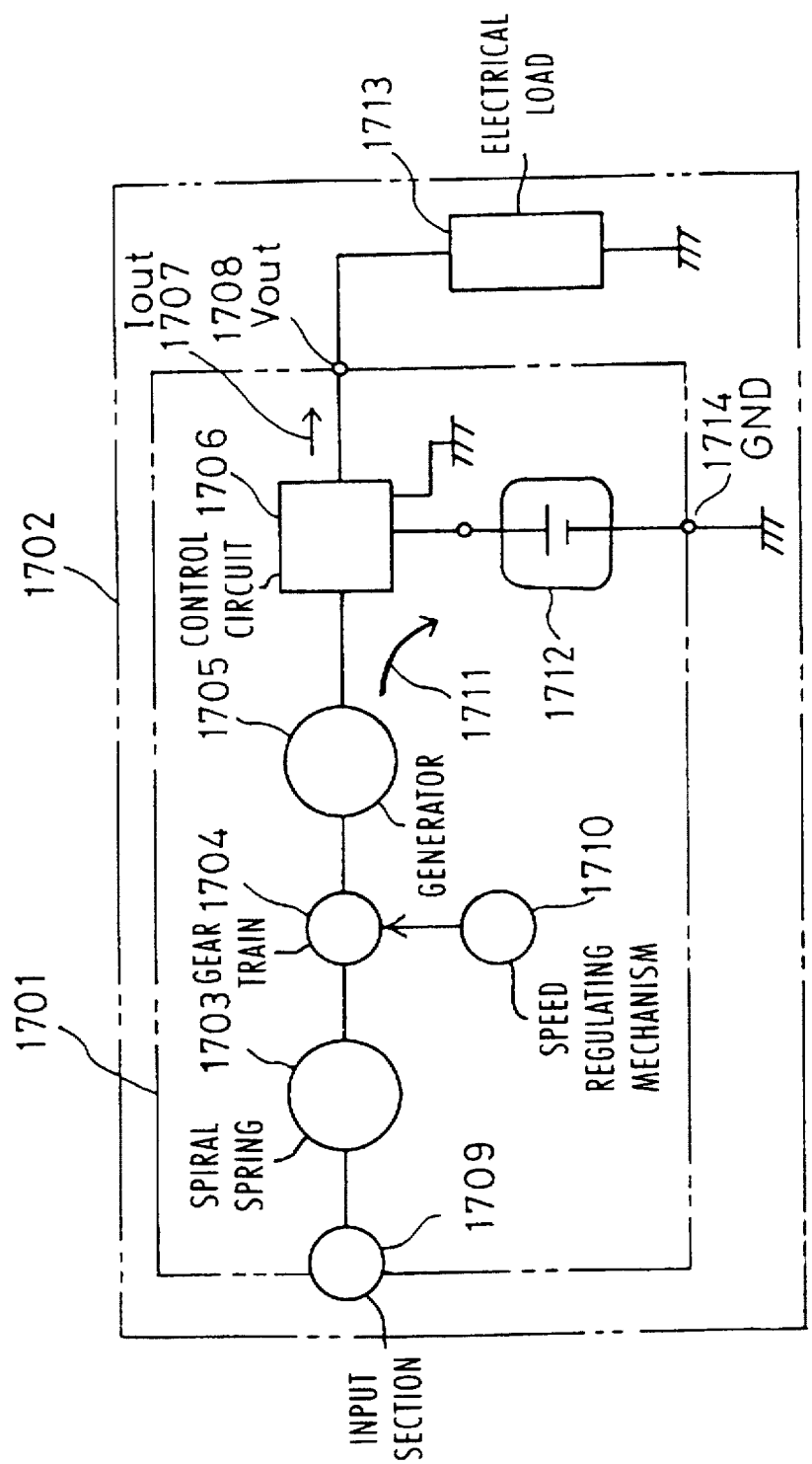
FIG. 17 is a system block diagram showing a power unit 1701 and an electronic equipment 1702 comprising the same according to Part 3 of the second embodiment of the present invention.

FIG. 17 is a system block diagram showing a power unit 1701 and an electronic equipment 1702 comprising the same according to Part 3 of the second embodiment of the present invention. The power unit 1701 comprises an input section 1709, a spiral spring 1703, a gear train mechanism 1704, a speed-regulating mechanism 1710, a generator 1705, a control circuit 1706, a secondary cell 1712 as charging/discharging means, a $V_{OUT}$ output terminal, and a GND terminal 1714. The power unit 1701 is connected to an electrical load 1713 via the Vout terminal 1708 and composes the electronic equipment 1702. The speed-regulating mechanism 1710 is set on the side for releasing the generated electricity slightly larger than the maximum value of an load current $I_{OUT}$ 1707 and the remaining current is charged to the secondary cell as charging current $I_{CHG}$ 1711 by way of trickle charge. It is used in emergency. While the secondary cell here may be any one of Ni-MH, Ni-Cd or Li ion type cell, it is preferable to have a charge/discharge control circuit in the fourth embodiment described later when it is the Li ion type cell.

Figure 18:
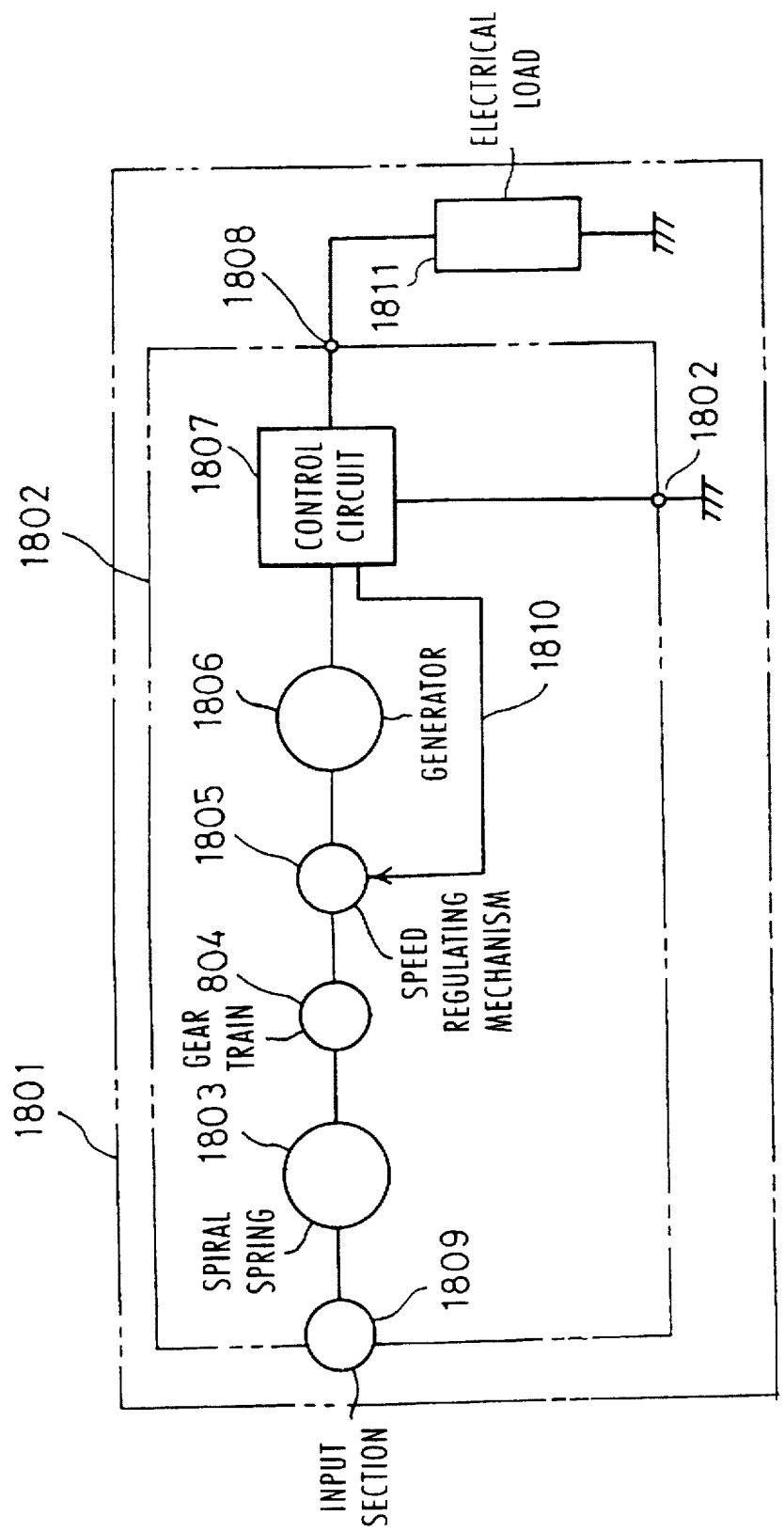
FIG. 18 is a system block diagram showing a power unit 1801 and an electronic equipment 1802 comprising the same according to Part 1 of a third embodiment of the present invention.

FIG. 18 is a system block diagram showing a power unit 1801 and an electronic equipment 1802 comprising the same according to Part 1 of a third embodiment of the present invention. The power unit 1801 comprises an input section 1809, a spiral spring 1803, a gear train mechanism 1804, a speed-changing mechanism 1805 as means for changing a speed multiplying factor of the gear train, a generator 1806, a control circuit 1807 which has a function 1810 for electrically controlling the speed-changing mechanism, a $V_{OUT}$ output terminal 1808, and a GND terminal 1812. The power unit is connected to an electrical load 1811 via the Vout terminal 1808 and composes the electronic equipment 1802. A concrete example of the speed-changing control will be described later in the fourth embodiment.

Figure 19:
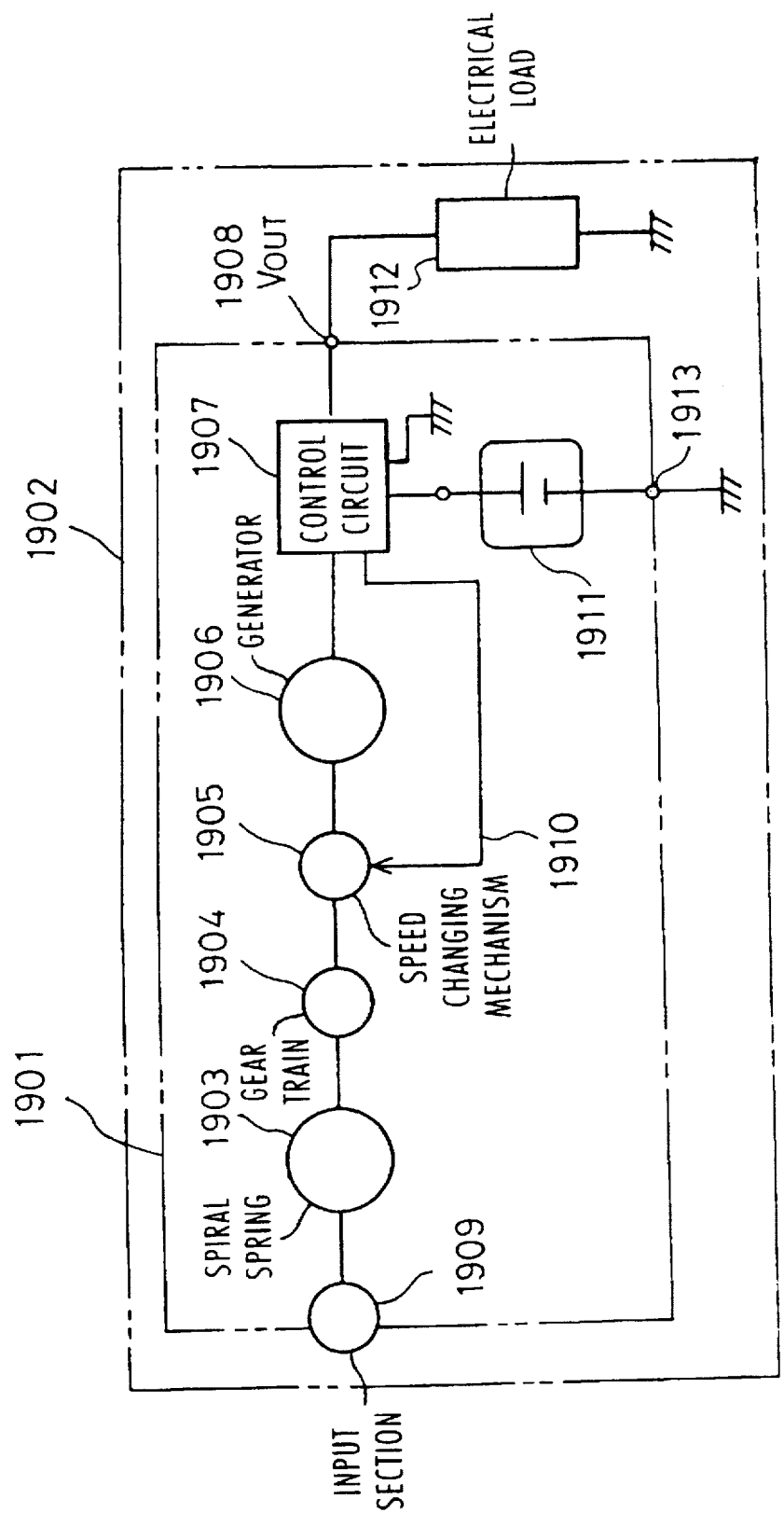
FIG. 19 is a system block diagram showing a power unit 1901 and an electronic equipment 1902 comprising the same according to Part 2 of the third embodiment of the present invention.

FIG. 19 is a system block diagram showing a power unit 1901 and an electronic equipment 1902 comprising the same according to Part 2 of the third embodiment of the present invention. The power unit 1901 comprises an input section 1909, a spiral spring 1903, a gear train mechanism 1904, a speed-changing mechanism 1905, a generator 1906, a control circuit 1907, a mechanism 1910 for electrically controlling the speed-changing mechanism, a secondary cell 1911 as charging/discharging means, a $V_{OUT}$ terminal 1908, and a GND terminal 1913. The power unit is connected to an electrical load 1912 via the Vout terminal 1908 and composes the electronic equipment 1902.

Figure 20:
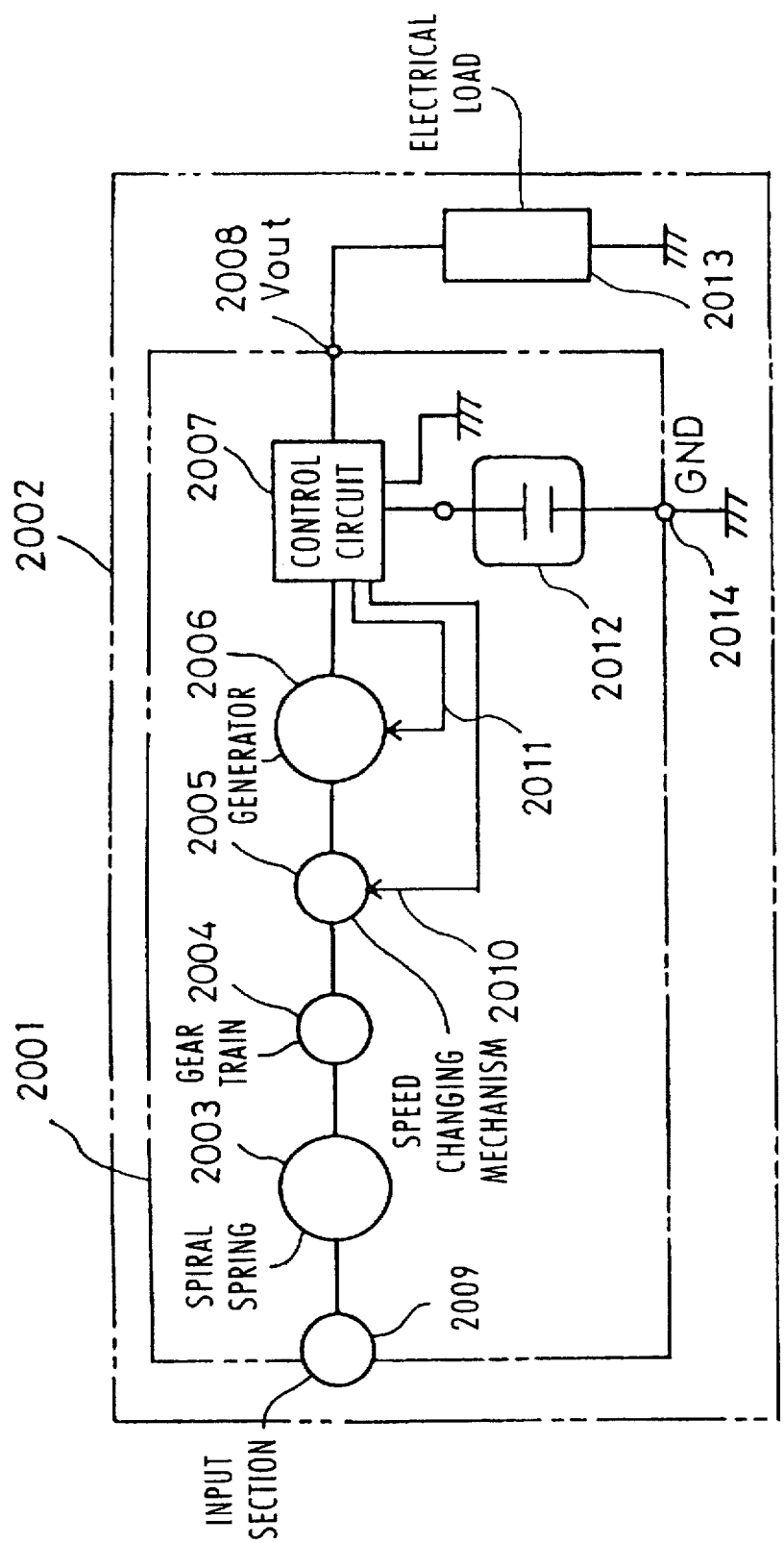
FIG. 20 is a system block diagram showing a power unit 2001 and an electronic equipment 2002 comprising the same according to Part 1 of a fourth embodiment of the present invention.

FIG. 20 is a system block diagram showing a power unit 2001 and an electronic equipment 2002 comprising the same according to Part 1 of a fourth embodiment of the present invention. The power unit 2001 comprises an input section 2009, a spiral spring 2003, a gear train mechanism 2004, a speed-changing mechanism 2005, a generator (hereinafter referred to as an AC generator or ACG for convenience) 2006 which uses a self-exciting magnetic field instead of the field magnet type generator (DC generator) explained so far, a control circuit 2007 which has a function 2011 for controlling a field current of the stator coil as means for field magnetization, a secondary cell 2012, a $V_{OUT}$ output terminal 2008, and a GND terminal 2014. The power unit 2001 is connected to an electrical load 2013 via the Vout terminal 2008 and composes the electronic equipment 2002.

Figure 21:
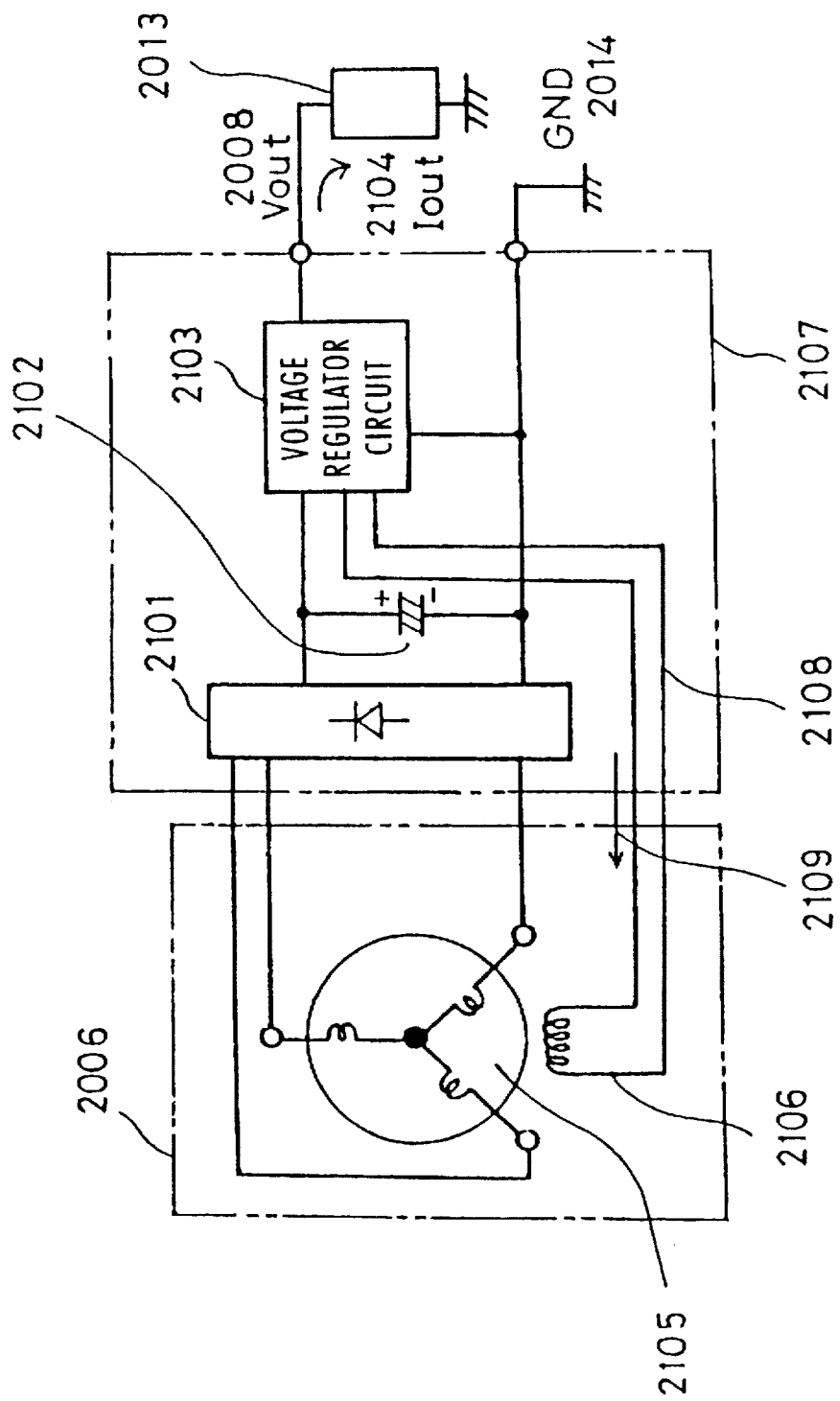
FIG. 21 is a circuit diagram showing an AC generator 2006 and an electrical control circuit 2007 in Part 1 of the first embodiment of the present invention.

FIG. 21 is a circuit diagram showing an AC generator 2006 and its electrical control circuit 2007 in Part 1 of the first embodiment of the present invention. The AC generator 2006 comprises a rotor (armature) composed of three rotor coils 2105 connected in Y-connection and a stator (field magneton) composed of a stator coil 2106. While the stator rotates in the present invention because only two brush electrodes are required as described later, the explanation will be continued by using the names of rotor and stator as it is. The control circuit 2007 comprises a rectifier section 2101, a smoothing (waveform-shaping) capacitor 2102 and a voltage regulator circuit (it is also referred to as a SWR because it is a switching regulator as described later) 2103 having a function 2108 for controlling a field current $I_F$ 2109 of the stator coil (field magnetic coil). The reference numeral (2104) within the figure denotes an output current $I_{OUT}$.

Figure 22A:
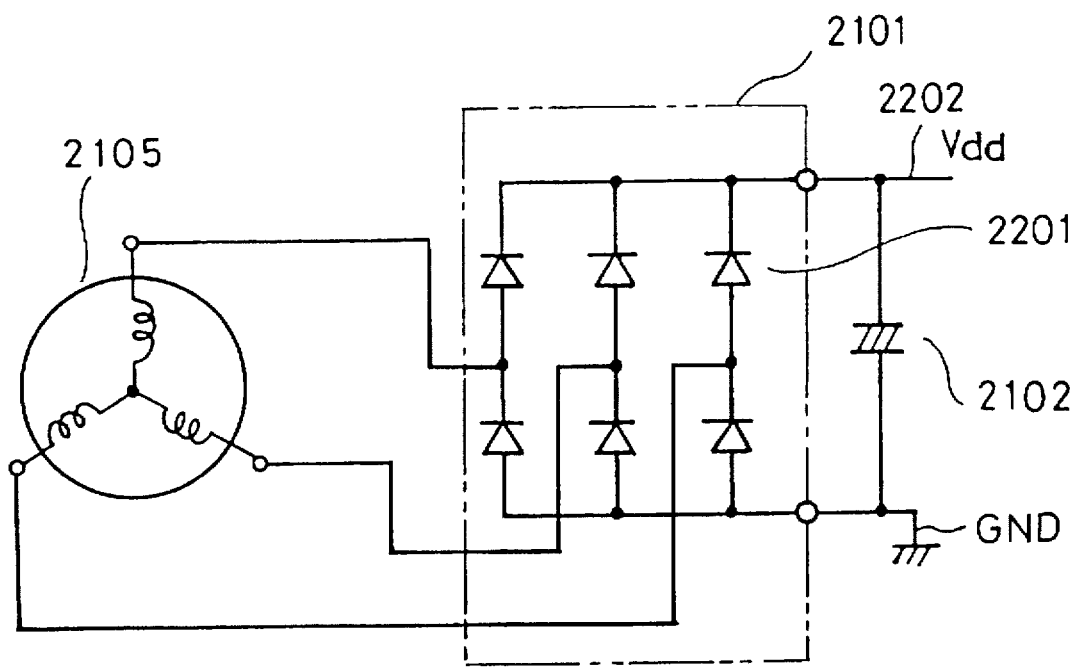
FIGS. 22a and 22b are circuit diagrams showing a rectifier section 2101 in Part 1 of the fourth embodiment of the present invention.
Figure 22B:
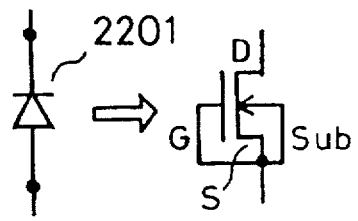

FIGS. 22a and 22b are circuit diagrams showing the rectifier section 2101 in Part 1 of the fourth embodiment of the present invention. AC output current from the rotor coil 2105 is taken out as DC output current between a Vdd 2202 and a GND 2014 via six rectifier diodes 2201. The efficiency may be improved here if Schottky diodes are used for these diodes because of low $V_F$ as described before, and it may be improved further if the MOS transistor is used in a manner connecting the gate (G), substrate (Sub) and source (S) as shown in FIG. 22b as described before. (D) denotes a drain. While a N-channel MOS transistor is used in the figure, a P-channel MOS transistor may be also used as described before.

Figure 23:
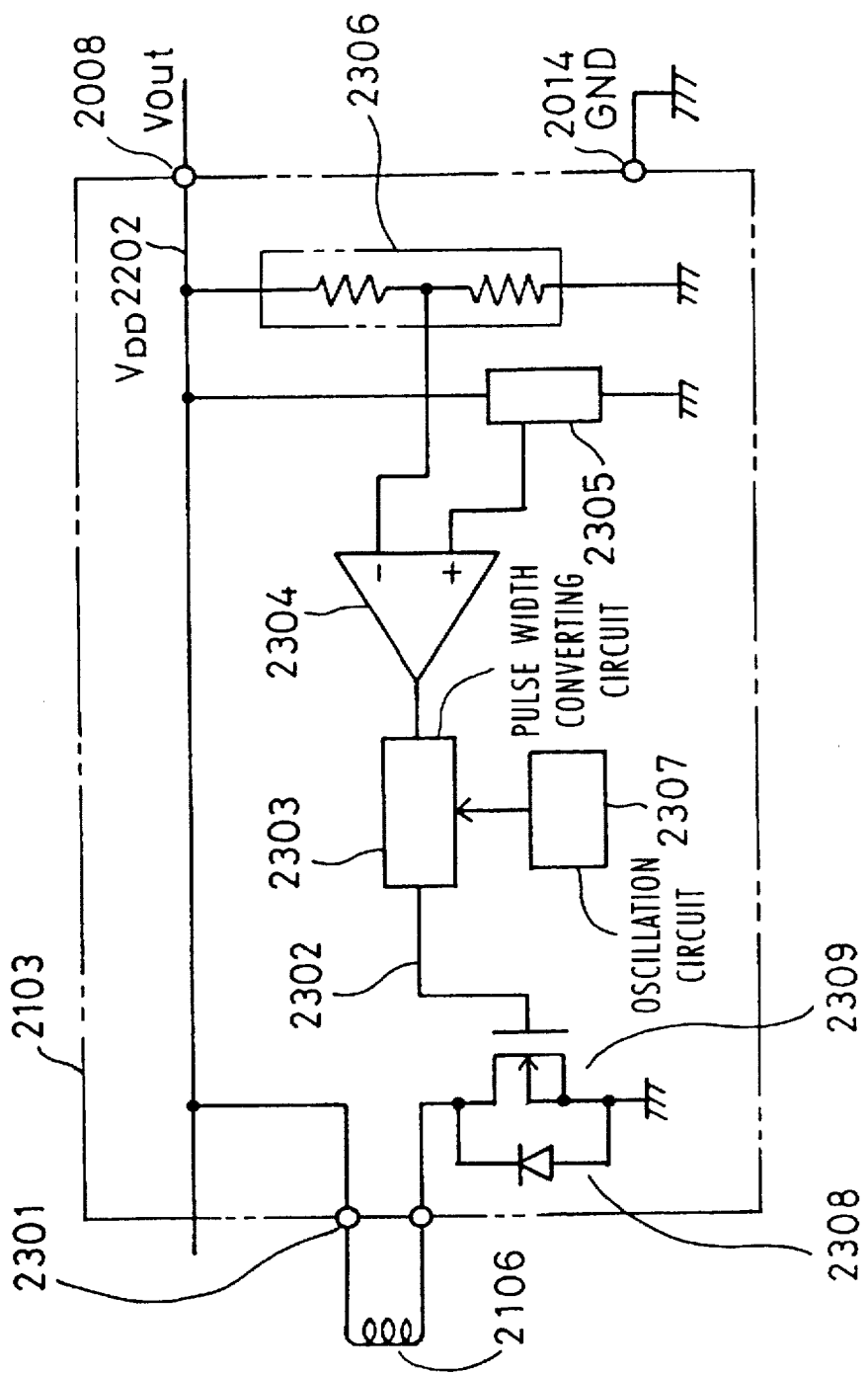
FIG. 23 is a circuit diagram showing a voltage regulator circuit (SWR) 2103 in Part 1 of the fourth embodiment of the present invention.

FIG. 23 is a circuit diagram showing the voltage regulator circuit (SWR) 2103 in Part 1 of the fourth embodiment of the present invention. It is connected with the stator coil 2106 and has field current ($I_F$) control terminals ($I_F$ terminal) 2301. One terminal of the $I_F$ terminal is connected to a Vdd line 2202 within the circuit and is connected to an $I_F$ driving N channel MOS transistor 2309 via the stator coil. The reference numeral (2308) denotes a flywheel diode for absorbing reverse electromotive force caused when the stator coil is turned off. The N-channel MOS transistor 2309 is connected to a pulse width converting circuit 2303 via a PWM circuit output $V_F$ 2302. The circuit outputs a signal as $V_F$ whose pulse width is modulated by an output of an error amplifier 2304 and an output from an oscillation circuit (OSC) 2307 (PWM control). The input side of the error amplifier 2304 is connected with a feedback resistor section 2306 which divides and detects a reference voltage generating circuit (Vref) and an output circuit $V_{OUT}$ 2008 as shown in the figure.

FIG. 24a is a circuit diagram showing another example of an $I_F$ driving circuit within the voltage regulator circuit 2103 in Part 1 of the fourth embodiment of the present invention. It shows a state wherein the P-channel MOS transistor connected to the Vdd line 2202 drives the stator coil 2106.

Figure 24:
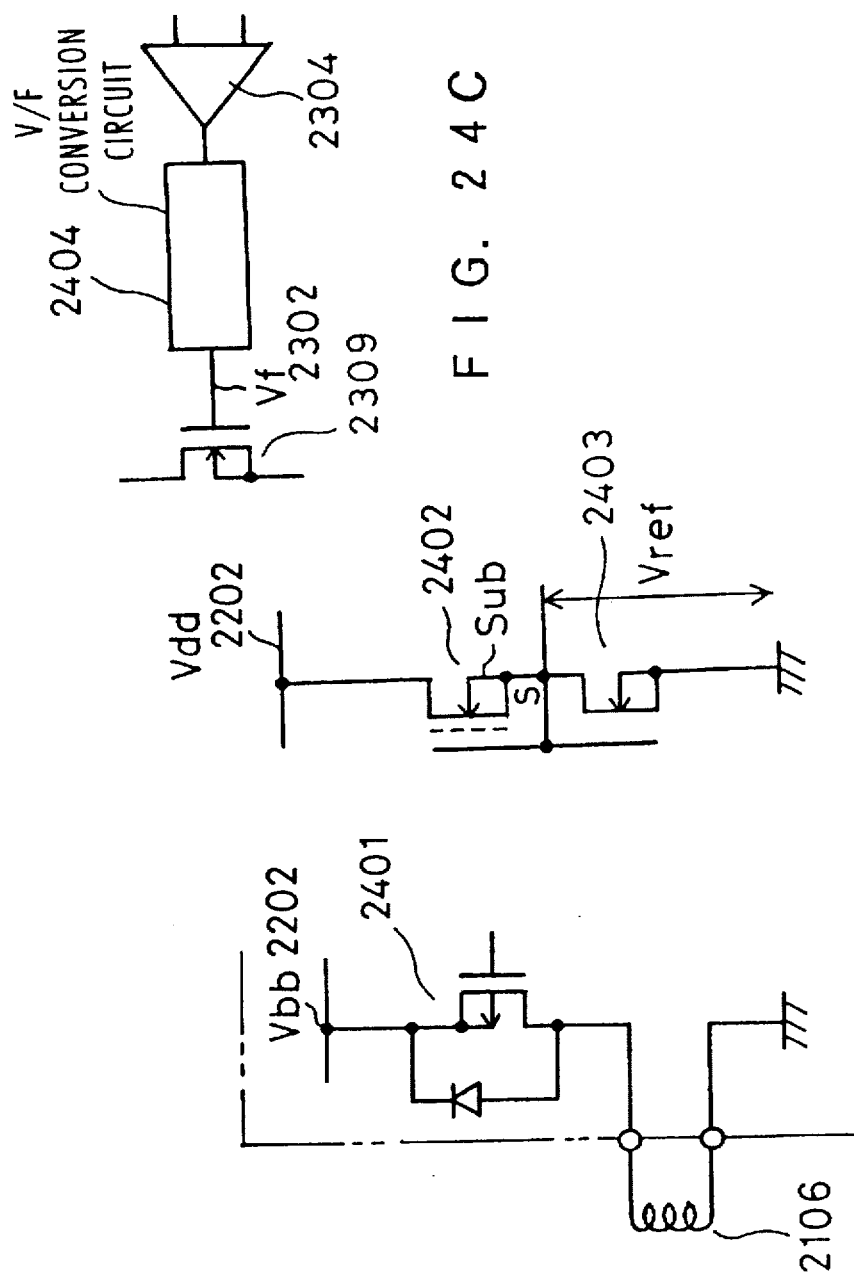
FIG. 24a is a circuit diagram showing another example of an IF driving circuit within the voltage regulator circuit 2103 in Part 1 of the fourth embodiment of the present invention.

FIG. 24b is a circuit diagram showing the reference voltage generating section 2305 within the voltage regulator circuit 2103 in Part 1 of the fourth embodiment of the present invention. The reference voltage generating section has been constructed as shown in the figure wherein a depletion type N-channel MOS transistor 2402 and an enhancement type N-channel MOS transistor 2403 are coupled shown in FIG. 24. The substrate (Sub)of the first embodiment is grounded to GND, but it is advantageous to connect it with Vrf like the present embodiment in terms of temperature characteristics. However, it cannot but be constructed like the first embodiment when a P-type semiconductor substrate has to be used in terms of the circuit.

FIG. 24c is a circuit diagram showing another example of a circuit for controlling $V_F$ within the voltage regulator circuit 2103 in Part 1 of the fourth embodiment of the present invention. As shown in the figure, a circuit (V/F conversion) 2404 having a function of receiving an output voltage from the error amplifier 2304 to convert it into a frequency may be used (PFM control).

It is of course possible to implement both the PWM modulation control and the PFM control together.

Figure 25:
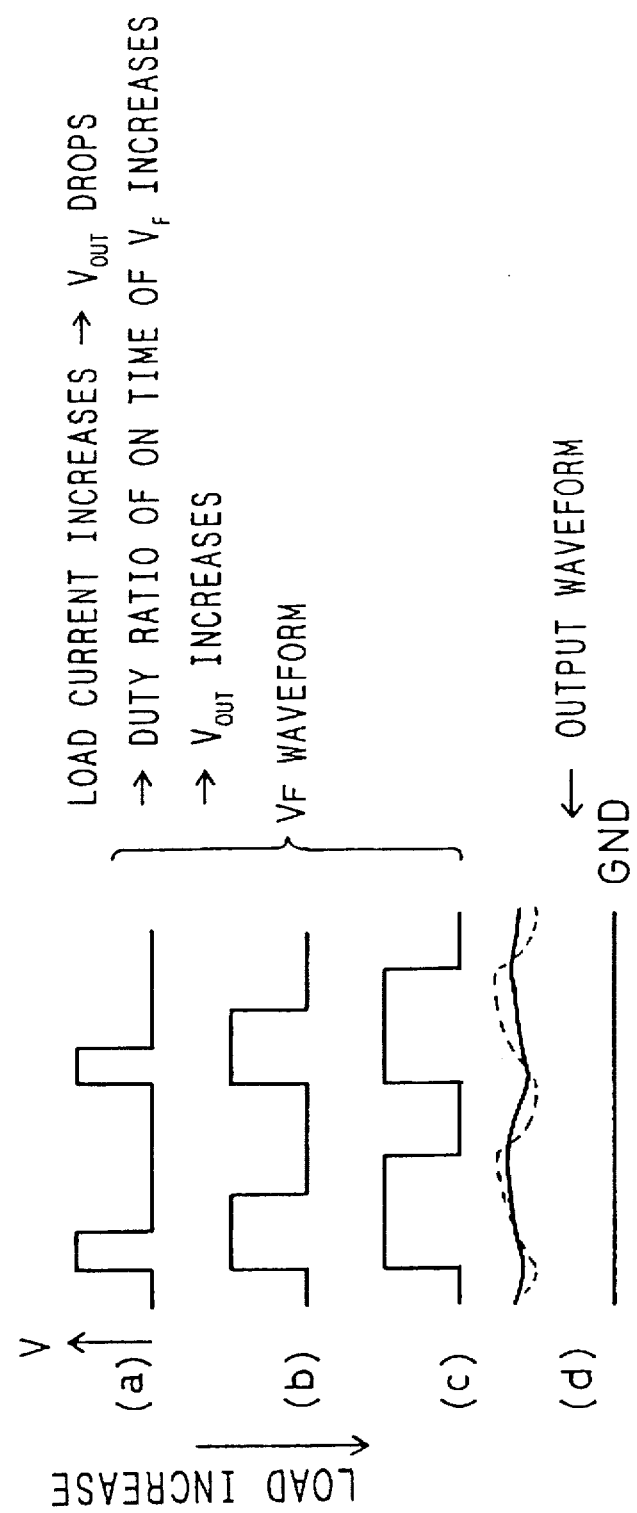
FIG. 25, a through d is a first schematic graph showing a state of control of field current in Part 1 of the fourth embodiment of the present invention.

FIGS. 25a through 25d are first schematic graphs showing a state of control of the field current in Part 1 of the fourth embodiment of the present invention. The generator shown in the present embodiment is what having a structure such that a generated power increases when the field current be flown to the stator coil is increased. The PWM control in the present embodiment is what controls it with a duty ratio of On time of $V_F$ output. That is, it means that the greater the duty ratio of $V_F$ output, the more $I_F$ is. FIG. 25a or 25c shows a state wherein a load current $I_{OUT}$ increases and the error amplifier and the PWM control circuit which detect that increase the duty. FIG. 25d shows a waveform from one of the rotor coils for reference, wherein a dotted line is drawn assuming to be a direct output waveform from the coil. A solid line represents an output smoothed by the smoothing coil. Actually, a very smooth (stable) DC output may be obtained because three coil outputs overlap in addition to the overlap caused by the rotation of the rotor (actually a stator). This control method may be understood as a switching regulator control supposing the rotor coil as a choke coil. As it is apparent from this fact, even when kinetic energy is converted into electricity for example, a certain degree of loss is produced at any cost if it is regulated by the series regulator (because slightly higher power has to be generated to implement the series regulation and dropper regulation). However, an efficiency of 100% in principle may be obtained by implementing the AC generation and field current control (switching control) like the present embodiment. It is the highlight of the present invention. Of course, it is essential to use the releasing speed-regulating control or speed-changing control function together for a fluctuating load when there is no secondary cell in terms of the point how to convert stored kinetic-energy (in spiral spring) into electrical energy close to 100%.

Figure 26:
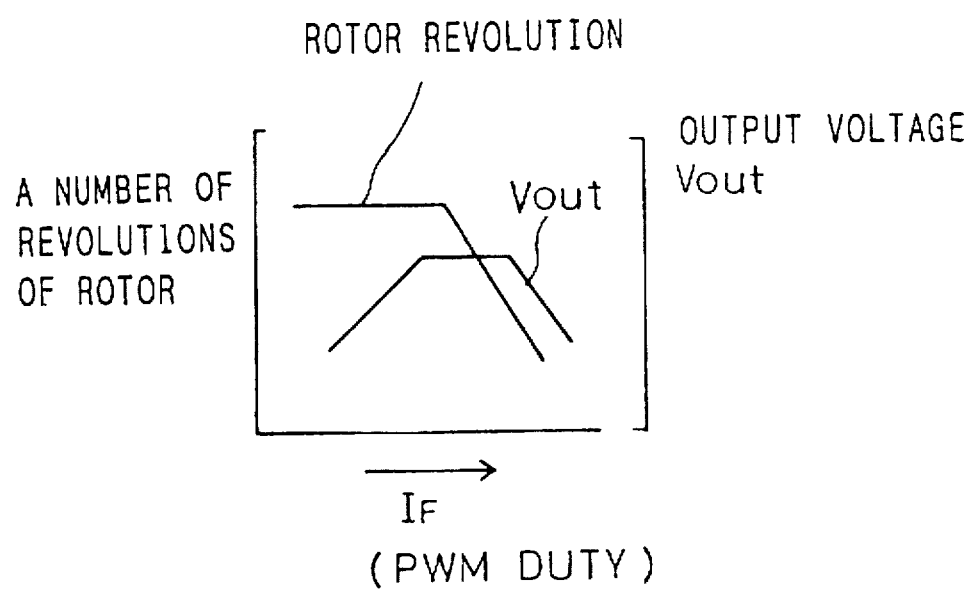
FIG. 26 is a second schematic graph for explaining the control of field current in Part 1 of the fourth embodiment of the present invention.

FIG. 26 is a second schematic graph for explaining the control of field current in Part 1 of the fourth embodiment of the present invention. The horizontal axis represents field current $I_F$ (i.e., it also means $V_F$ duty of the PWM control) and when a load current $I_{OUT}$ increases, this $I_F$ increases.

When the speed-regulating mechanism or speed-changing mechanism is fixed for example, while $V_{OUT}$ rises once along the increase of $I_F$ the number of revolutions of rotor drops from a certain point (because electromagnetic friction caused by the field current increases and the torque starts to be weakened). Then, soon, $V_{OUT}$ also starts to drop. Since it is impermissible, the speed-regulating mechanism or the speed-changing mechanism are provided to implement the feedback control.

Figure 27:
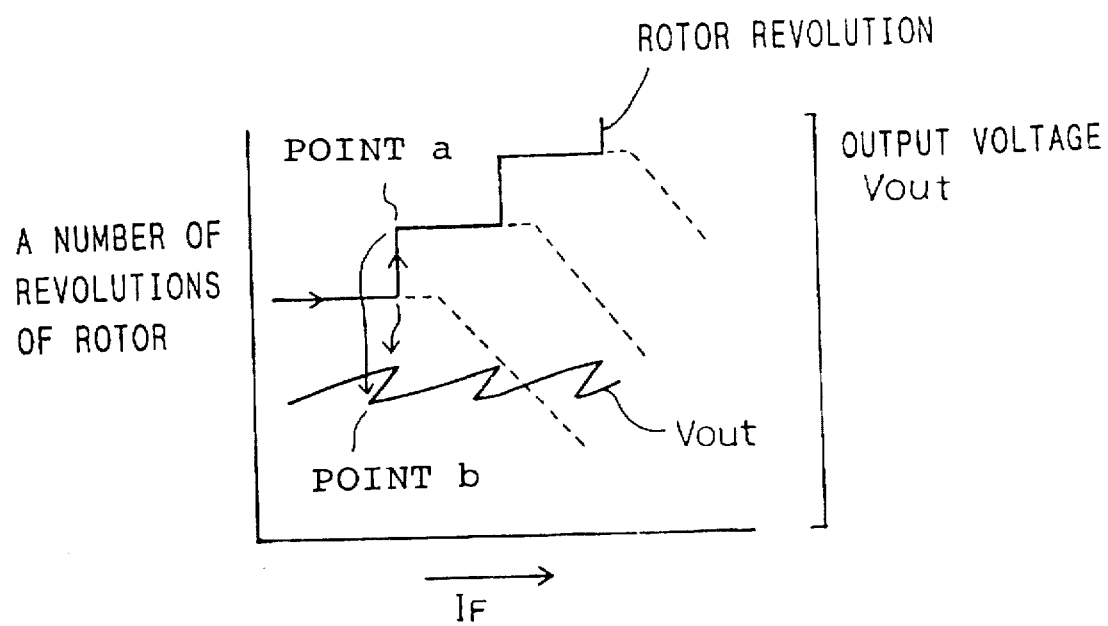
FIG. 27 is a third schematic graph for explaining the control of field current in Part 1 of the fourth embodiment of the present invention.

FIG. 27 is a third schematic graph for explaining the control of field current in Part 1 of the fourth embodiment of the present invention. A speed multiplying factor is changed (speed-change) (toward reducing the multiplying factor) slightly before the number of revolutions of the rotor starts to drop due to the increase of $I_F$ to increase the number of revolutions of the rotor (point a: side of releasing the spiral spring). Then, because $V_{OUT}$ becomes higher than a specified output with that rotation and with $I_F$, $I_F$ is lowered once than the previous one (point b). This operation is repeated along the increase of the load current $I_{OUT}$. However, not such stepped control but a continuous control is made actually. $V_{OUT}$ also does not fluctuate within such a width. The stepped control has been shown here to emphasize changes of $V_{OUT}$ for the purpose of explanation. However, because there is a problem of follow-up of a mechanism in the aspect of transient response to time, a hysterisis is provided at the up and down of the speed-changing points and it is preferable to set a larger range covered by $I_F$ (i.e., to widely take a duty range in which constant voltage is controlled by $I_F$). It means that the efficiency of conversion from force to electricity drops. This will be explained further with reference to FIG. 28.

Figure 28:
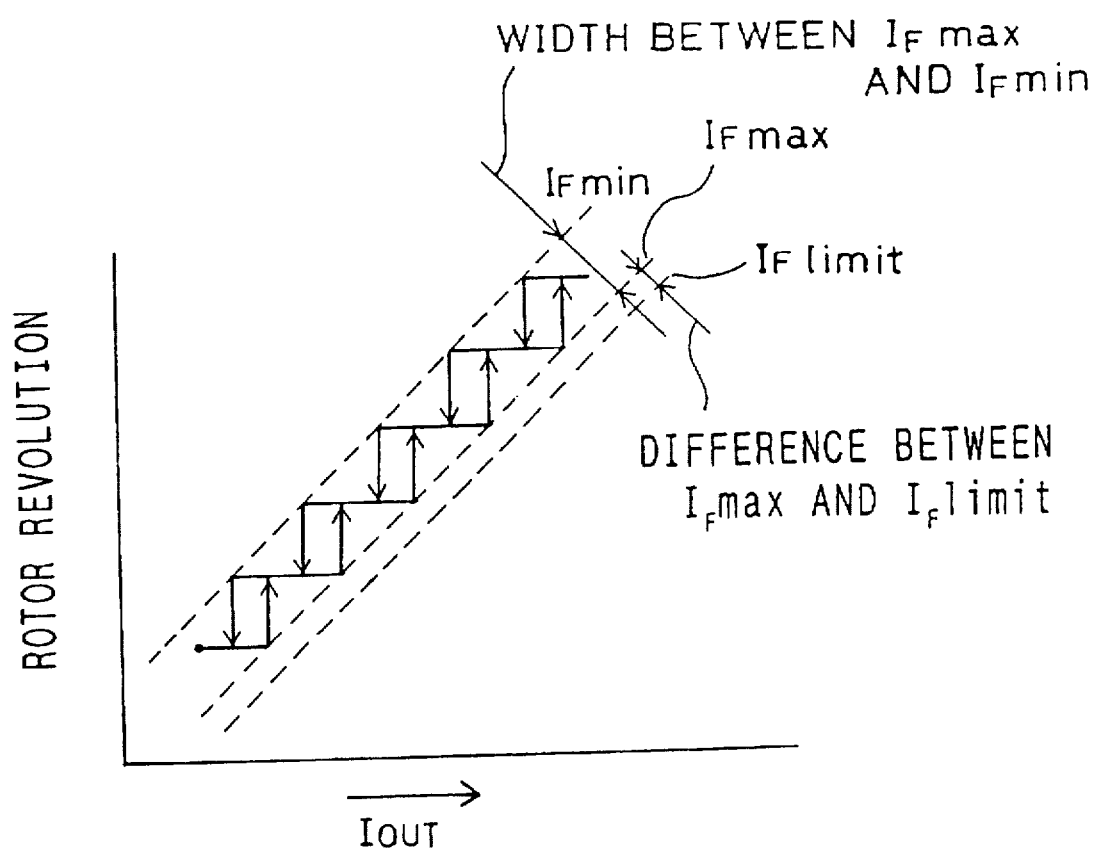
FIG. 28 is a fourth schematic graph for explaining the control of field current in Part 1 of the fourth embodiment of the present invention.

FIG. 28 is a fourth schematic graph for explaining the control of field current in Part 1 of the fourth embodiment of the present invention. While this is also a graph created supposing that the speed is changed or regulated stepwise for the purpose of explanation, a horizontal axis represents load current $I_{OUT}$ from now on. This is an example showing an earlier rotation step-up ($I_{Fmax}$) to the increase of the load current and a slower rotation step-down ($I_{Fmin}$) to the decrease of the load current. Here, $I_{Flimit}$ indicates where the friction balances with the torque and from that point, the rotation drops and $V_{OUT}$ drops as well. It is a limit value of $I_F$ with that rotation. While the smaller the width of both differences between $I_{Fmax}$ and $I_{Flimit}$ and between $I_{Fmax}$ and $I_{Fmin}$, the better it is in terms of the efficiency of power generation, it has be set separately per application to which the inventive power unit is used. Although no individual application examples will be shown here, it is intended to disclose all means for the application. The setting will greatly differ depending on how much the load fluctuates instantly and on whether there is a secondary cell or not. Although there is also another problem even if there exists a secondary cell that what should be done when it is depleted, it may be solved by changing $I_{Fmax}$ and $I_{Fmin}$ corresponding to a status of the secondary cell when there is provided a secondary cell monitoring function like in embodiments described later.

Figure 29:
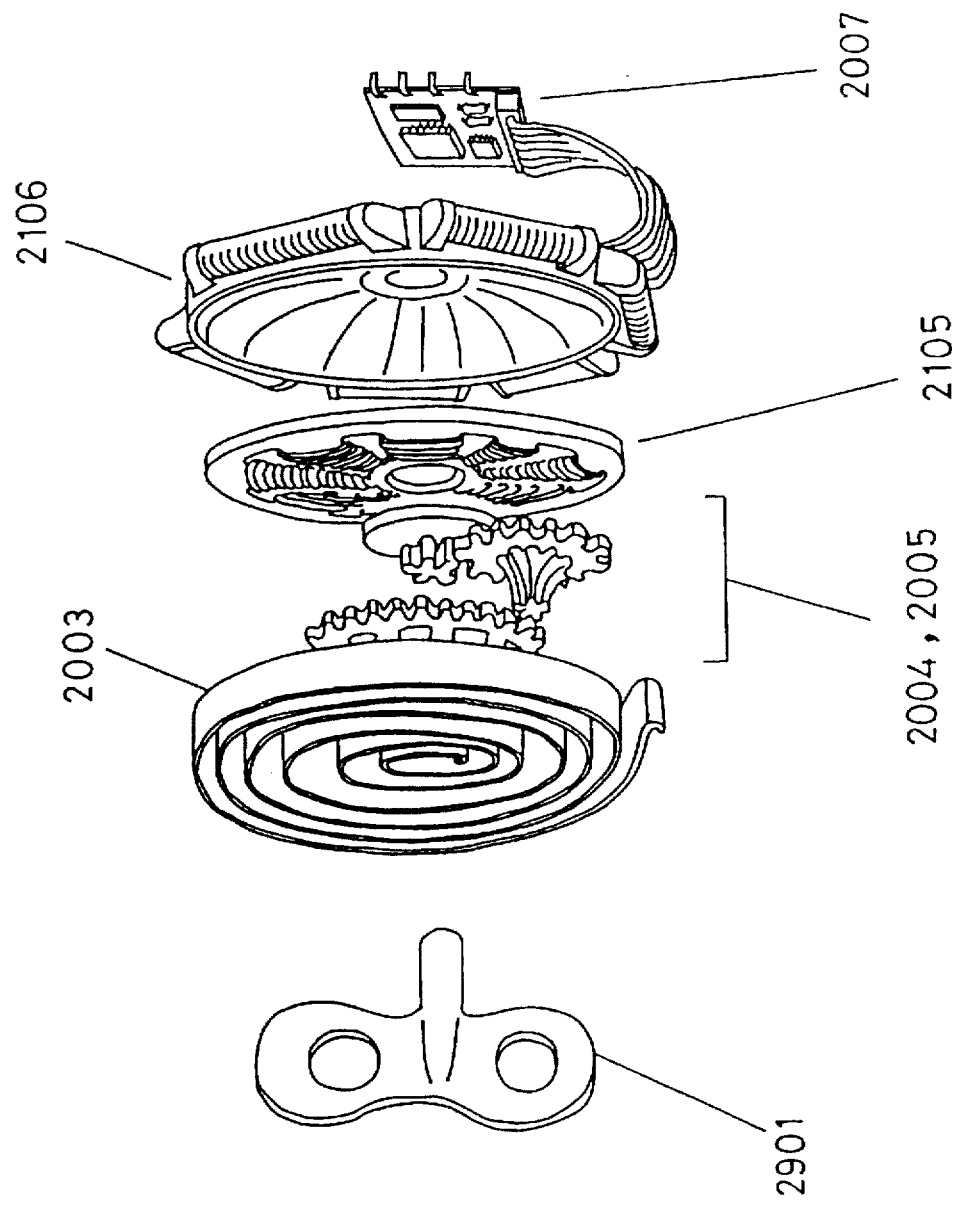
FIG. 29 is an image-wise stereographic view showing a structure of the power unit in Part 1 of the fourth embodiment of the present invention.

FIG. 29 is an image-wise stereographic view showing a structure of the power unit in Part 1 of the fourth embodiment of the present invention. FIG. 29 is an image-wise view showing a state wherein a thumbscrew 2901 as kinetic energy input means winds up the spiral spring 2003 as the input section 2009 via a mechanical connector section (not shown because it is identical with that shown in the first embodiment) and the gear train mechanism 2004, the speed-changing mechanism 2005, the rotor 2105 and the stator 2106 are laminated concentrically. The reference numeral (2007) denotes a control circuit.

Figure 30:
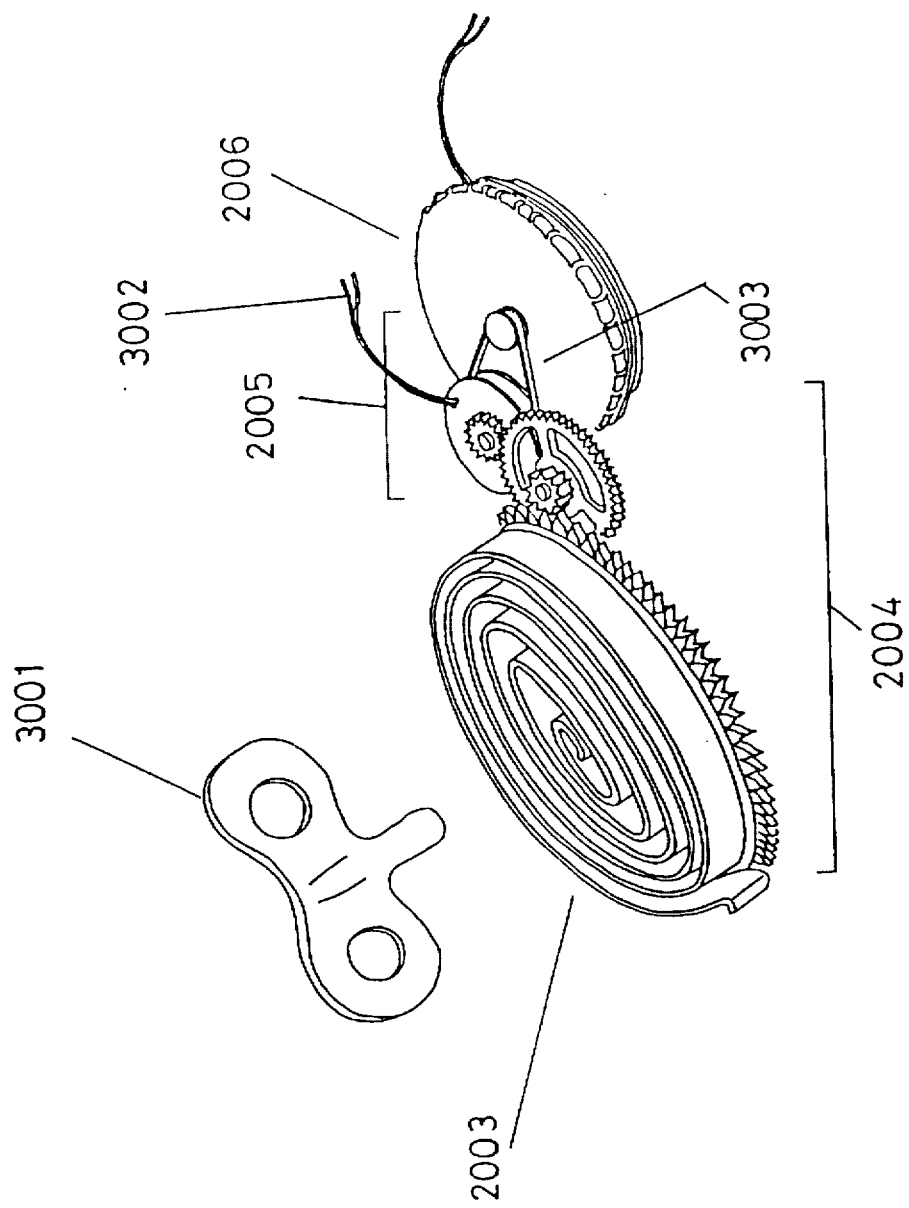
FIG. 30 is a stereographic view showing the structure of the power unit in Part 1 of the fourth embodiment of the present invention.

FIG. 30 is a stereographic view showing the structure of the power unit in Part 1 of the fourth embodiment of the present invention. In FIG. 30, the thumbscrew 2901 as kinetic energy input means winds up the spiral spring 2003, the input means 2009, via the mechanical connector section (not shown because it is identical with that shown in the first embodiment). The gear train mechanism 2004 is connected mechanically with the speed-changing mechanism 2005 and the speed-changing mechanism is connected mechanically to the AC generator 2006 by a pulley belt 3003. The reference numeral (3002) denotes an electrical wire for electrically controlling the speed-changing mechanism. The generator and the speed-changing mechanism used in this figure will be explained below in detail.

Figure 31:
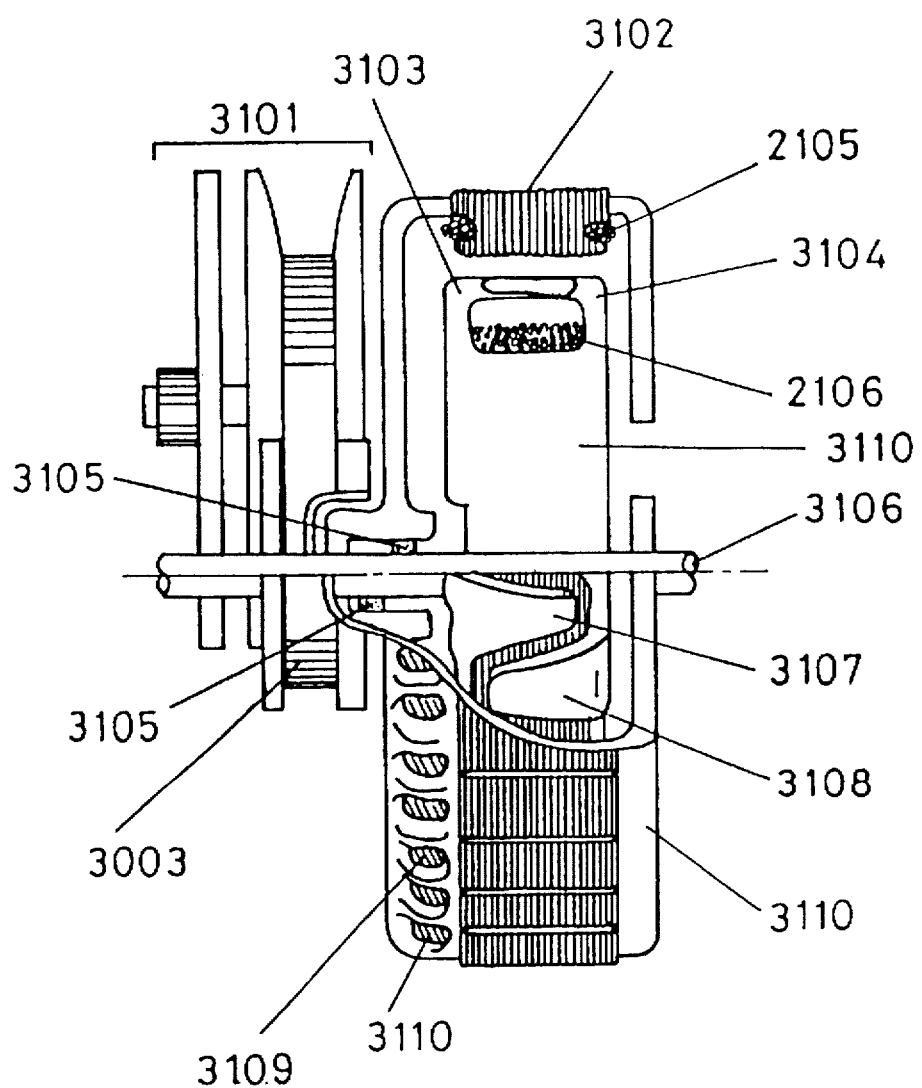
FIG. 31 is a section view showing an AC generator in Part 1 of the fourth embodiment of the present invention.

FIG. 31 is a section view showing the AC generator in Part 1 of the fourth embodiment of the present invention. The stator coil 2106 is wound around a stator (field magneton) iron core 3110 which rotates (although it is strange in terms of a language that the stator rotates, this will be explained as it is as described before) in connection with a rotor shaft 3106 to structure S (N) poles 3103 and 3107 and N (S) poles 3104 and 3108. The rotor coil 2105 is wound around a rotor (armature) iron core 3102 to surround the outer periphery of the stator without gap. The reference numeral (3105) denotes carbon brushes for taking out electrodes of the stator coils, (3003) the pulley belt, (3101 portion) a third (or fourth) gear and a speed-changing pulley, (3110) an armor. These parts will now be explained separately.

Figure 32:
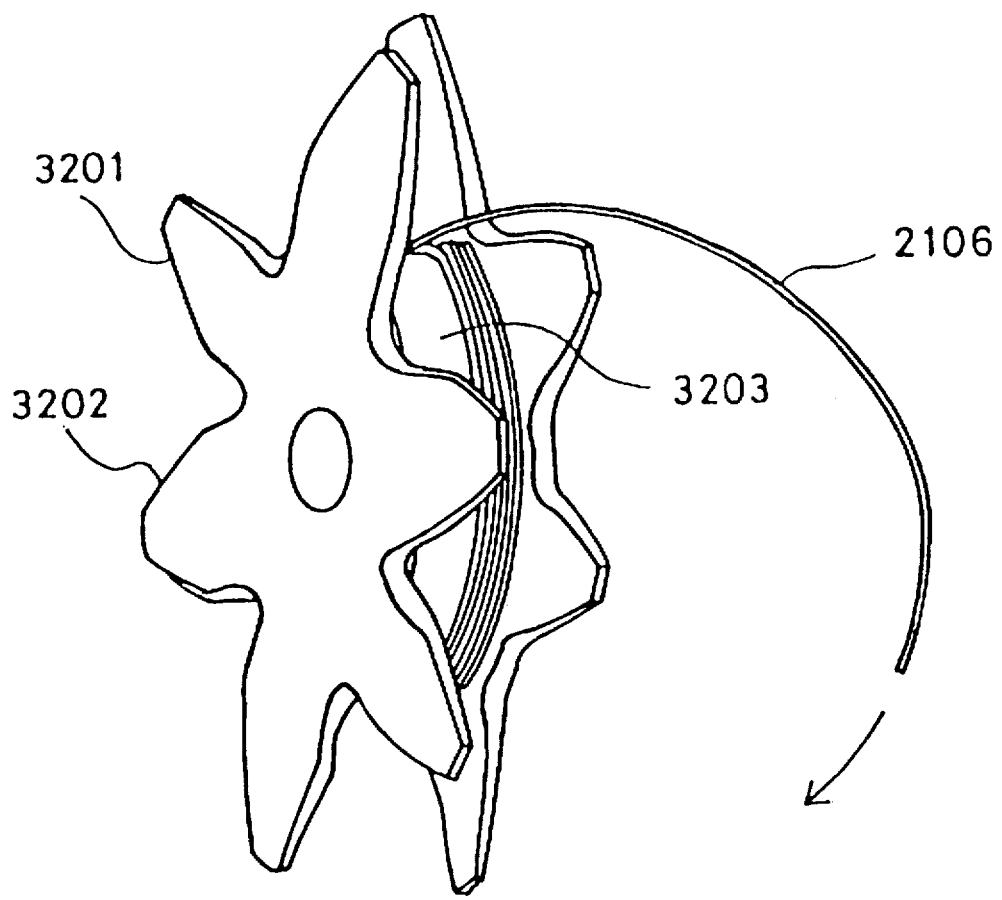
FIG. 32 is a stereographic view showing a stator (field magneton) of the AC generator in Part 1 of the fourth embodiment of the present invention.

FIG. 32 is a stereographic view showing the stator (field magneton) of the AC generator in Part 1 of the fourth embodiment of the present invention. This drawing is used because it may be readily understood by explaining together with a method how to create them. The reference numeral (3201) in the figure denotes a bobbin having six wing-like portion like a starfish on one side. Those six wings are offset so that they are nested each other with respect to positions of the both sides (it will be obvious by seeing the next drawing).

A coil wire 2106 constituting the stator coil 2106 is wound around a drum portion 3203 of the bobbin 3201. Then, the six wing portions are bent as shown in the next drawing of FIG. 23. It can be seen that six each S and N poles of the stator coil are formed alternately like S, N, S and N.

Figure 33:
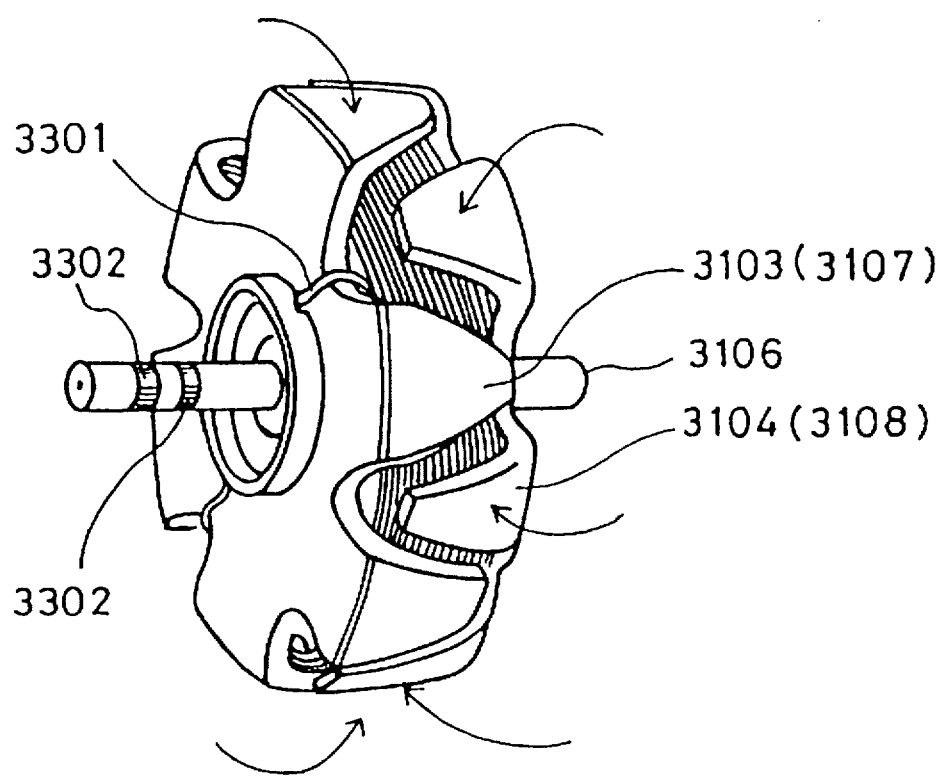
FIG. 33 is a stereographic view showing the stator (field magneton) of the AC generator in Part 1 of the fourth embodiment of the present invention.

FIG. 33 is a stereographic view showing the stator (field magneton) of the AC generator in Part 1 of the fourth embodiment of the present invention. It shows a state wherein an electrode 3302 for the carbon brush for taking out the electrode of the stator coil and the rotor shaft 3106 are mounted.

FIGS. 34a through 34d are stereographic views and others showing structures of the rotor (armature) iron core 3102 and the rotor coil 2105 of the AC generator in Part 1 of the fourth embodiment of the present invention.

Figure 34A:
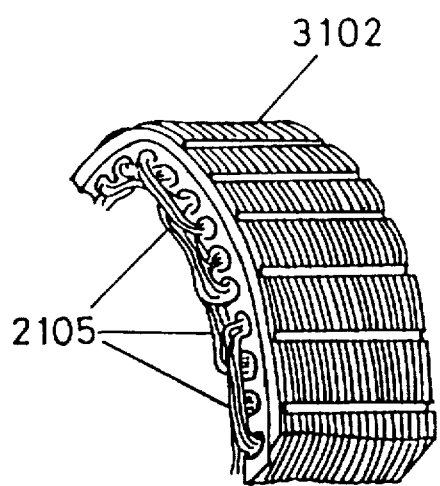
FIGS. 34a through 34d are stereographic views and others showing structures of a rotor (armature) iron core 3102 and a rotor coil 2105 of the AC generator in Part 1 of the fourth embodiment of the present invention.

FIG. 34a is a stereographic view showing a state wherein the ring rotor iron core 3102 and the rotor coil 2105 are partially cut. Thin iron plates are laminated in the rotor iron core as shown by stripes in the figure to reduce eddy current loss and the rotor coil wire is wound behind that.

Figure 34B:
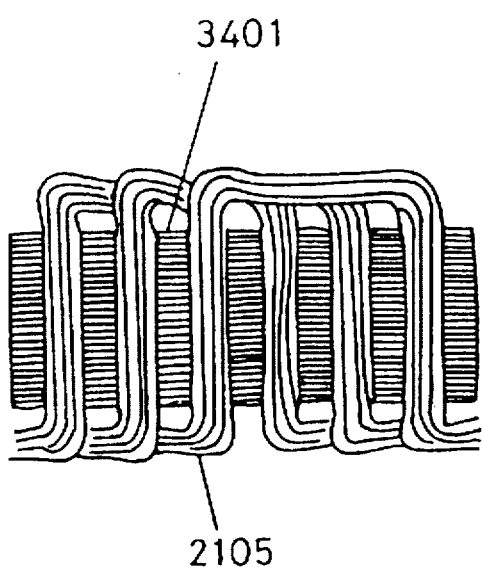

FIG. 34b shows a state of the rotor iron core 3401 and the rotor coil 2105 wound around it seen from the inside (back) thereof when they are seen as a ring.

Figure 34C:
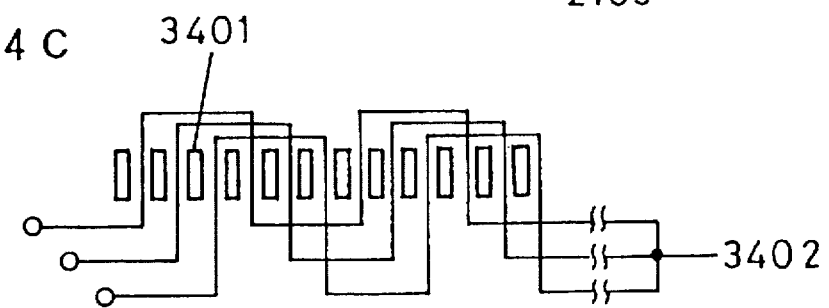

Back convex portions 3401 are formed on the rotor iron core 3102 and the rotor coil wire 2105 is wound around so as to thread between the convex portions. Since it may be difficult to understand, its state is shown in FIG. 34c as a schematic circuit connection diagram.

As shown in the figure, each coil is wound so as to thread between the convex portions 3401 like a "soki" pattern on a Chinese bowl and is connected at a connecting part 3402. Although only onefold of coil is shown to be trailing in the figure to simplify the explanation, actually it is caused to trail a plural time per one coil and after that, those three coils are connected in the end (see FIG. 34b).

Figure 34D:
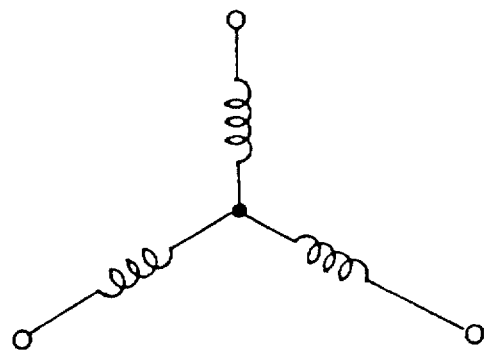

Thus the rotor coil 2105 in three-pole Y connection is constructed in a manner of equivalent circuits as shown in FIG. 34d. The rotor iron core is connected also with a metallic armor as a yoke, which covers the whole generator.

Figures 35A, 35B:
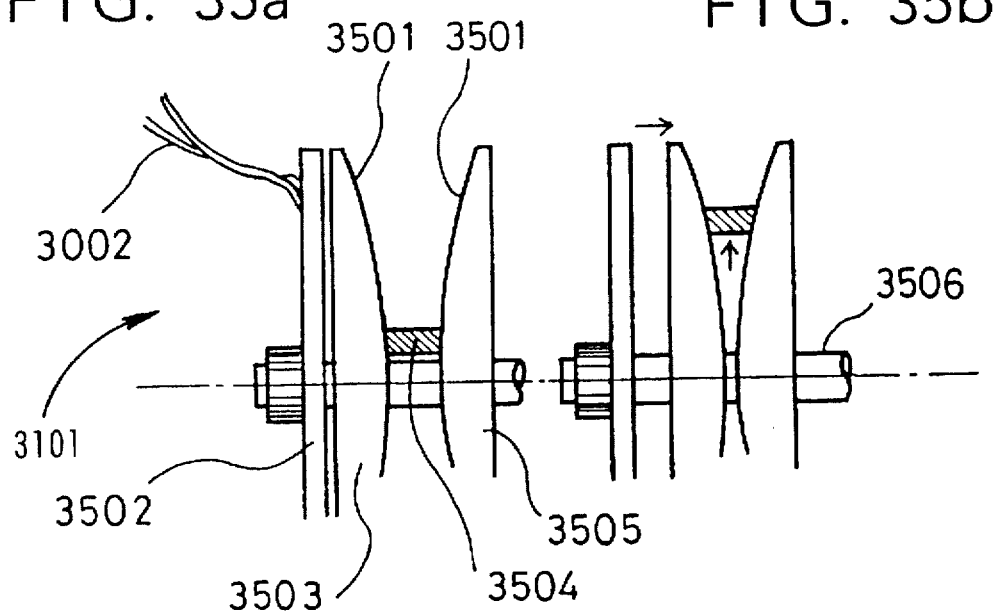
FIGS. 35a and 35b are partial section views showing a first example of a speed-changing pulley section 3101 of the AC generator in Part 1 of the fourth embodiment of the present invention.

FIGS. 35a and 35b are partial section views showing a first example of the speed-changing pulley section 3101 of the AC generator in Part 1 of the fourth embodiment of the present invention. One of tapered pulley plates 3501 is movable in the direction of the rotor shaft 3506 and when a load current $I_{OUT}$ decreases, a signal is sent via a wire 3002 for controlling the speed-changing mechanism thereby separating the movable pulley plate 3503 from a back plate 3502. A section of the pulley belt 3504 moves upward in the figure (FIG. 35b), thus increasing the multiplying factor of the gear train and shifting the spiral spring on the side of non-release.

Although the actuation for moving the movable plate by the signal for controlling the speed-changing mechanism will not be particularly specified here, it may be practical to adopt electromagnetic or thermoelectric actuation.

Figure 36:
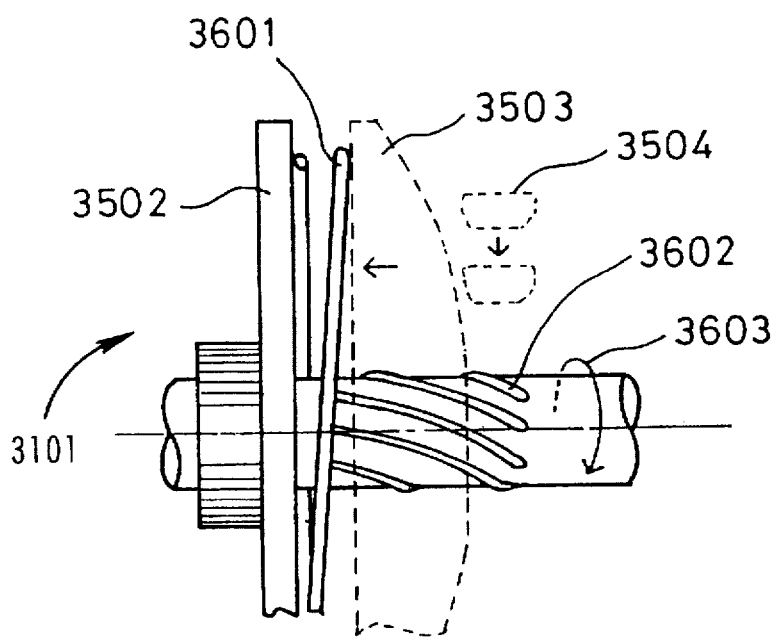
FIG. 36 is a partial section view showing a second example of the speed-changing pulley 3101 of the AC generator in Part 1 of the fourth embodiment of the present invention.

FIG. 36 is a partial section view showing a second example of the speed-changing pulley 3101 of the AC generator in Part 1 of the fourth embodiment of the present invention. When $I_F$ increases as the load current $I_{OUT}$ increases and the rotor friction increases, a tension applied on the pulley belt increases.

Then, the movable pulley plate 3502 moves in the direction of the back plate 3502 along a guide 3602 on the rotor shaft. Then, the section of the pulley belt 3504 moves downward in the figure, thus reducing the multiplying factor of the gear train and shifting the spiral spring on the side of release. This mechanism requires a certain pressure to be applied in advance by a spring 3601 or the like. A balance is taken by the pressure of the spring with the tension of the pulley belt.

Figure 37:
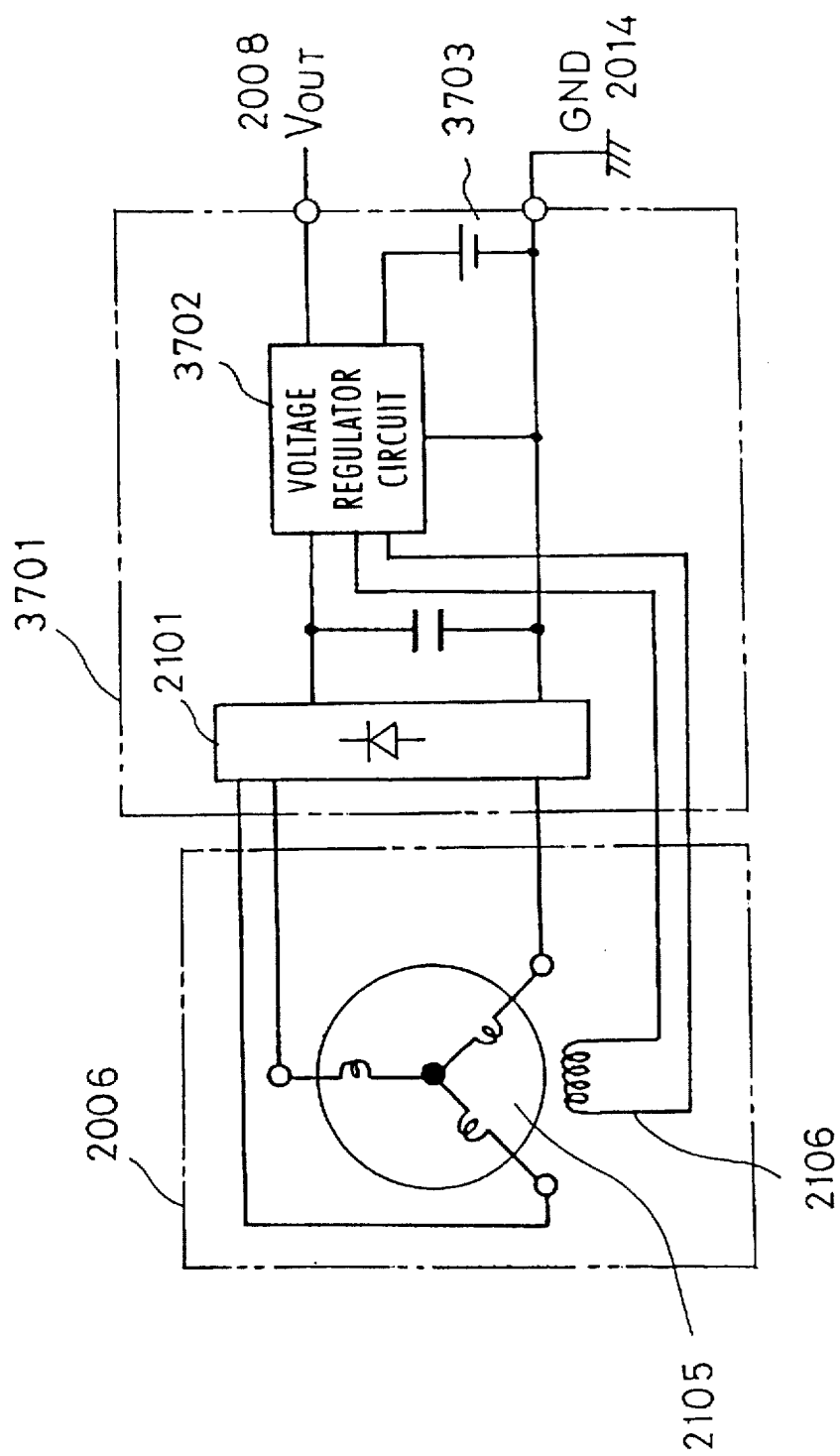
FIG. 37 is a circuit diagram showing an electrical control circuit 3701 and an AC generator 2006 in a certain variation of Part 1 of the fourth embodiment of the present invention.

FIG. 37 is a circuit diagram showing an electrical control circuit 3701 and the AC generator 2006 in a certain variation of Part 1 of the fourth embodiment of the present invention. It comprises a secondary cell 3703 for a voltage regulator circuit 3702. It is useful when the voltage regulator circuit 3702 itself is not operating before starting the control of the power generation. While a method for controlling the charge/discharge of the secondary cell will be detailed in Part 3 of the fourth embodiment described later, a structure thereof in the present embodiment is much simpler than that because no power of the secondary cell 3703 is supplied to the electrical load.

Figure 38:
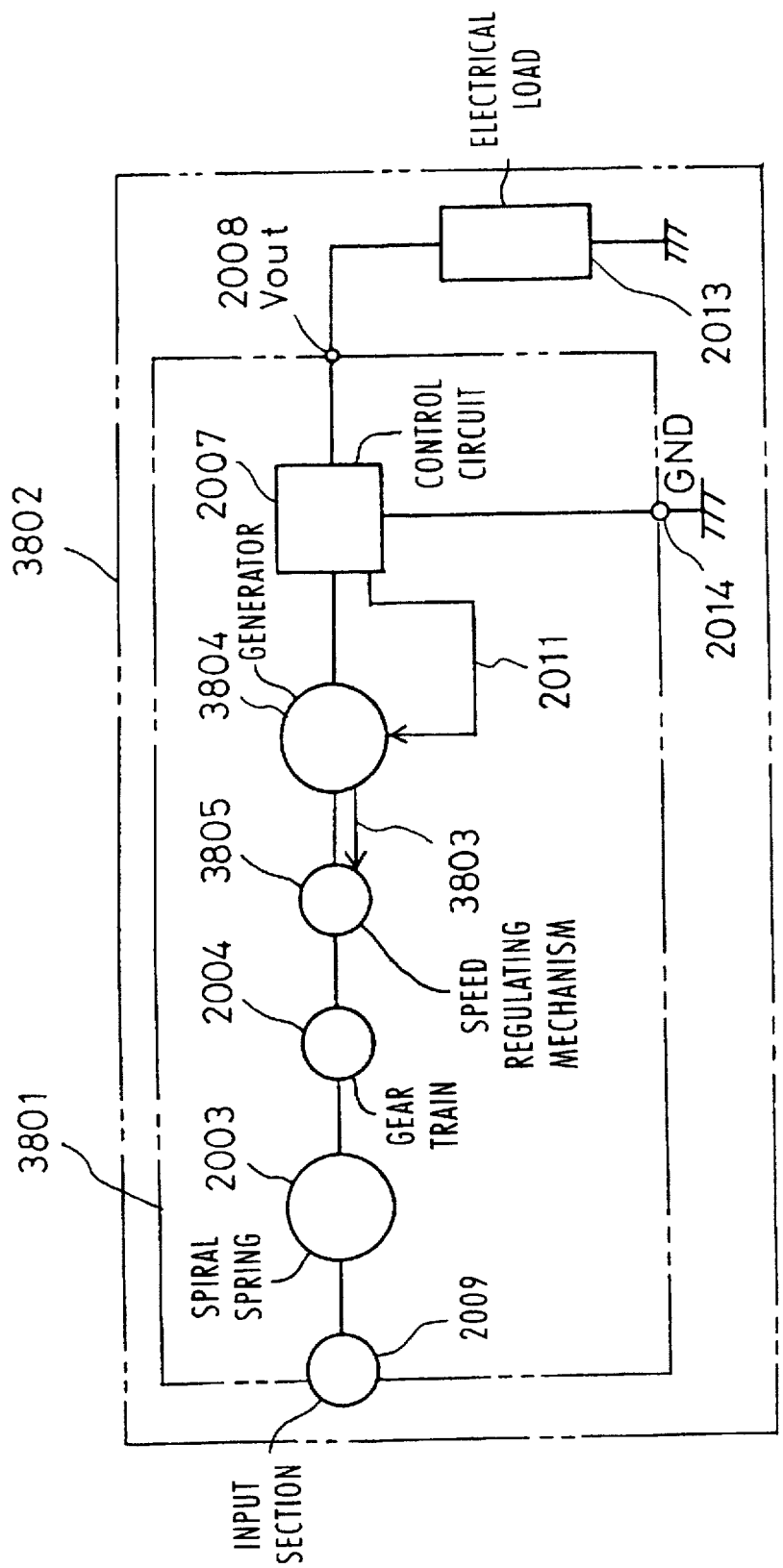
FIG. 38 is a system block diagram showing a power unit 3801 and an electronic equipment 3802 comprising the same according to Part 2 of the fourth embodiment of the present invention.

FIG. 38 is a system block diagram showing a power unit 3801 and an electronic equipment 3802 comprising the same according to Part 2 of the fourth embodiment of the present invention. The power unit 3801 comprises an input section 2009, a spiral spring 2003, a gear train mechanism 2004, a speed-changing mechanism 3805, an AC generator 3804 having a function 3803 for mechanically controlling speed-change, a control circuit 2007 having a function 2011 for controlling a field current, a $V_{OUT}$ output terminal 2008, and a GND terminal 2014. The power unit 3801 is connected to an electrical load 2013 via the Vout terminal 2008 and composes the electronic equipment 3802.

Figure 39:
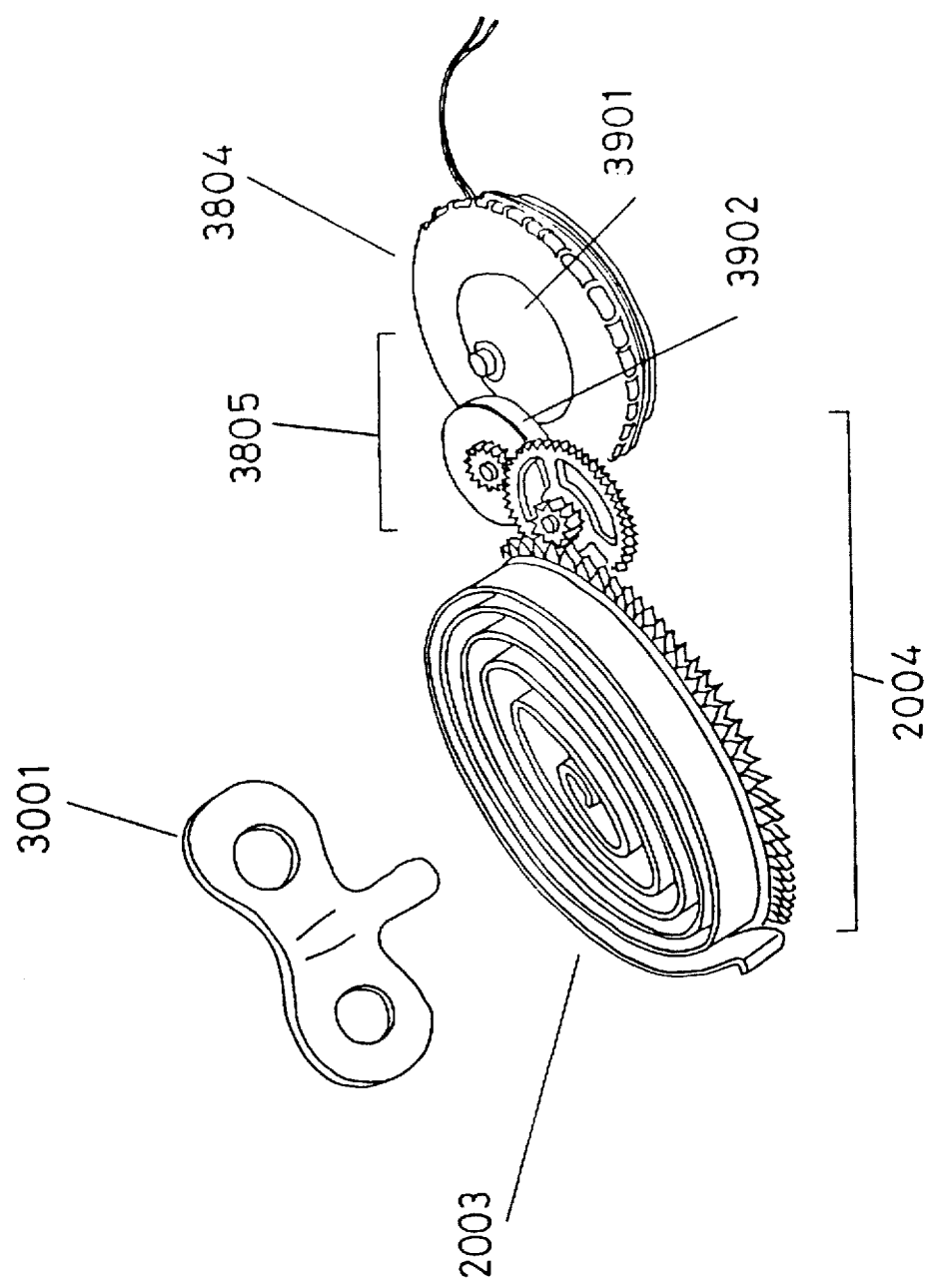
FIG. 39 is a stereographic view showing a structure of the power unit in Part 2 of the fourth embodiment of the present invention.

FIG. 39 is a stereographic view showing a structure of the power unit in Part 2 of the fourth embodiment of the present invention. In FIG. 39, the thumbscrew 3001 as the kinetic energy input means winds up the spiral spring 2003, the input means, via the mechanical connecting section (it is not shown because it is identical to that shown in the first embodiment). The gear train mechanism 2004 is connected mechanically with the speed-changing mechanism 3805 which is in turn connected mechanically with the AC generator 3804 via a planet gear 3902 and a tapered roller (speed-changing capstan) 3901.

Figure 40:
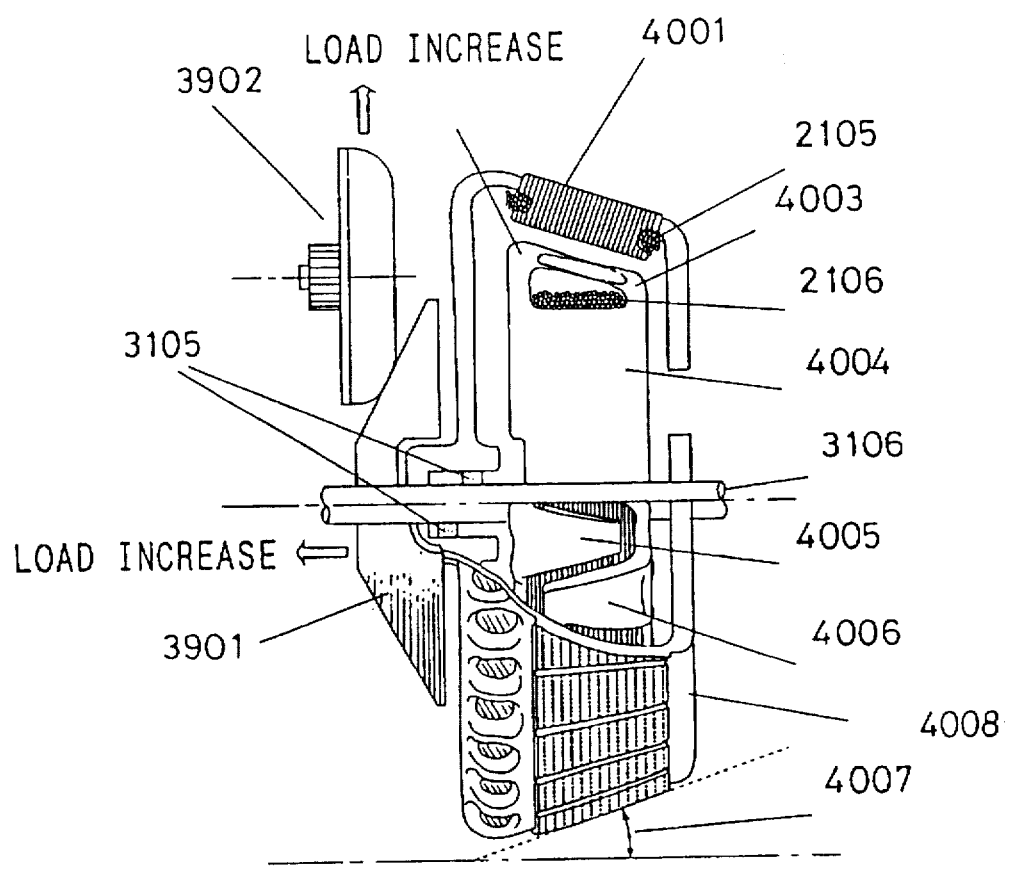
FIG. 40 is a section view showing an AC generator in Part 2 of the fourth embodiment of the present invention.

FIG. 40 is a section view showing the AC generator in Part 2 of the fourth embodiment of the present invention. When the load current $I_{OUT}$ increases, $I_F$ increases and as a result, friction between a rotor iron core 4001 and a stator iron core 4004 increases. Then, because a plane where the rotor and stator poles face has a certain taper angle 4007 to the center line of the rotor shaft as shown in the figure, a force in the left direction in the figure is generated. By constructing the tapered roller 3901 and the stator iron core 4004 so that they are secured to the rotor shaft 3106 but are movable in a body as against an armor 4008 by a certain distance in the direction of the shaft, it moves in the left direction in the figure at this time for example. Then, the planet gear 3902 is pushed upward in the figure (although it may not be adequate to call it as a planet gear, it means here that it can move up and down in the figure while being connected with the gear train mechanism of the previous stage in the figure. It is of course necessary to apply tension to it in advance to press to the tapered roller 3901 by a certain force). Then, the planet gear 3902 contacts with the tapered roller 3901 where the periphery thereof is long, thus reducing the multiplying factor of the gear train, shifting the spiral spring to the side of release and causing to generate power corresponding to the increase of the load current.

A reversal operation is carried out when the load current decreases.

It is preferable to set the taper angle 4007 at an angle between 15° and 45° from the balance with a taper (tilt) angle of the tapered roller 3901.

The reference numeral (4002 and 4005) denote S (N) poles and (4003 and 4006) N (S) poles.

Figure 41:
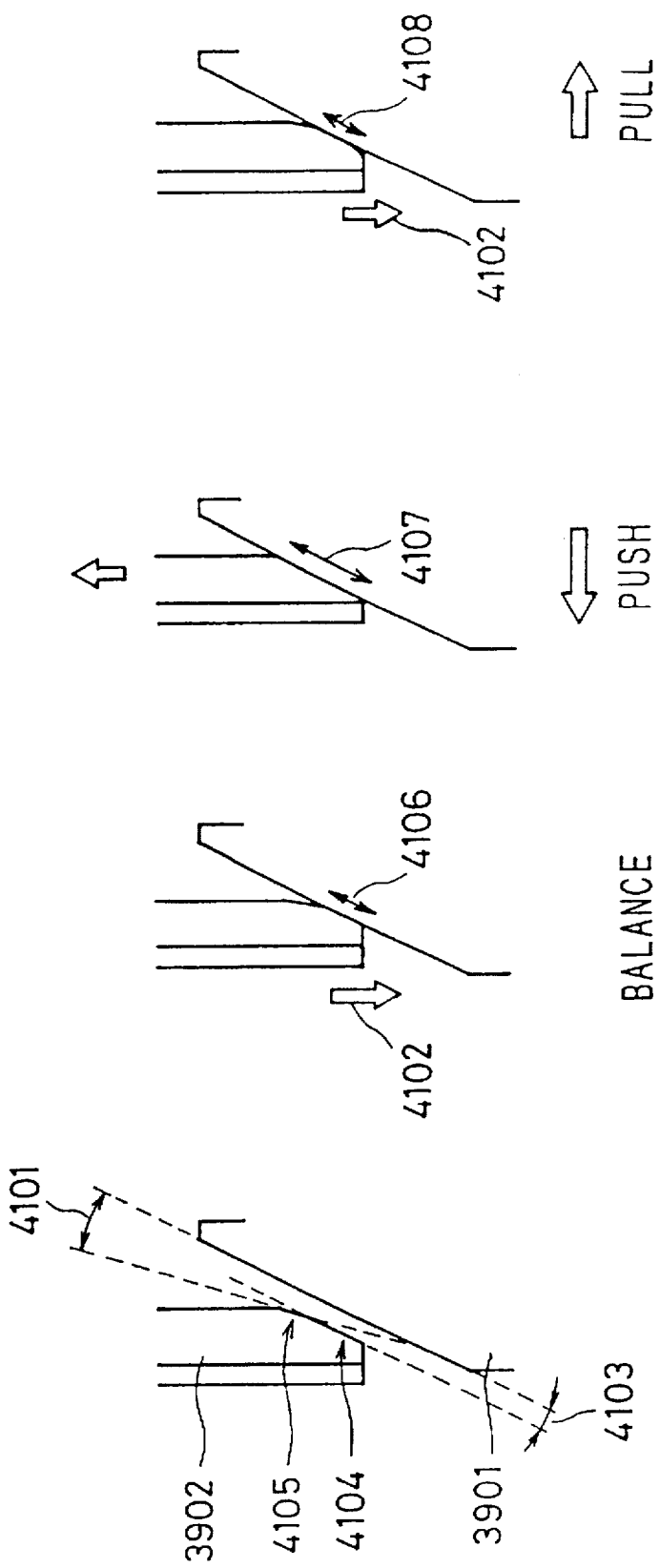
FIGS. 41a through 41d are partial section views showing a taper roller and a planet gear in the speed-changing mechanism in Part 2 of the fourth embodiment of the present invention.
Figure 42:
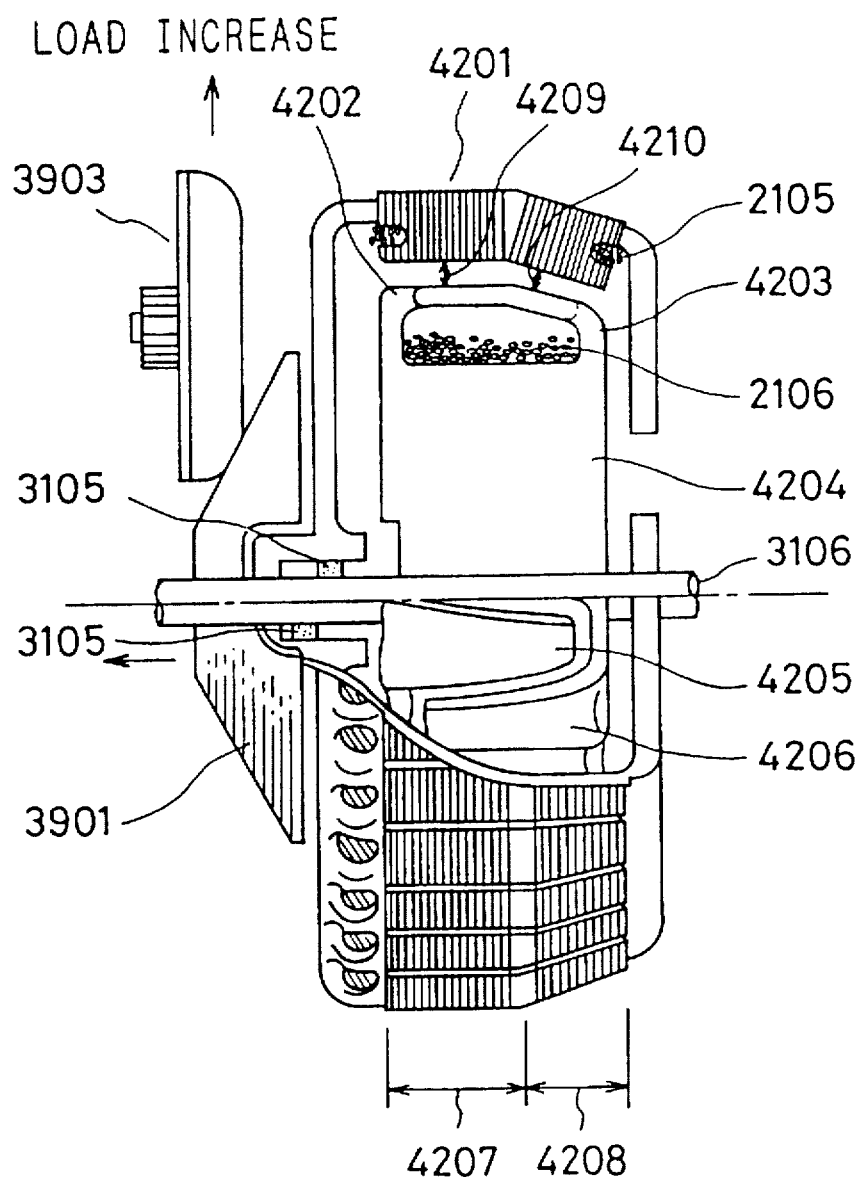
FIG. 42 is a section view showing a second AC generator in Part 2 of the fourth embodiment of the present invention.

FIGS. 41a through 41d are partial section views showing the taper roller and the planet gear in the speed-changing mechanism in Part 2 of the fourth embodiment of the present invention. While it is preferable to provide a hysteresis at points of $I_F$ and speed-change in the present embodiment as described before, the figure shows examples in implementing it mechanically. An angular relationship between the tapered roller 3901 and the planet gear 3902 is set as shown in FIG. 41a so that the taper of the planet gear 3902 have a two-stage taper, the first stage taper (slope B4105) (top side in the planet gear) is placed so as to have an angle 4101 opened toward the periphery of the tapered roller 3901 (i.e., toward the top in the planet gear) [as for their material, at least one of them (or the both if possible) has to be made of an elastic material having a high coefficient of friction such as a hard rubber. The angle is set at an angle between 5° and 30°, though it depends on its resiliency (hardness)|, and an angle 4103 of the second taper (slope A4104) (periphery side in the planet gear) is parallel or is opened with several degrees toward the top side of the tapered roller 3901. By constructing as described above, they operate as follows. In a state wherein the load current is stable, a force of the tapered roller 3901 pushing to the left in the figure due to a friction caused by $I_F$ is balanced with the tension 4102 given to the planet gear in advance as described before and a contact plane 4106 is formed |FIG. 41*b*; balanced state|. However, when the load current increases and the tapered roller 3901 tries to move to the left in the figure, the planet gear 3902 is pushed upward in the figure |FIG. 41*c*| and the contact plane expands considerably like 4107 in the figure. Then, the spot on the arrow indicating the contact plane in the figure causes the multiplying factor of the gear train to decrease, thus instantly causing the spiral spring to turn to the release side. When the load current decreases slightly from the balanced state on the other hand, the tapered roller 3901 tries to move to the right in the figure. At this time, the planet gear 3902 and the tapered roller 3901 come to contact with a pressure of the aforementioned tension 4102 minus a retracting speed of the tapered roller and the contact plane becomes smaller [FIG. 41*d*]. However, the spot on the arrow indicating the contact plane in the figure which is equivalent to the minimum multiplying factor of the gear train within the contact plane does not change from the balanced state in FIG. 41*a*. That is, it means that it does not turn to the non-release side soon. The multiplying factor of the gear train turns to the non-release side for the first time when the planet gear moves down in the figure after that. As described above, this mechanism provides the hysteresis as a speed-change by utilizing the contact of elastic materials and the deformation of its elasticity due to the change of temporary force applied thereto. While the planet gear has had the two-stage taper to simplify the explanation, it is possible to provide a continuous angular change (round) in reality. FIG. 42 is a section view showing a second AC generator in Part 2 of the fourth embodiment of the present invention. In the figure, while it is the same with the case shown in FIG. 40 described above that the plane where a rotor iron core 4201 and a stator magnetic pole 4202, 4203, 4205, 4206 has a certain angle (taper) with the rotor shaft in the tapered portion 4208, no taper angle is provided (paralleled) at a flat portion 4207 in the figure.

As described in the previous example, when the load current increases and the stator moves to the left in the figure to carry out the speed-changing function, a gap B4210 between the stator pole and the rotor iron core shown in the figure is widened, meaning that the efficiency will drop. When the structure of the present embodiment (not a small flat portion is provided) is adopted however, a gap A4209 between the stator pole and the rotor iron core does not change with respect to the move of the stator, so that the power generating efficiency will not change. The point is what kind of dimensional ratio between the flat portion and the tapered portion is appropriate and it is desirable, at least, to take the flat portion to be larger than the tapered portion, hopefully 2 to 4 times.

Figure 43:
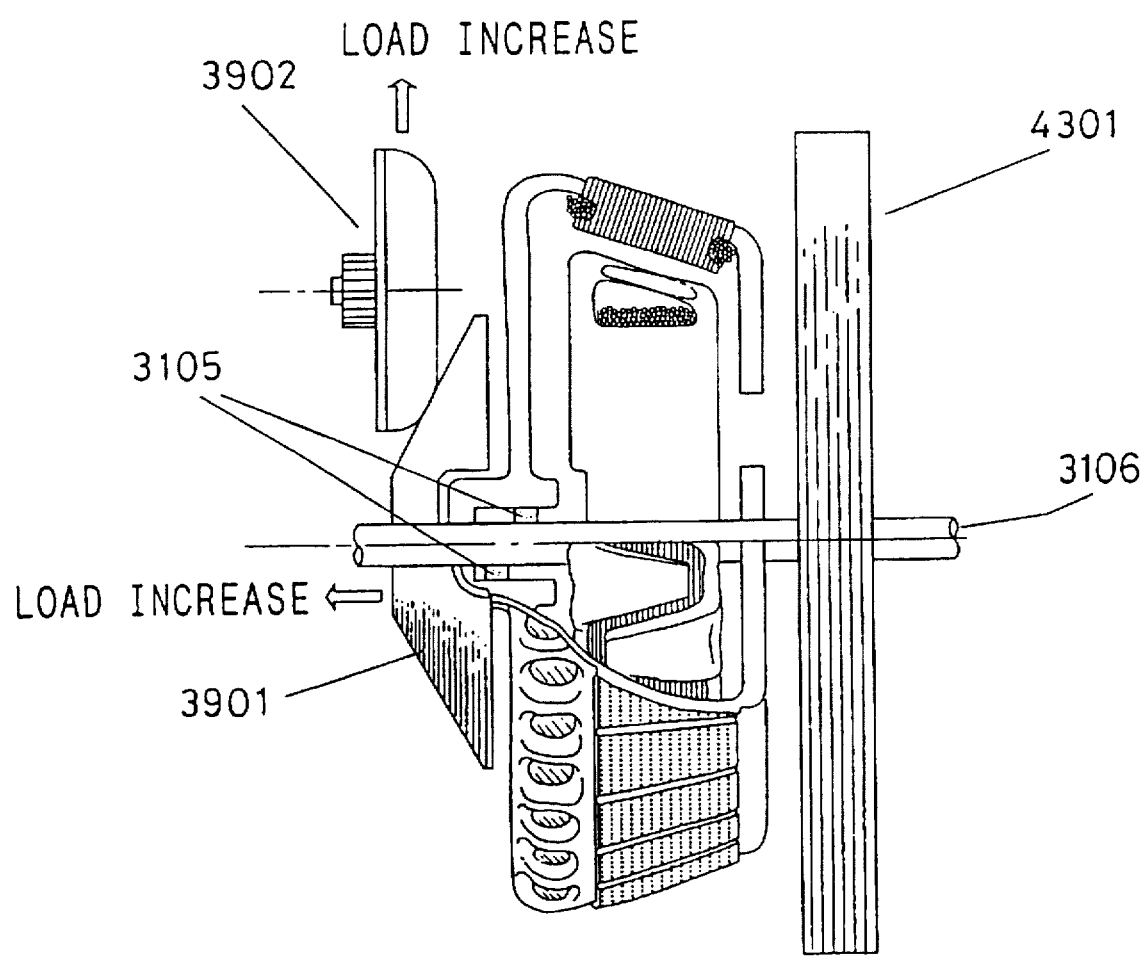
FIG. 43 is a section view showing a third AC generator in Part 2 of the fourth embodiment of the present invention.

FIG. 43 is a section view showing a third AC generator in Part 2 of the fourth embodiment of the present invention. As shown in the figure, an inertia wheel (flywheel) 4301 is attached to the rotor shaft 3106 of the AC generator. Even if there is a sharp fluctuation of a load, thus increasing $I_F$, the inertia wheel allows power to be generated meanwhile because the rotation of the rotor will not sharply drop. That is, it allows to accommodate with such sharp fluctuation of a load. However, when the speed-changing mechanism adequately operates and tries to increase the rotation of the rotor on the other hand, it takes time until the rotation is increased because the mass of the inertia wheel also must be turned. Accordingly, the existence of the inertia, size and weight thereof may be set approximately by the following design guideline:

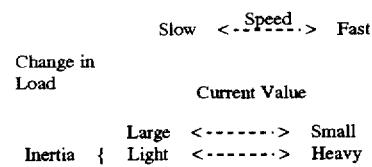

Figure 44:
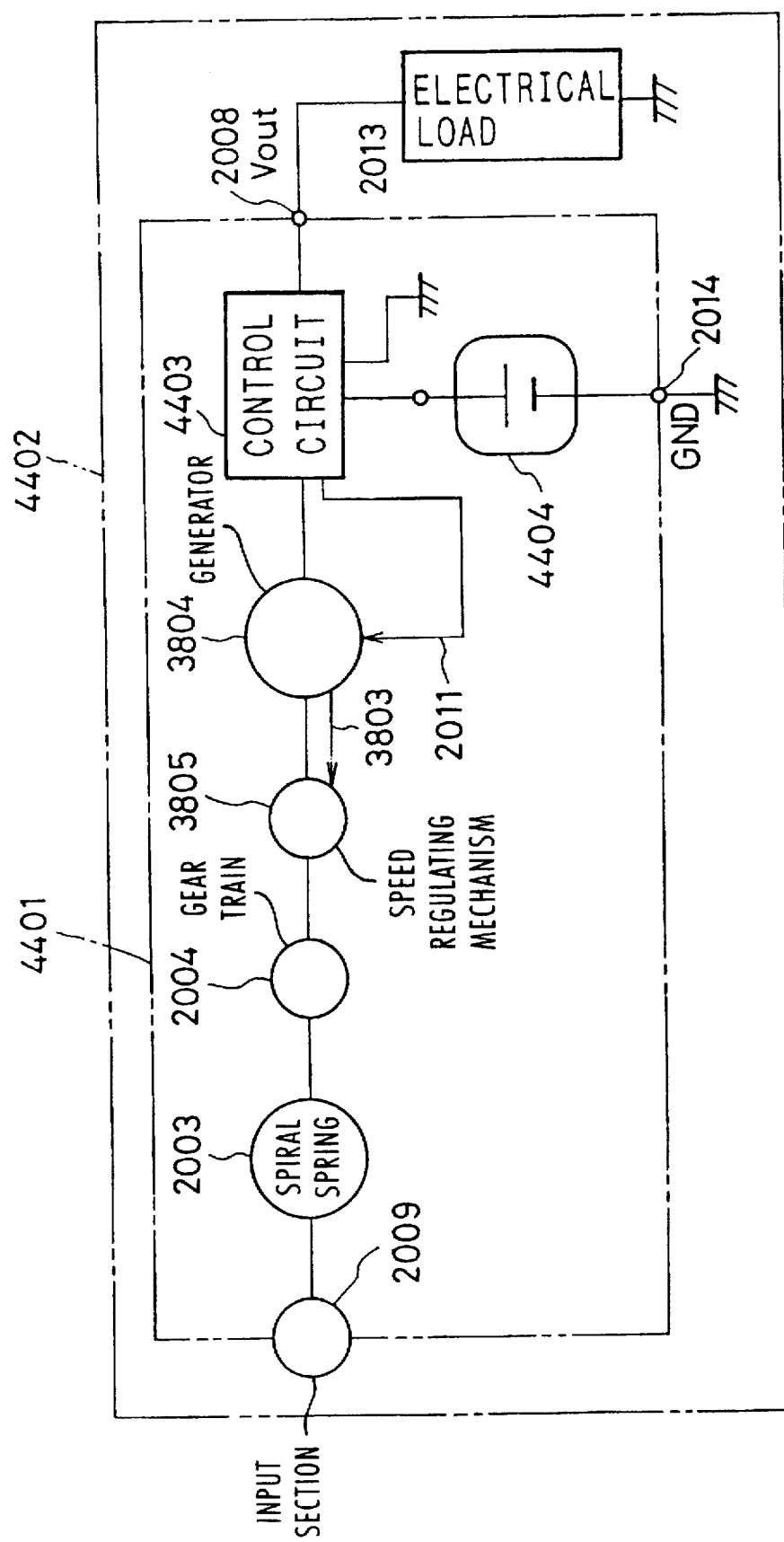
FIG. 44 is a system block diagram showing a power unit 4401 and an electronic equipment 4402 comprising the same according to Part 3 of the fourth embodiment of the present invention.

FIG. 44 is a system block diagram showing a power unit 4401 and an electronic equipment 4402 comprising the same according to Part 3 of the fourth embodiment of the present invention. The power unit 4401 comprises an input section 2009, a spiral spring 2003, a gear train mechanism 2004, a speed-changing mechanism 3805, an AC generator 3804 having a function 3803 for mechanically controlling speed-change, a control circuit 4403 having a function 2011 for controlling a field current, a $V_{OUT}$ output terminal 2008, and a GND terminal 2014. The power unit 4401 is connected to an electrical load 2013 via the Vout terminal 2008 and composes the electronic equipment 4402.

Figure 45:
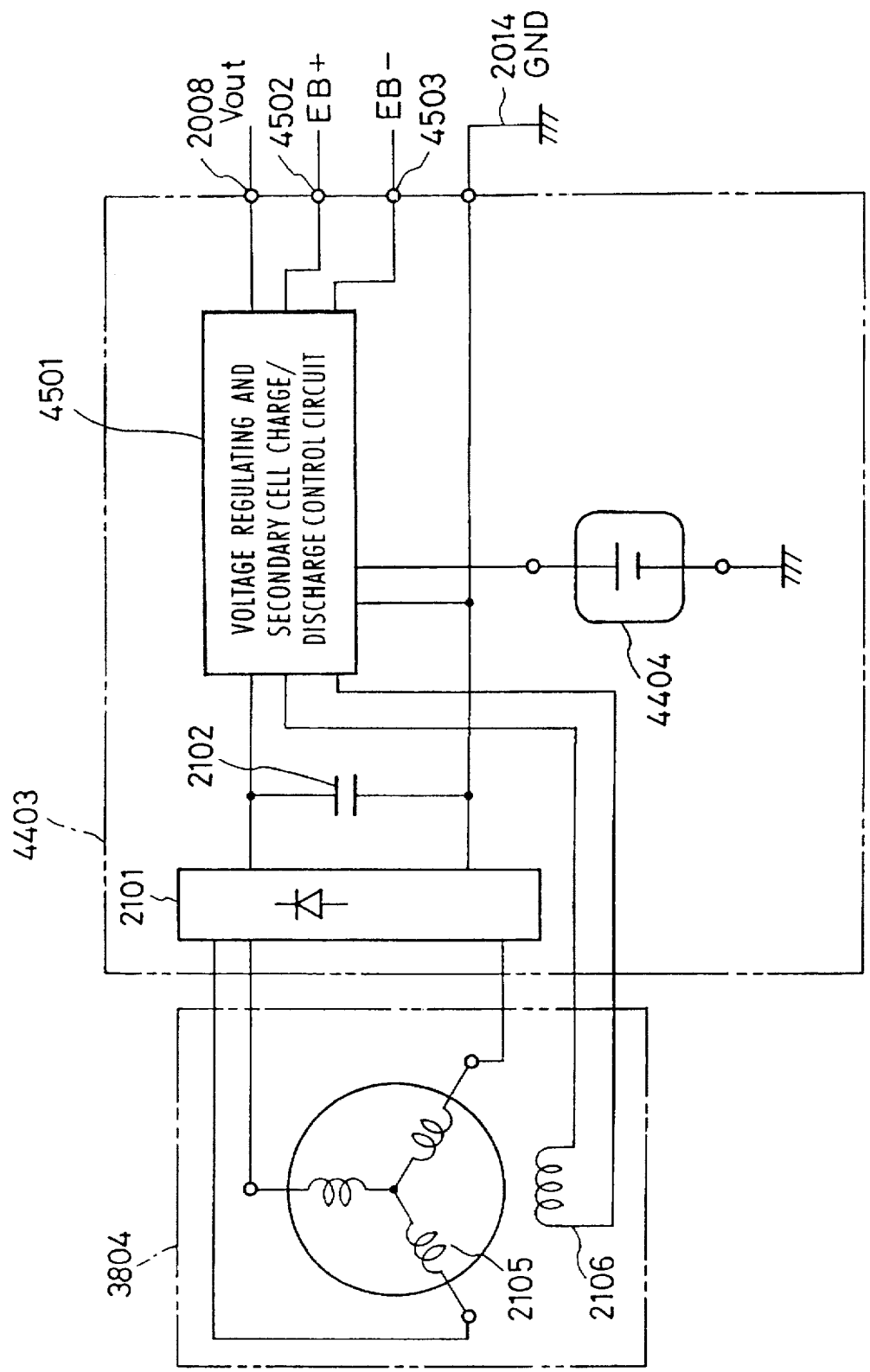
FIG. 45 is a circuit diagram showing an AC generator 3804 and an electrical control circuit 4403 in Part 3 of the fourth embodiment of the present invention.

FIG. 45 is a circuit diagram showing an AC generator 3804 and its electrical control circuit 4403 in Part 3 of the fourth embodiment of the present invention. The control circuit 4403 comprises, in addition to parts described in the previous embodiments, a voltage regulating and secondary cell charge/discharge control circuit 4501 having terminals EB+ 4502 and EB– 4503 for charging a secondary cell from the outside and the secondary cell 4404. Although the secondary cell is drawn within the control circuit 4403 in the figure as if it is included therein and may give an impression that it contradicts with FIG. 44, it is not a problem because the secondary cell is removable as described before. It may be drawn as such for the convenience of the explanation.

Figure 46:
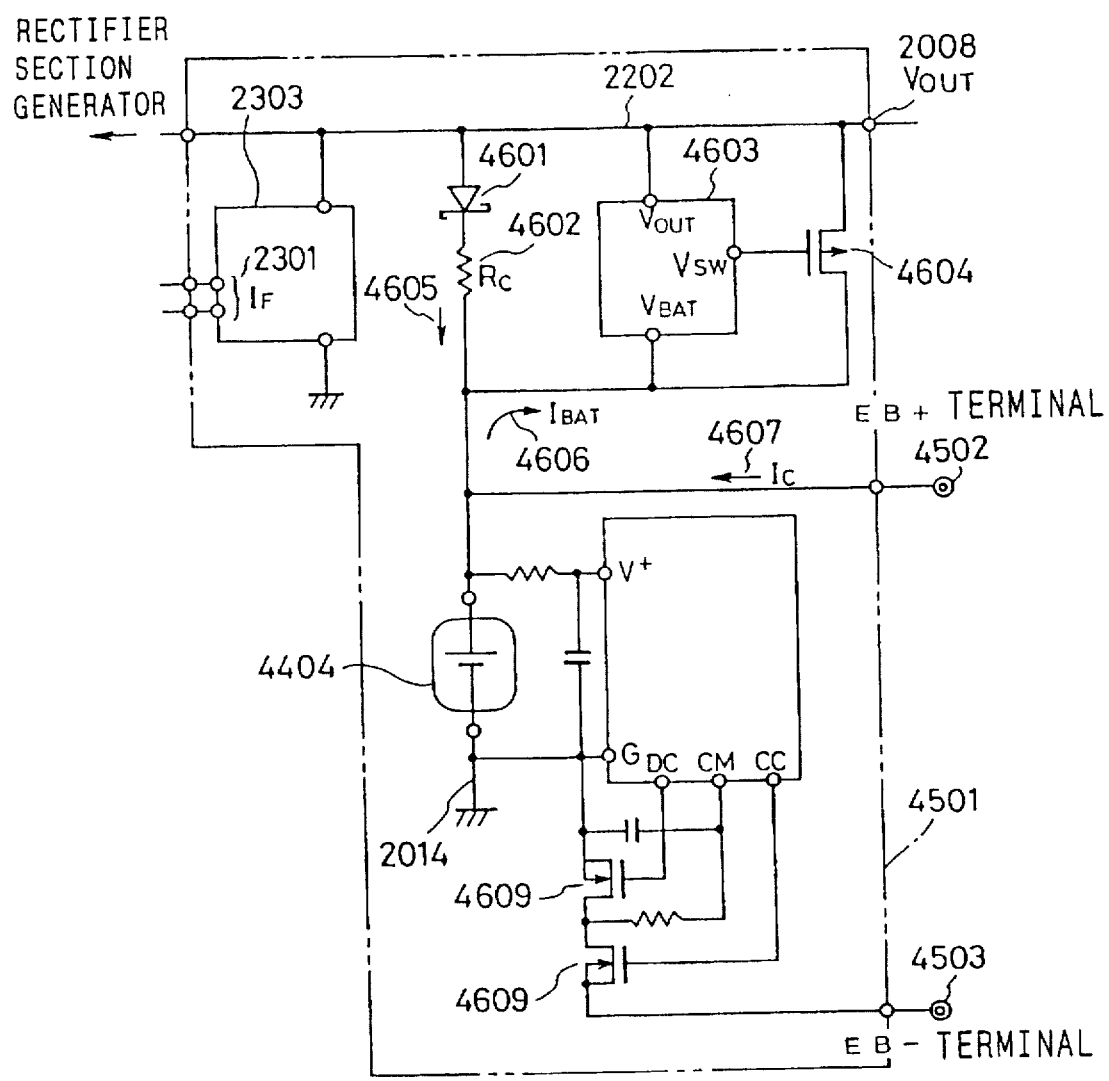
FIG. 46 is a circuit diagram showing a voltage regulating and secondary cell charge/discharge control circuit 4501 in Part 3 of the fourth embodiment of the present invention.

FIG. 46 is a circuit diagram showing the voltage regulating and secondary cell charge/discharge control circuit 4501 in Part 3 of the fourth embodiment of the present invention. It comprises the SWR circuit 2103 having an $I_F$ terminal 2301 (as shown in the first embodiment, it is connected between the $V_{OUT}$ 2008 and the rectifier section 2101 on the Vdd line when the series regulator is used), a Schottky diode for preventing a reverse current (a MOS transistor may be used as described before), a control resistor Rc for charging the secondary cell trickly, a secondary cell 4404 (a Li ion type secondary cell having less memory effect is preferable when trickle charge is carried out). While one cell type system is shown in the figure, the same system structure may be used for two cell type or three cell type system), a generator/secondary cell output switching, voltage monitoring and switching circuit 4603 having a function of monitoring a voltage $V_{OUT}$ from the generator and a voltage $V_{BAT}$ from the secondary cell and supplying the current $I_{BAT}$ 4606 from the secondary cell by turning an output switching P-channel MOS transistor 4604 when the load current increases and $V_{OUT}$ from the generator reduces (when a voltage is applied to the EB+ 4502 and EB– 4503 terminals to charge the secondary cell 4404 from the outside, e.g., from an AC/DC adaptor, 5 to 7 V is applied to one Li ion secondary cell (one cell voltage=3.6 V) and 12 to 18 V or up to 24 V of voltage is applied to two cells (charging current Ic 4607 represents a current from the outside in such case), so that it has a function of turning off the output switching transistor 4604 in such case), and a secondary cell charge/discharge control circuit 4608 to prevent an overdischarge when the load current is supplied from the secondary cell or an overcharge when the secondary cell is charged via the EB+ 4502 and EB– 4501 terminals from the outside (it leads to deterioration and destruction of the secondary cell) (this circuit also controls a plurality of N channel MOS transistors 4609 for driving a charging current used when the secondary cell is charged by a voltage from the outside).

Figure 47:
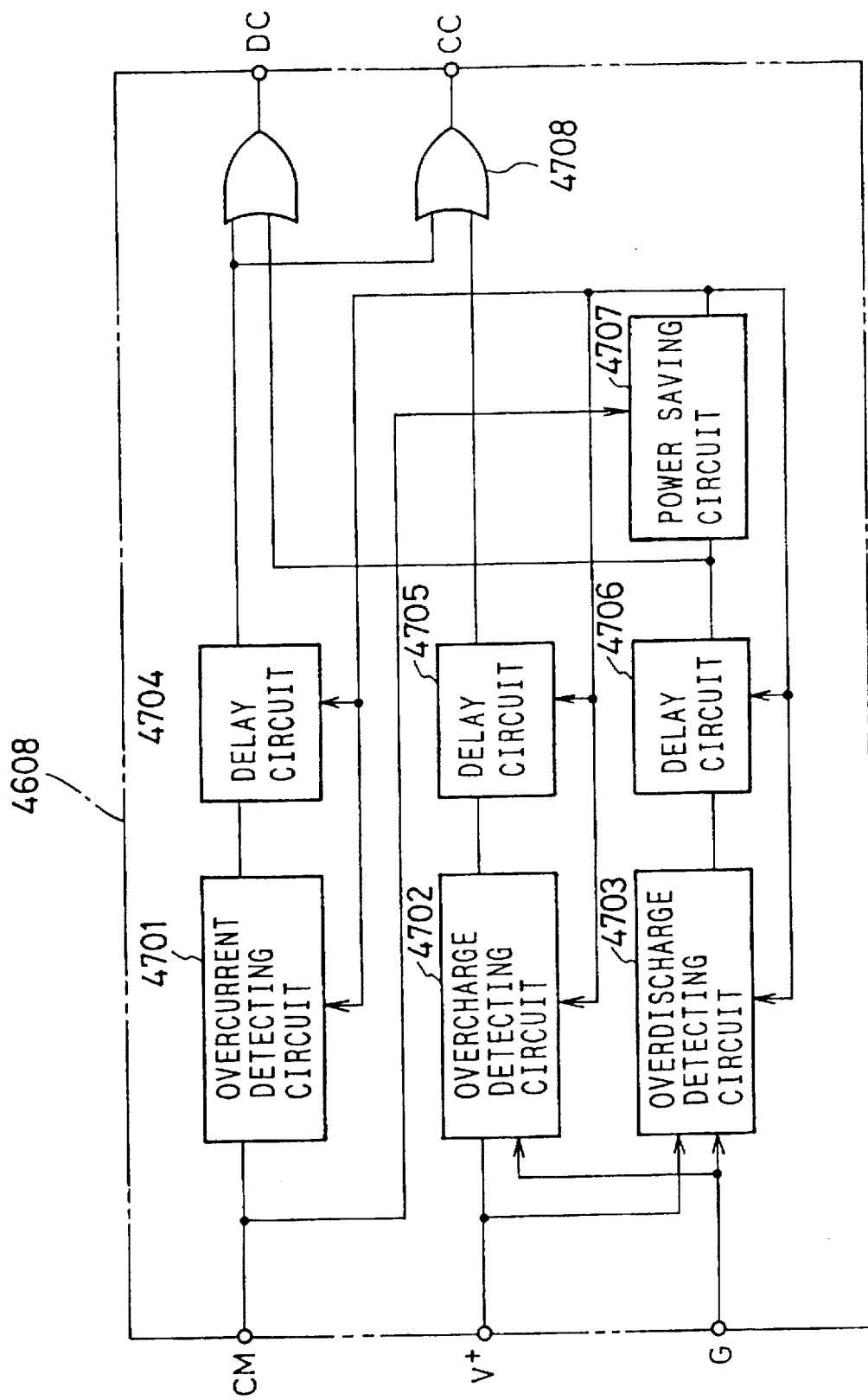
FIG. 47 is a system block diagram showing a secondary cell charge/discharge control circuit 4608 in Part 3 of the fourth embodiment of the present invention.

FIG. 47 is a system block diagram showing the secondary cell charge/discharge control circuit 4608 in Part 3 of the fourth embodiment of the present invention. It comprises an overcurrent detecting circuit 4701 and an overcharge detecting circuit 4702. They are connected to control terminals of the charging current driving transistors 4609, respectively via delay circuits 4704, 4705 and 4706 and via OR logic 4708. The reference numeral (4707) denotes a power saving circuit.

Figure 48:
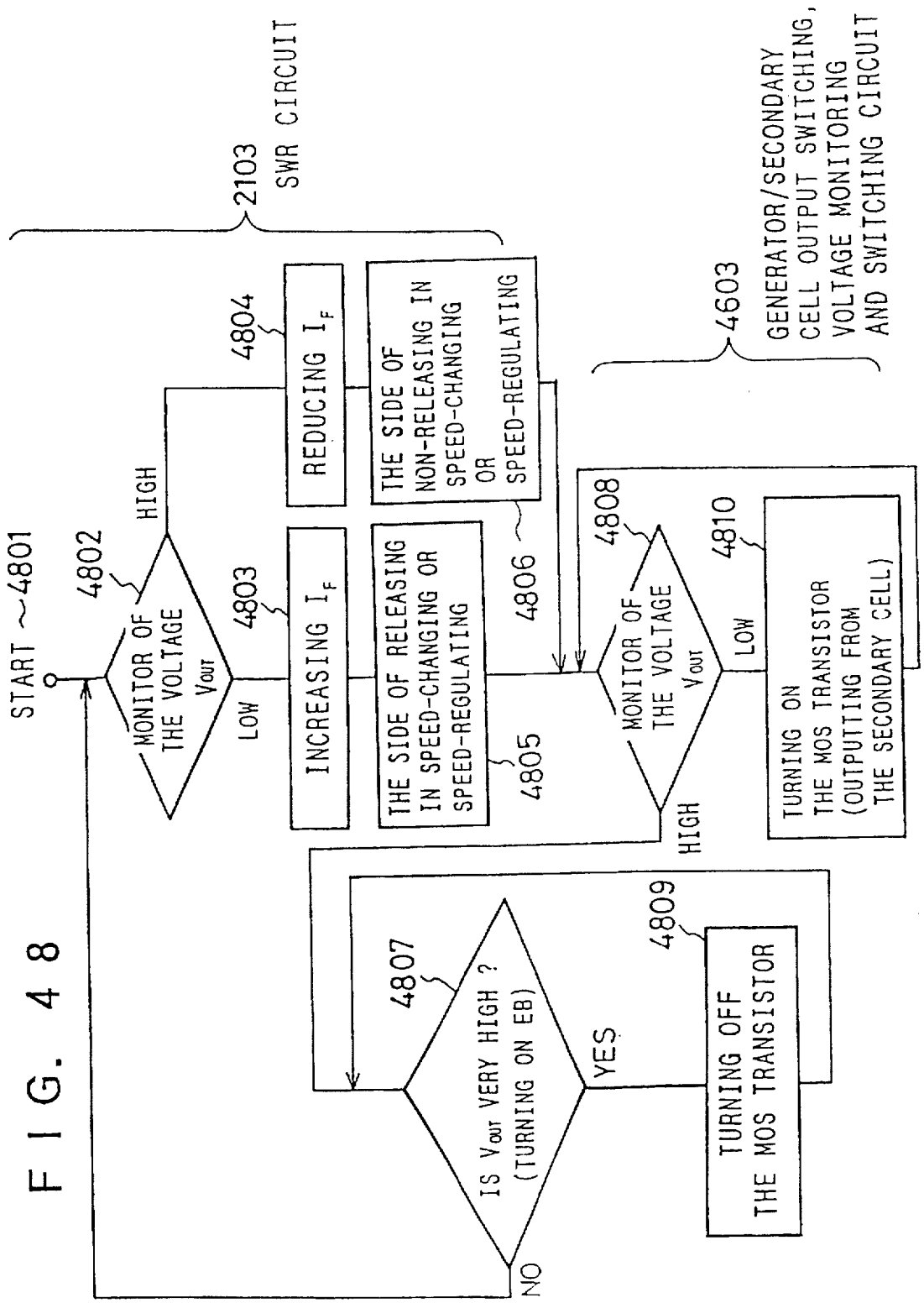
FIG. 48 is a control flowchart showing operations of the generator, secondary cell output switching and voltage monitor switching circuit 4603 in conjunction with that of the SWR circuit 2103 in Part 3 of the fourth embodiment of the present invention.

FIG. 48 is a control flowchart showing operations of the generator/secondary cell output switching, voltage monitoring and switching circuit 4603 in conjunction with that of the SWR circuit 2103 in Part 3 of the fourth embodiment of the present invention. The SWR circuit 2103 monitors the voltage $V_{OUT}$ (4802) and when it drops, it increases $I_F$ as described before in various occasions (4803). Then, it turns the speed-changing mechanism or speed-regulating mechanism to the side of releasing the spiral spring (4805). When $V_{OUT}$ becomes high, it reduces $I_F$ (4804), thereby turning the speed-changing mechanism or speed-regulating mechanism to the side not releasing the spiral spring (4806). Following to that, the generator/secondary cell output switching, voltage monitoring and switching circuit 4603 also monitors $V_{OUT}$ (here, this circuit itself is constructed so that it can operate by receiving either $V_{OUT}$ or $V_{BAT}$ as its own power supply) (4808) and when it is low, it turns on the MOS transistor 4604 (4810) to supply the load current $I_{BAT}$ 4606 from the secondary cell to $V_{OUT}$. When it is high, it determines whether the voltage is what an external voltage is applied to the EB+ 4502 and EB– 4503 or not (4807) (its criterion can be 5 V in the case of one Li ion cell and 10 V in the case of 2 cells). If the charging voltage is applied from the outside, it turns off the MOS transistor 4604 (4809). Otherwise (if voltage $V_{OUT}$ is in between 3 to 5 V in the case of one cell), the process returns to START 4801.

Figure 49:
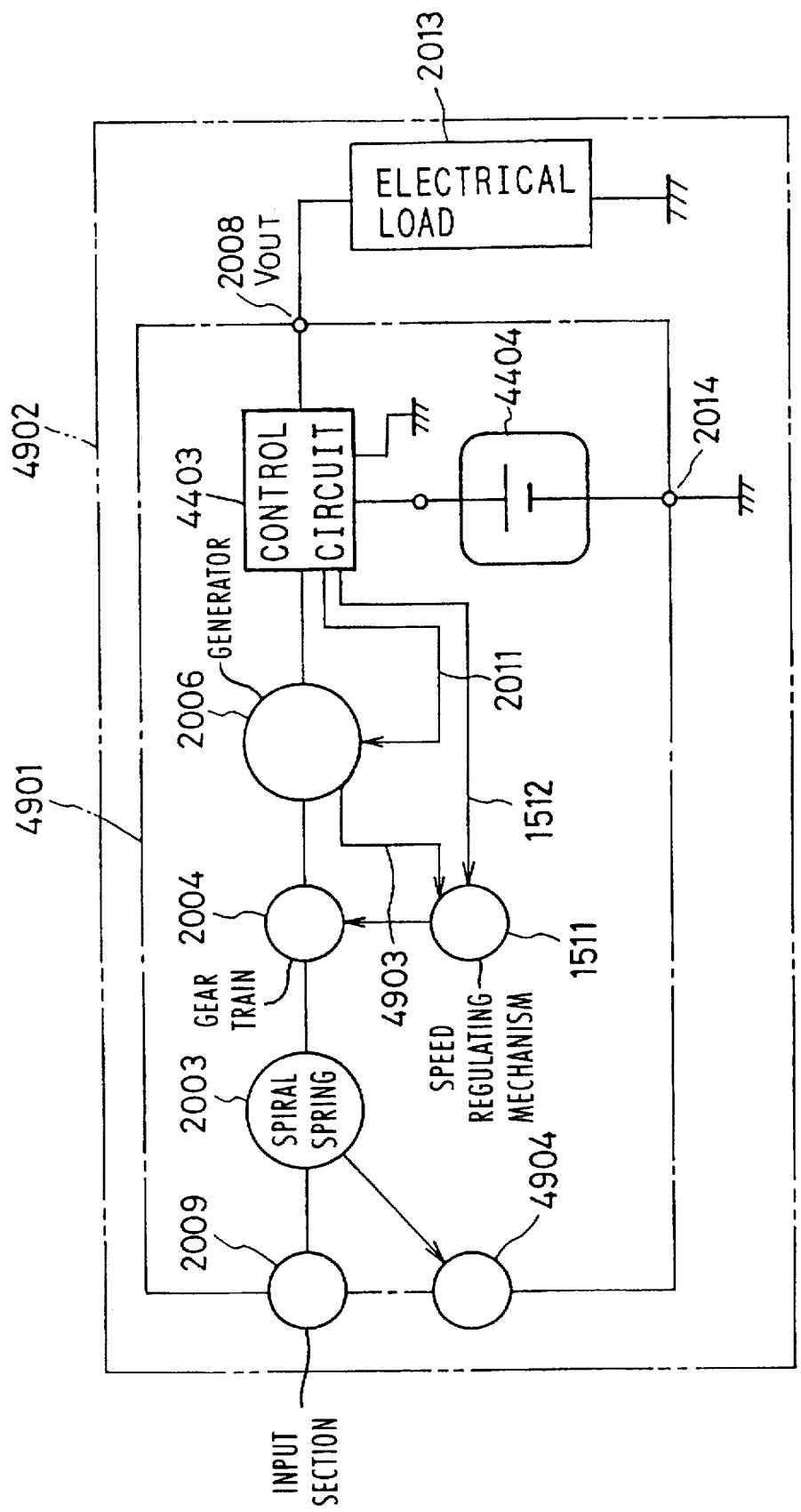
FIG. 49 is a system block diagram showing a power unit 4901 and an electronic equipment 4902 comprising the same according to Part 4 of the fourth embodiment of the present invention.

FIG. 49 is a system block diagram showing a power unit 4901 and an electronic equipment 4902 comprising the same according to Part 4 of the fourth embodiment of the present invention. The power unit 4901 comprises an input section 2009, a spiral spring 2003, a gear train mechanism 2004, a speed-regulating mechanism 1511, an AC generator 2006 having a function 4903 for mechanically controlling the speed-regulating mechanism, a control circuit 4403 having functions of controlling a field current and of electrically controlling the speed-regulating mechanism, a $V_{OUT}$ output terminal 2008, and a GND terminal 2014. The power unit 4901 is connected to an electrical load 2013 via the Vout terminal 2008 and composes the electronic equipment 4902. Although the mechanical speed-regulating mechanism 1511 and the electrical speed-regulating function 1512 are described together in the figure for the convenience of the explanation, just either one of them needs to be incorporated in reality.

Figure 50:
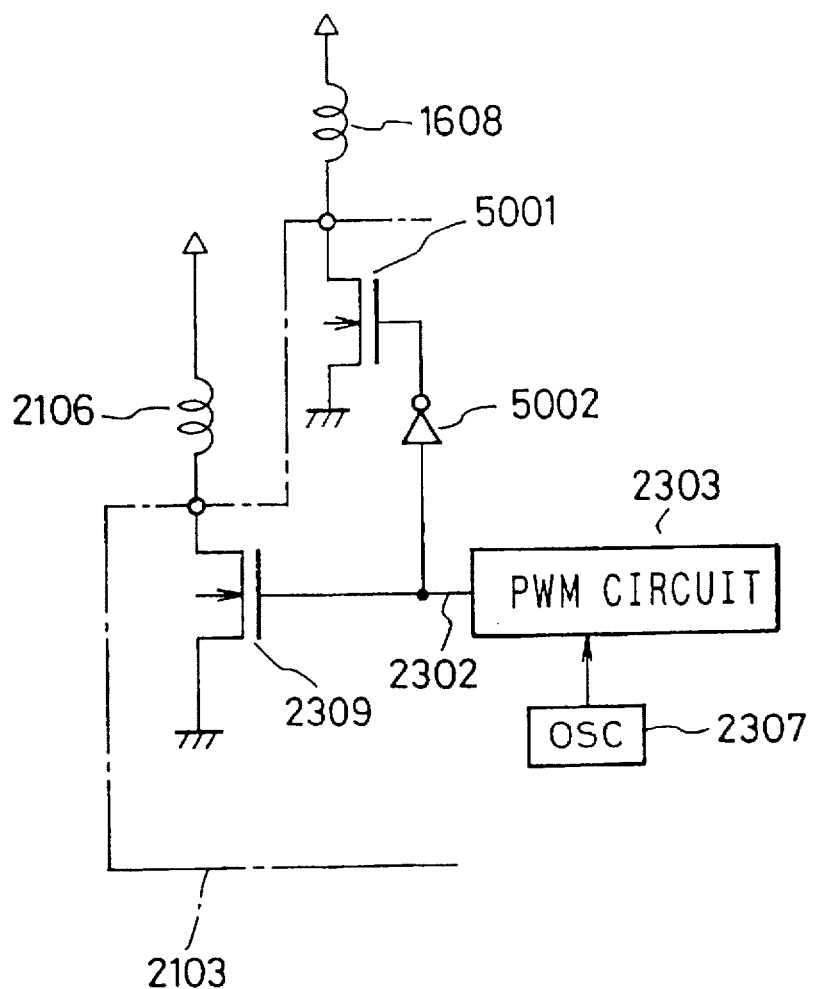
FIG. 50 is a circuit diagram showing a logic of a circuit, within a control circuit 4402, for driving an electrical speed-regulating mechanism control function 1512 in Part 4 of the fourth embodiment of the present invention.
Figure 51:
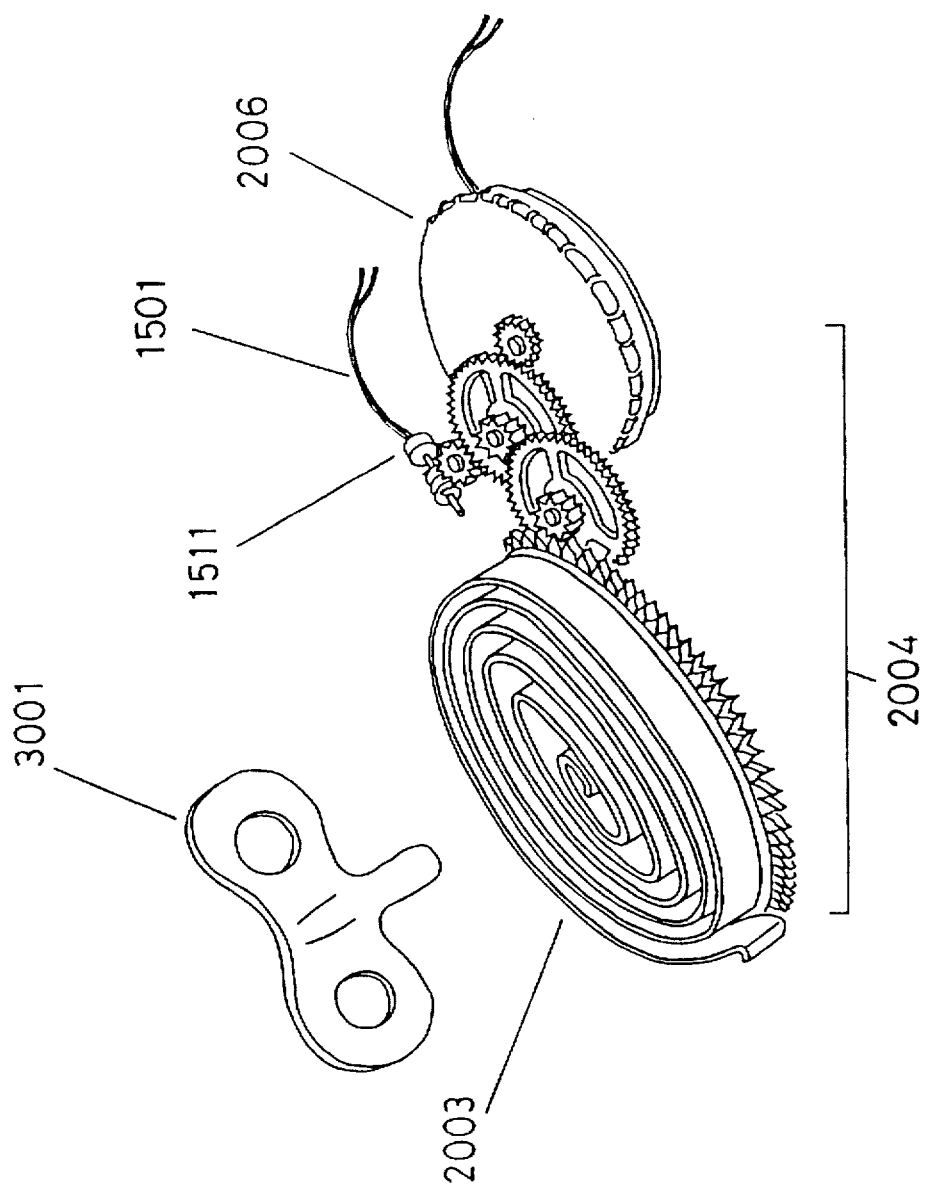
FIG. 51 is a stereographic view showing a structure of a power unit in Part 4 of the fourth embodiment of the present invention.

FIG. 50 is a circuit diagram showing a logic of a circuit, within the control circuit 4402, for driving the function 1512 for electrically controlling the speed-regulating mechanism in Part 4 of the fourth embodiment of the present invention. The mechanical structure of the speed-changing mechanism 1511 is identical with that explained in Part 2 of the second embodiment of the present invention (FIGS. 16a through 16c). A $V_F$ output 2302 of the PWM circuit 2303 within the SWR circuit 2103 of the present embodiment drives an $I_F$ drive transistor 2309 and the output $V_F$ becomes a logic for driving the MOS transistor 5001 for driving the speed-regulating coil 1608 via an inverter 5002. FIG. 51 is a stereographic view showing a structure of the power unit in Part 4 of the fourth embodiment of the present invention. The thumbscrew 3001 as the kinetic energy input means winds up the spiral spring 2003, the input section 2009, via a mechanical connector section (not shown because it is identical with that shown in the first embodiment). The gear train mechanism 2004 is connected mechanically with the speed-regulating mechanism 1511. When the electrical control 1512 of the speed-regulating mechanism is to be carried out, it is connected to the control circuit 4403 via the speed-regulating mechanism control wiring 1501. Here, the AC generator 2006 which has been explained in Part 1 of the fourth embodiment of the present invention (typified in FIG. 31) is used.

Figure 52:
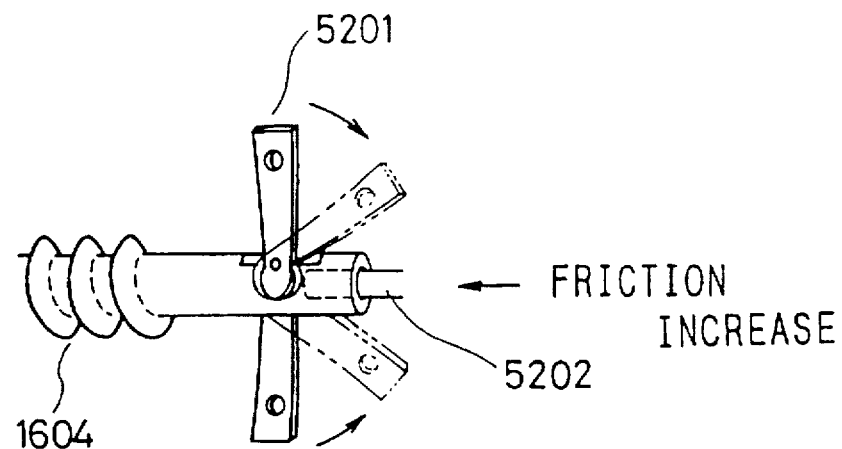
FIG. 52 is a stereographic view showing a mechanical speed-regulating mechanism control 4903 in Part 4 of the fourth embodiment of the present invention.

FIG. 52 is a stereographic view showing the mechanical speed-regulating mechanism control 4903 in Part 4 of the fourth embodiment of the present invention. While the stator has been moved when the load current $I_{OUT}$ increases in the AC generator explained in Part 2 of the fourth embodiment of the present invention, if the move is transmitted mechanically to a rod 5202 in the figure, a movable wind mill 5201 moves in the direction where it is folded. Then, resistance of wind decreases, thus releasing the spiral spring.

While the example in which the AC generator is SWR (switching regulator) controlled has been mainly explained in the fourth embodiment, it may be also necessary to have the series regulator explained in the first embodiment together with it and it may be necessary or essential in a system structure to have the function of preventing reverse current (Schottky diode, MOS transistor, series regulator, etc.) and a flywheel diode.

While several embodiments have been explained so far, several examples in which the present invention is applied to actual electronic equipments will be shown as image-wise outside views. However, before that, the present invention has several features and applications beside them, so that they will be listed at first.

While power voltage of an electronic equipments is becoming low from 12 V system to 5 V system, from 5 V system to 3 V system and from 3 V system to 1.5 V system, the inventive power unit exhibits its effect more in the lower power voltage system because the lower the voltage, the smaller the generator can be. Accordingly, it exhibits its power most practically in the 3.5 V or 1.5 V system.

Because the inventive power unit is constructed so as to have various control circuits as described above, it is useful for the recent electronic equipments even if they are constructed so as to have multi-system (plural) power outputs (e.g., 12 V, 5 V, 3.5 V, 1.5 V).

Similarly, it is also possible to provide the control circuit with a function (system watchdog, reset function) of resetting a microcomputer or the like on the system side by checking a drop of a power voltage (although the lower limit of the operating power voltage of the control circuit itself has to be fully lower than a system reset voltage) or is possible to provide with an output drawing characteristic (fold-back characteristic) to stop the output when the load shorts.

The discharge characteristic is ideal (regulated to constant voltage) of course. Accordingly, when the inventive power unit is used in place of the prior art dry cell, it becomes unnecessary to prepare various circuits (e.g., voltage regulator, power on reset, battery low reset, battery low indicator, etch), i.e., a so-called power IC, for manipulating power supply on the system side (electronic equipment side).

Figure 53:
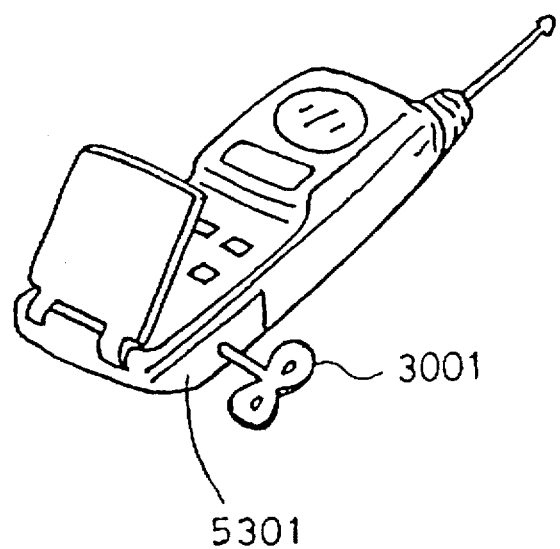
FIG. 53 is a sketch drawing showing a state wherein the inventive power unit is applied to a portable phone or a PHS.
Figure 54A:
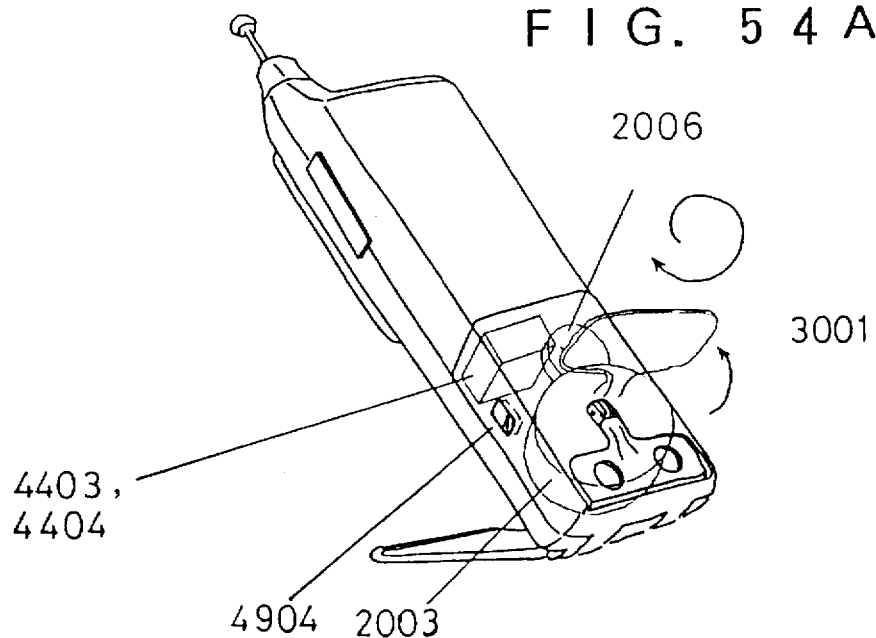
FIGS. 54a and 54b are sketch drawings showing a state wherein the inventive power unit is applied to a portable phone or a PHS.
Figure 54B:

FIGS. 53 and 54A–54B are sketch drawings showing a state wherein the inventive power unit is applied to a portable phone and a PHS. The reference numeral (5301) denotes the inventive power unit section.

It is preferable to have a folding thumbscrew 3001 as shown in FIG. 54 because it will not take a space when it is not used and because it will not be lost.

Especially, the PHS or the like has a fine rush current (load current) due to packet transmission, it is desirable to have the secondary cell in the embodiments of the present invention. It is also desirable to construct the secondary cell so as to be chargeable from the outside (Part 4 of the fourth embodiment). By doing so, the secondary cell will be fully charged soon due to trickle charge by winding up the screw diligently and it becomes possible to operate the equipment for a certain period of time by the capacity of the secondary cell even without winding up the screw. Further, it can be use in such a manner that even if the secondary cell is empty, winding up the screw allows a talk of 3 minutes for example when it is necessary to make a call or the winding up is used for a load current for waiting and receiving a call while implementing trickle charge also.

How about in reality? How often such situations in which a call is always waited and which allows a business to be fully done exist? Such situations are considered to happen more in public places such as a public transportation, a hall or a restaurant, because in the opposite cases, there is wire phone already on a own desk in office for example. Then, it may be often the case that a return call is made in a situation which permits a talk. Accordingly, in such case of portable phones, it is mainly operated actively by making a call from own side. Because such case requires only a quantity of electrical energy required at a necessary time (on-demand energy), the inventive power unit can be said as a most suitable device for that.

Because the situation described above often occurs also in waiting and receiving a phone call, it may be operated by actively using a caretaking (center) function. That is, it is only checked whether a caretaking record has been input or not per one hour or per 10 minutes, not always waiting for a call, and when it has been input, it is indicated (by sound or display). Then, by hearing that, one can make a return call soon in a situation which permits a talk. By operating as such, a power consumption during the waiting time may be reduced considerably, thus allowing the equipment to hold on for a considerable period of time just by winding up the spiral spring. In any event, the present invention releases users of portable electronic equipments totally from an anxiety of dead battery.

Figure 55:
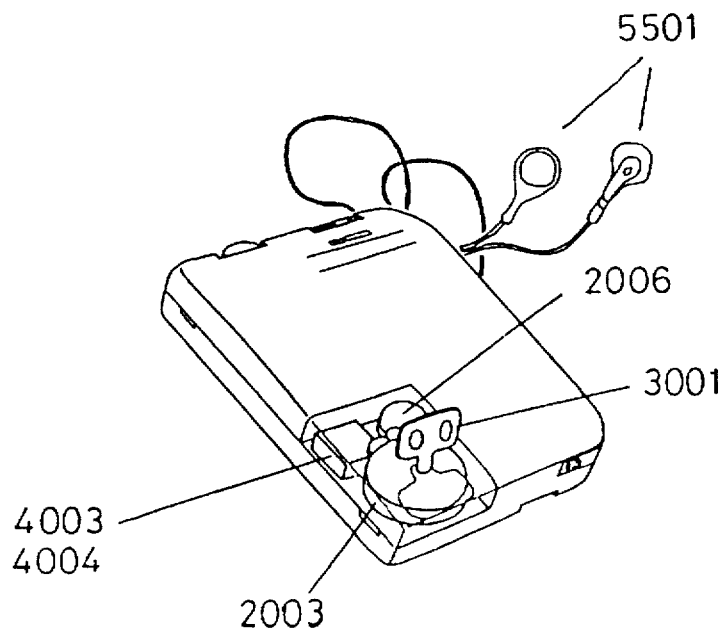
FIG. 55 is a sketch drawing showing a state wherein the inventive power unit is applied to a portable audio equipment.

FIG. 55 is a sketch drawing showing a state wherein the inventive power unit is applied to a portable audio equipment. The reference numeral (5501) denote an earphone and (3001) a folding thumbscrew. There has been strong needs in the portable equipments for recording and reproducing MDs, CDs and cassette tapes, etc. that it is desired to listen one more song or three more minutes after its battery has died. The application of the present invention allows to meet with such demand. While a case when the spiral spring is used is shown in the figure, it may be construct so that the user can listen a music while charging the secondary cell by winding up the lever as shown in the first embodiment of the present invention. It is of course possible to listen that after charging the secondary cell. It may be constructed also so that a ratchet mechanism is provided mechanically in the case of the spiral spring to allow the user to wind up the spiral spring additionally while releasing it (while listening a play).

Figure 56:
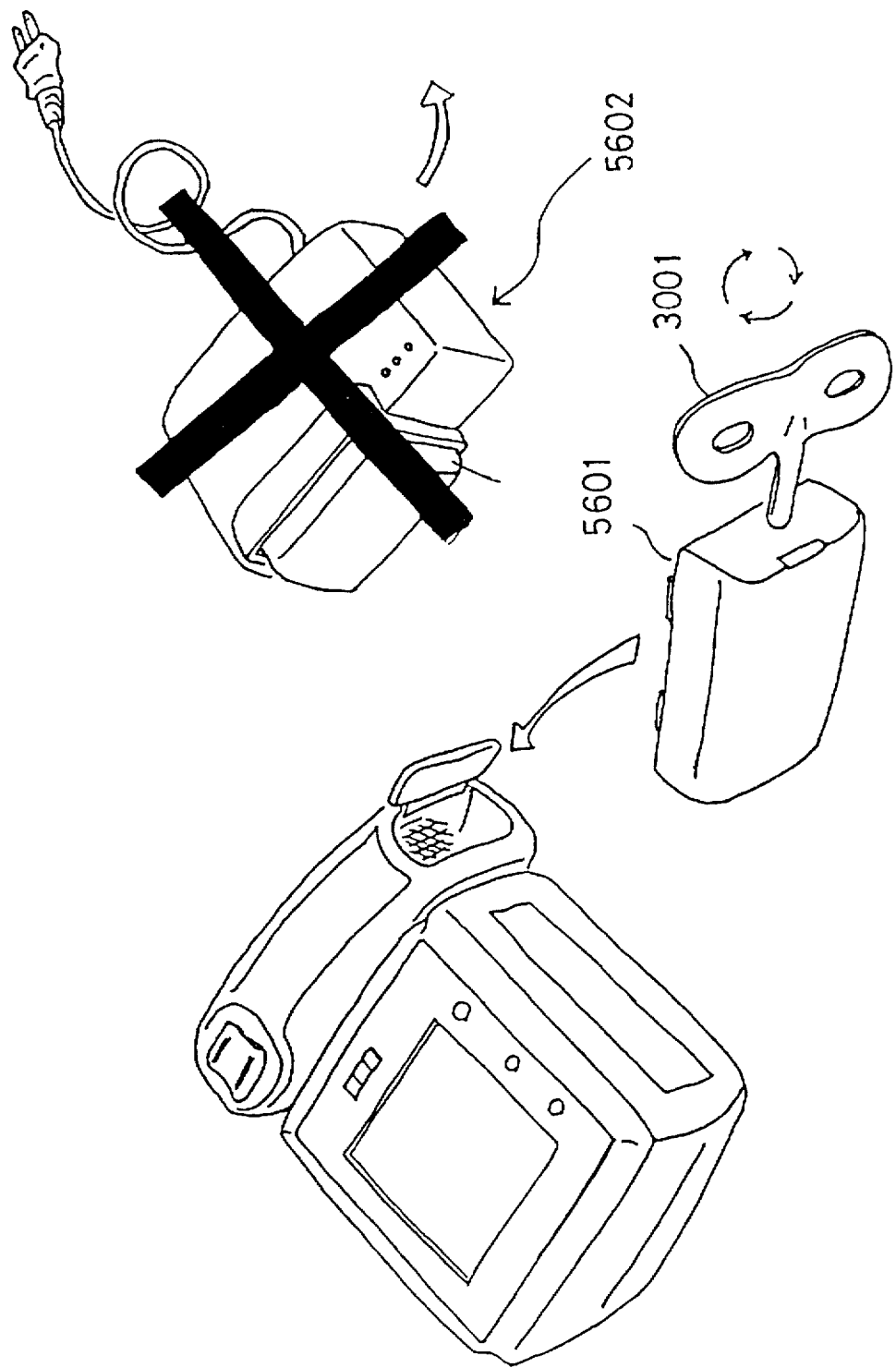
FIG. 56 is a sketch drawing showing a state wherein the inventive power unit is applied to a handy type movie camera (cam-coder) or an electronic camera (AF camera)

FIG. 56 is a sketch drawing showing a state wherein the inventive power unit is applied to a handy type movie camera (cam-coder) or an electronic camera (AF camera).

The reference numeral (5601) is the power unit of the present invention. It may be formed to have the same shape and the same electrode structure with the prior art secondary battery to be able to use in place of the battery. While the thumbscrew 3001 may be removable, it may be desirable to be a folding type as described before because, thereby, it will not be lost. It eliminates the necessity of bringing with a prior art large and heavy AC-DC charger 5602 in a travel or a business trip.

Figure 57:
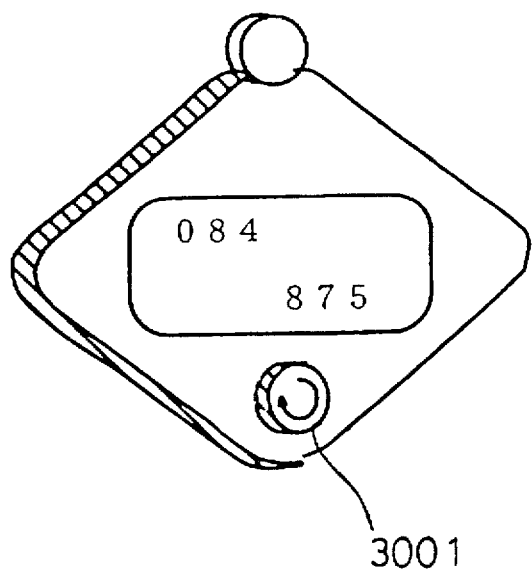
FIG. 57 is a sketch drawing showing a state wherein the inventive power unit is applied to a pocket bell (pager)

FIG. 57 is a sketch drawing showing a state wherein the inventive power unit is applied to a pocket bell (pager).

Figure 58:
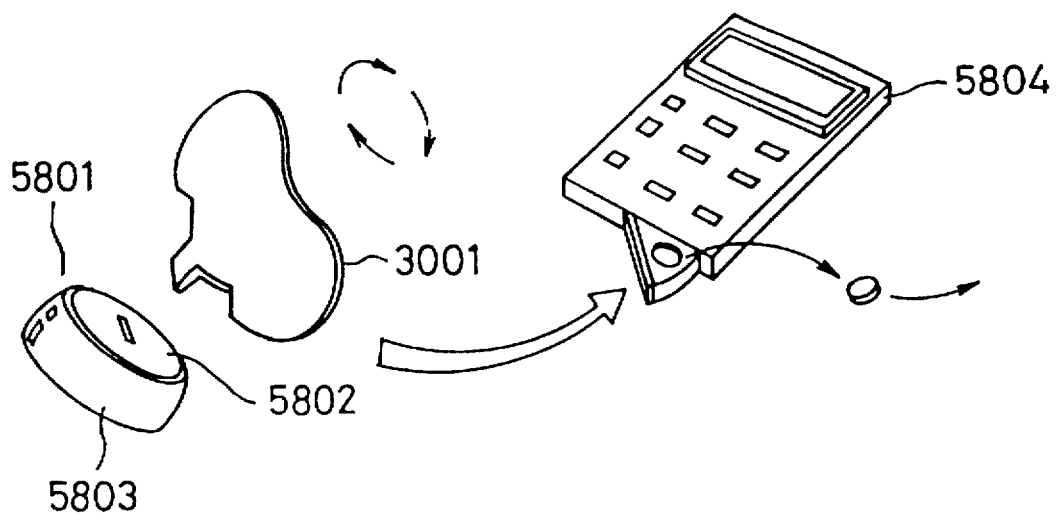
FIG. 58 is a sketch drawing showing a state wherein the inventive power unit is formed into a shape of a button type cell.

FIG. 58 is a sketch drawing showing a state wherein the inventive power unit is formed into a shape of a button type cell. By forming the inventive power unit 5801 into a shape of a button type cell whose case itself has +pole 5803 and −pole 5802, it can be replaced with button type cells which have been often used in electronic calculators or the like in the past. It is possible to use it repeatedly by winding up the spiral spring. It also eliminates the necessity of running into a convenience store to buy a battery due to a sudden death of its battery. Thus a button type cell which is also gentle to the environment has emerged. It is also beneficial to form it into a shape of the prior art unit-one or unit-three type cell.

Figure 59:
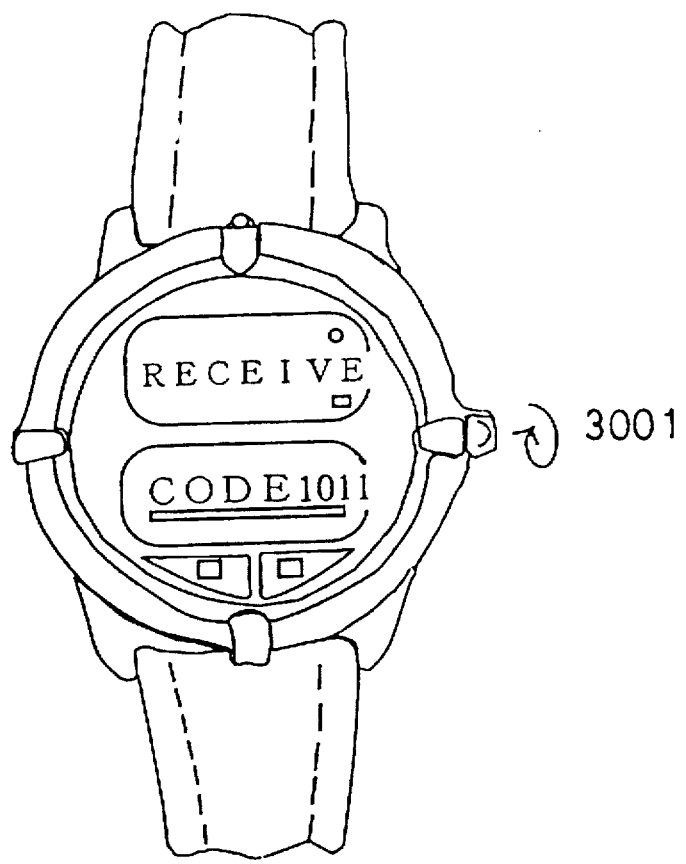
FIG. 59 is a sketch drawing showing a state wherein the inventive power unit is applied to an electronic watch.

FIGS. 59 and 60A through 60C are sketch drawings showing states wherein the inventive power unit is applied to an electronic watch. FIG. 59 shows a state wherein the spiral spring is wound up by using a stem 3001. It is effective either in an analog or digital watch. The second embodiment of the present invention is effective for those with a single function analogue having a stable load current and it is desirable to apply the third or fourth embodiment of the present invention to those having fluctuating load current such as those having buzzer, back light and pocket bell functions. FIG. 60C shows the surface of the watch, FIG. 60B shows the back of the watch and FIG. 60C shows a schematic section view thereof. In this embodiment, the spiral spring is wound up by using a back lid 6001. Thereby, it becomes possible to wind up a large spiral spring. It may be also constructed so that it is wound up by using the surface bezel. The reference numeral (6002) denotes an outer case (side) and (6003) a glass.

Beside them, there are so many number of examples in which present invention is applied to portable electronic equipments such as a transceiver and a pacemaker and it is limitless, so that no more such illustration will be shown.

Figure 61:
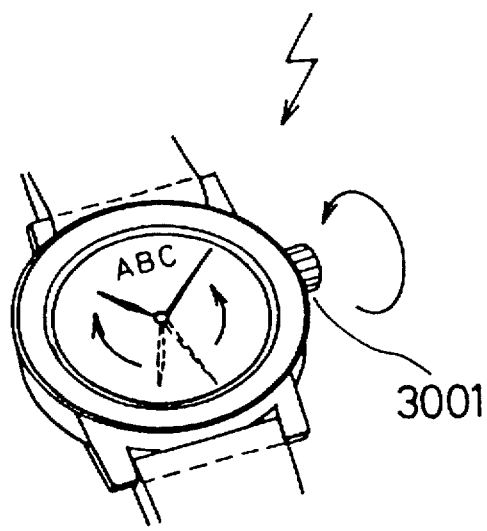
FIG. 61 is a sketch drawing showing an applied example of an electronic watch of the power unit of Part 4 of the fourth embodiment of the present invention.

FIG. 61 is a sketch drawing showing an applied example of an electronic watch of the power unit of Part 4 of the fourth embodiment of the present invention. This electronic watch has a function of setting time with the current time swiftly, even after its cell has been totally discharged, by receiving a time signal by radio (by FM multiplexed radio, by radio multiplexed to band of portable phones or by private radio) after activating the inventive power unit by winding up the spiral spring.

Figure 62:
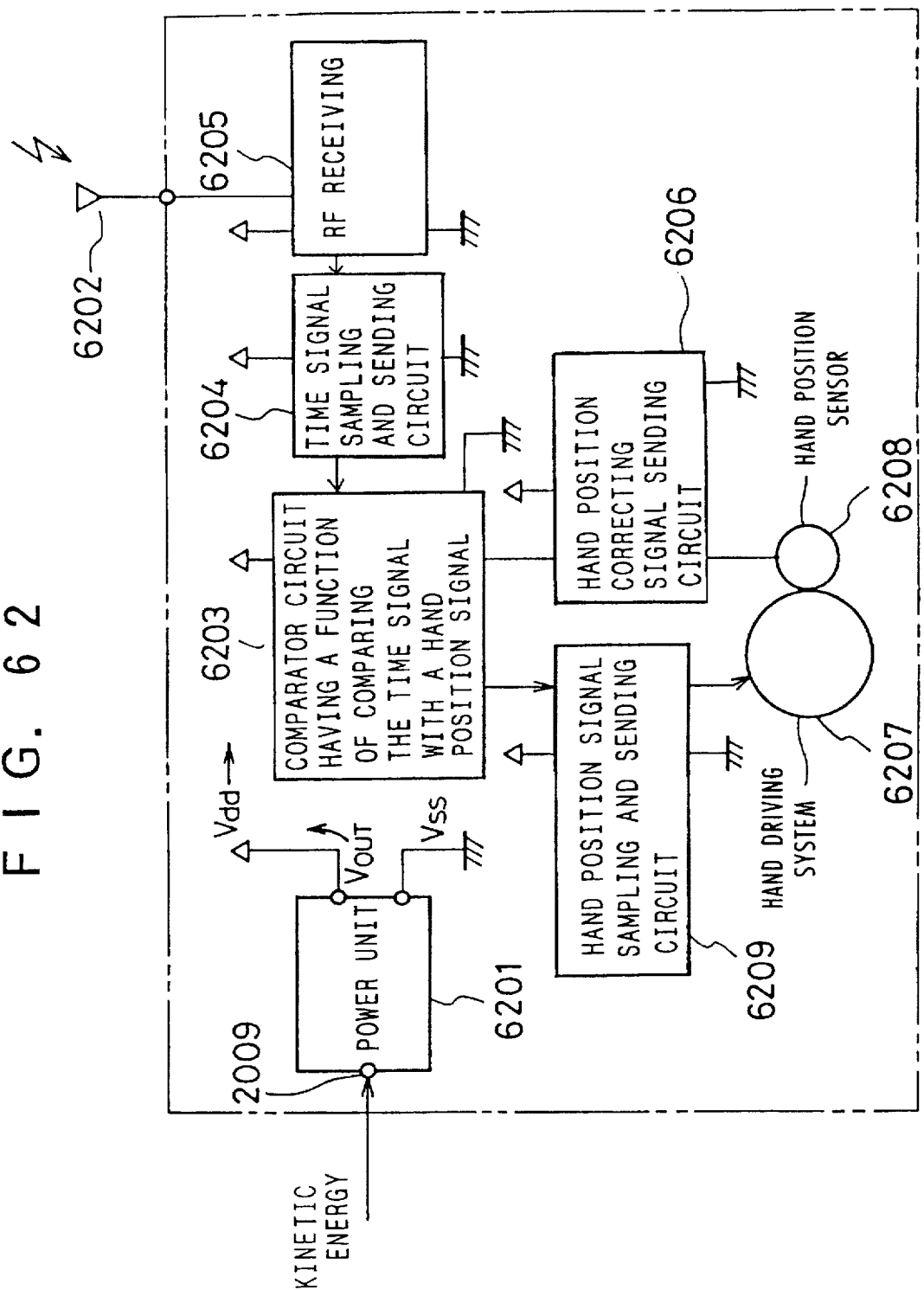
FIG. 62 is a system block diagram showing a power source and a hand setting function of an electronic equipment having a time indicating function which is an applied example of the power unit of Part 4 of the fourth embodiment of the present invention.

FIG. 62 is a system block diagram showing a power source and a hand setting function of an electronic equipment having a time indicating function which is an applied example of the power unit of Part 4 of the fourth embodiment of the present invention. It comprises a kinetic energy input section 2009, a power unit 6201 of the present invention for supplying $V_{OUT}$ output to a Vdd line, an antenna 6202, a RF receiving circuit 6205, a time signal sampling and sending circuit 6204 having a function of detecting the time signal superimposed on radio and sending it to a comparator circuit 6203 having a function of comparing the time signal with a hand position signal, a hand position sensor 6208, a hand position signal sampling and sending circuit 6206 having a function of sampling a signal from the hand position sensor and sending it the comparator, a hand driving system (including an electrical circuit and a mechanism) 6207 having a function of driving the hands for indicating time, and a hand position correcting signal sending circuit 6209 having a function of sampling a signal from the comparator and sending a hand position signal of a hand to be corrected. The operation for correcting the position of the hands may be carried out right after when the spiral spring is wound up after when the power supply has been completely used up once and the watch has stopped (power on reset) as described before. Beside that, it is also possible to set so that it is carried out in every hour or once per day or when a special switch provided in advance is pressed. It is very useful to provide such a switch for the case of traveling that accompanies a time difference.

Figure 63:
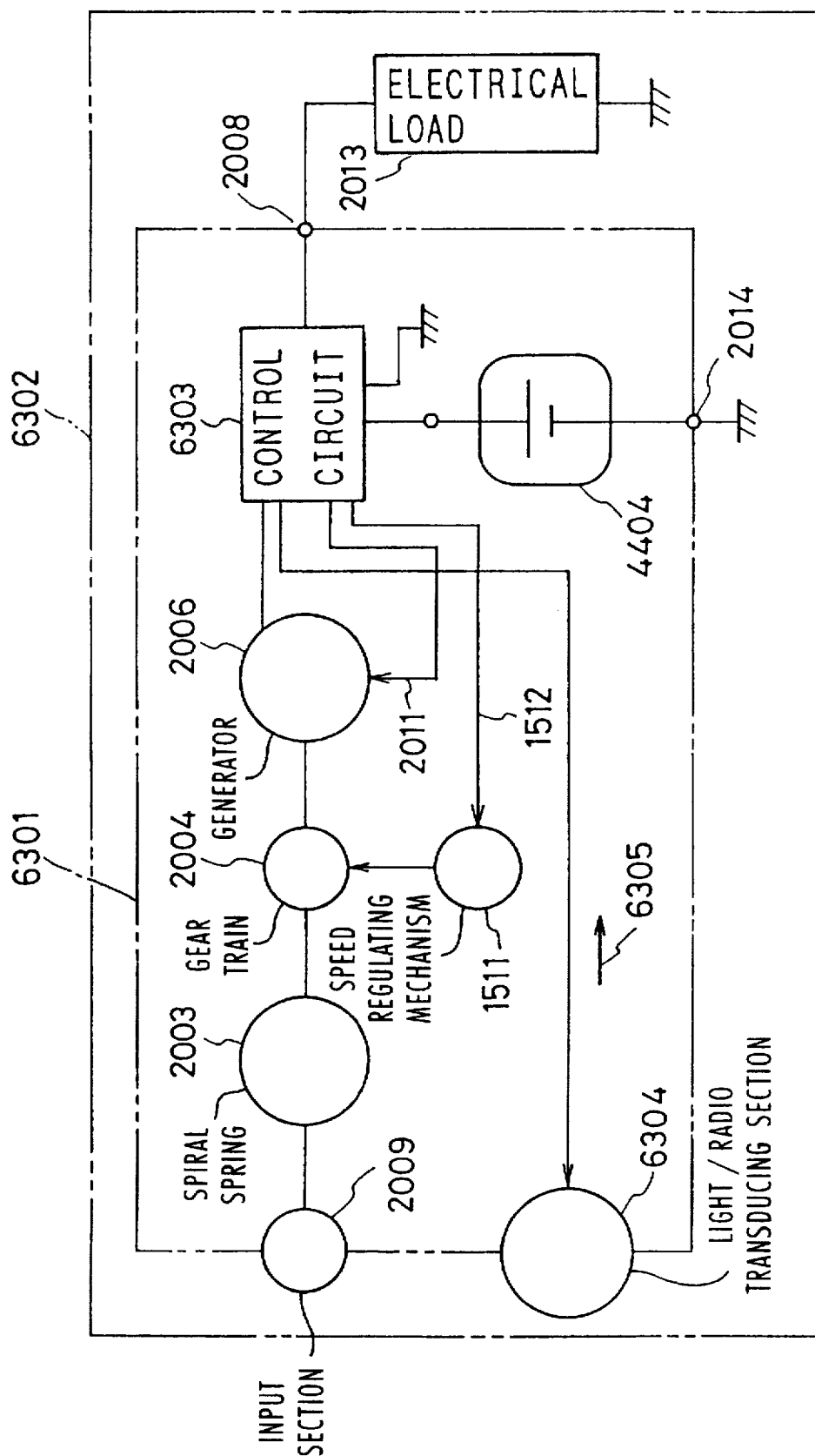
FIG. 63 is a system block diagram showing a power unit 6301 and an electronic equipment 6302 comprising the same according to a fifth embodiment of the present invention.

FIG. 63 is a system block diagram showing a power unit 6301 and an electronic equipment 6302 comprising the same according to a fifth embodiment of the present invention. The power unit 6301 comprises an input section 2009, a spiral spring 2003, a gear train mechanism 2004, a speed-regulating mechanism 1511, an AC generator 2006, a control circuit 6303 having a function of controlling a field current control function 2011, an electrical speed-regulation control function 1512 and a light/radio transducing section and of giving trickle charging current $I_{CHG2}$ to the secondary cell, the light/radio-to-electricity transducing section 6304 having a function of transducing light or radio to electricity, the secondary cell 4404, a $V_{OUT}$ output terminal 2008, and a GND terminal 2014. The power unit 6301 is connected to an electrical load 2013 via the Vout terminal 2008 and composes the electronic equipment 6302.

Figure 64B:
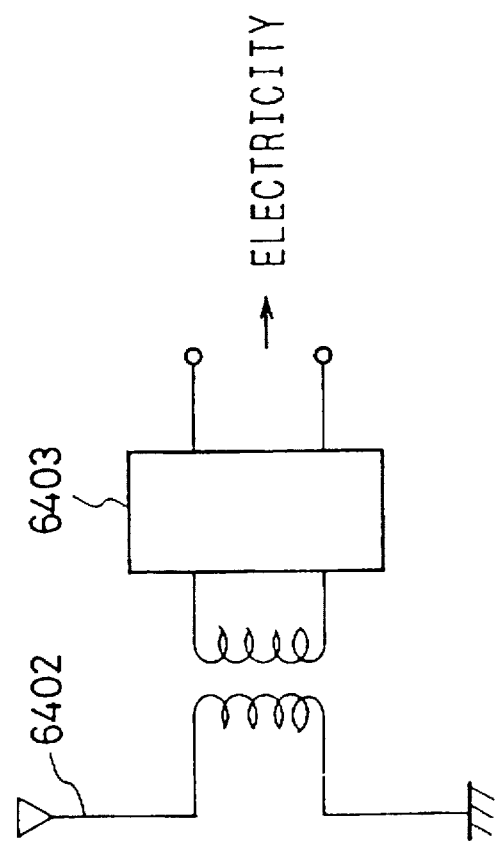
FIGS. 64a and 64b are circuit diagrams showing a light/radio-electricity transducing section according to a fifth embodiment of the present invention.
Figure 64A:
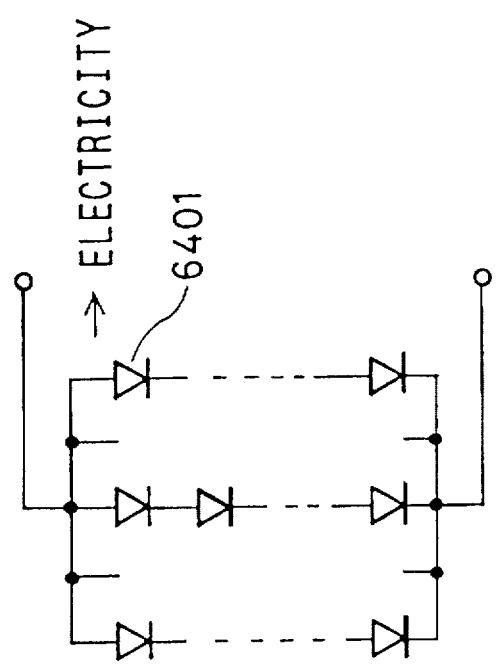

FIGS. 64A and 64B are circuit diagrams showing a light/radio-electricity transducing section according to the fifth embodiment of the present invention.

FIG. 64A shows one example of a device for transducing light into electricity, wherein photodiodes are arrayed in parallel or in series as necessary. FIG. 64B shows one example of a device for transducing radio (high frequency field) into electricity. In the figure, it comprises an antenna 6402 and takes out electricity via a rectifier section (although not shown, it may be realized by constructing a full-wave rectification bridge by four diodes) by an inductance coupling. It is preferable to take the band of a resonance frequency arranged by the inductance coupling to be wider as much as possible. It is also possible to arrange the coupling by capacitive (C) coupling. The present invention is what always charges (trickle charge) sun light, room light and radio of broadcasting and communication equipments which exist around people into the secondary cell and it may be constructed and controlled by the system structure explained in Part 3 of the fourth embodiment by making reference to and by adding the structure and control flow of the control circuit. The point is that while there is enough light or radio, it should be used in preference to the trickle charge caused when the spiral spring is released to charge the secondary cell. Accordingly, there may be a case when the necessity or opportunity of using the trickle charge by the spiral spring or the rapid charge by the AC/DC adapter is reduced remarkably depending on the use condition of the electronic equipment (like when it is often left or stored where there is strong light or electric field). However, because it should be used by winding up the spiral spring on-site from the aspect of the on-demand energy which is the main point of the present invention in emergency or when the secondary cell is depleted, the light/radio-electricity transducing function can also exhibit its effect for the first time when it is used together with the power unit described in the first through fourth embodiments.

Figure 65:
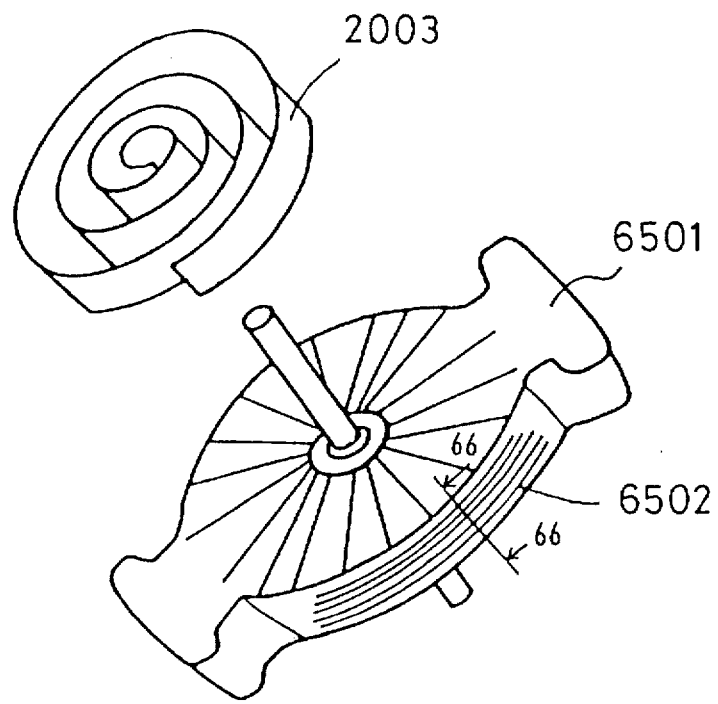
FIG. 65 is a stereographic view showing a generator (electrostatic generator 6501) of a power unit according to a sixth embodiment of the present invention.

FIG. 65 is a stereographic view showing a generator (electrostatic generator 6501) of a power unit according to a sixth embodiment of the present invention. The reference numeral (6502) denotes a rotor.

Figure 66:
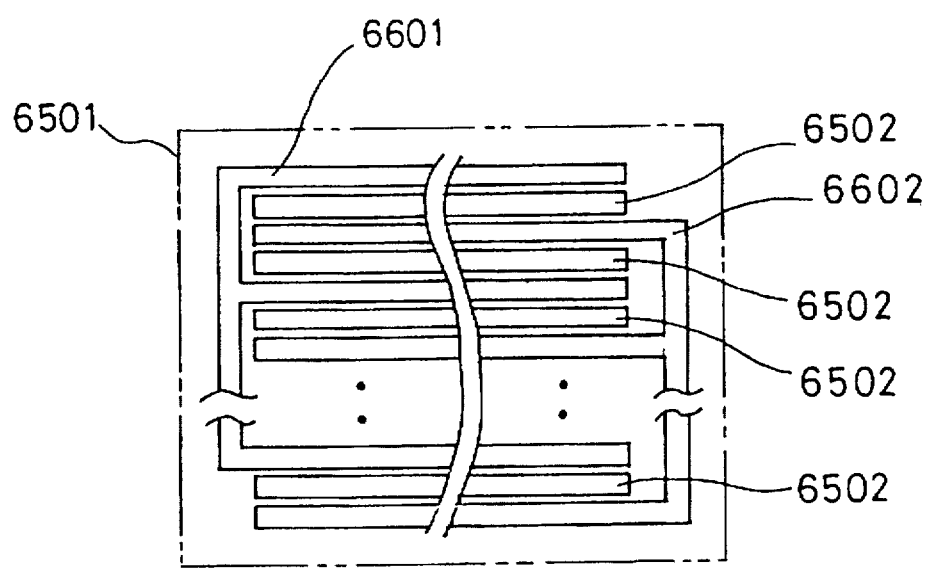
FIG. 66 is a section view of a portion, along 66—66 in FIG. 65, of the generator of the power unit of the sixth embodiment of the present invention.

FIG. 66 is a section view of a portion, along 66—66 in FIG. 65, of the generator of the power unit of the sixth embodiment of the present invention. The reference numeral (6601) denotes a field electrode, (6502) a rotor, and (6602) a charge take-out electrode.

Figure 67:
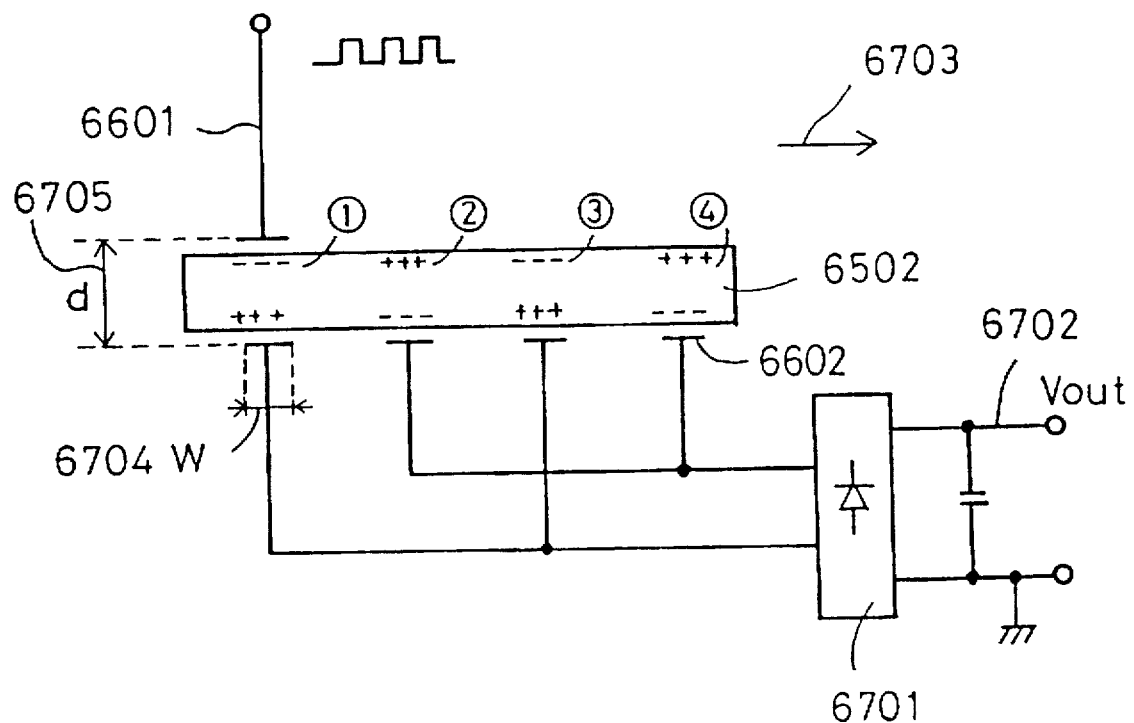
FIG. 67 is a schematic diagram showing a principle of power generation of the power unit of the sixth embodiment of the present invention.

FIG. 67 is a schematic diagram showing a principle of power generation of the power unit of the sixth embodiment of the present invention. The reference numeral (6701) denotes a rectifier section, (6702) an output $V_{OUT}$ (6703) a direction into which a dielectric rotor moves, (6704W) a width W of the take-out electrode with respect to the moving direction of the rotor, and (6705) a distance d between electrodes.

Figure 68:
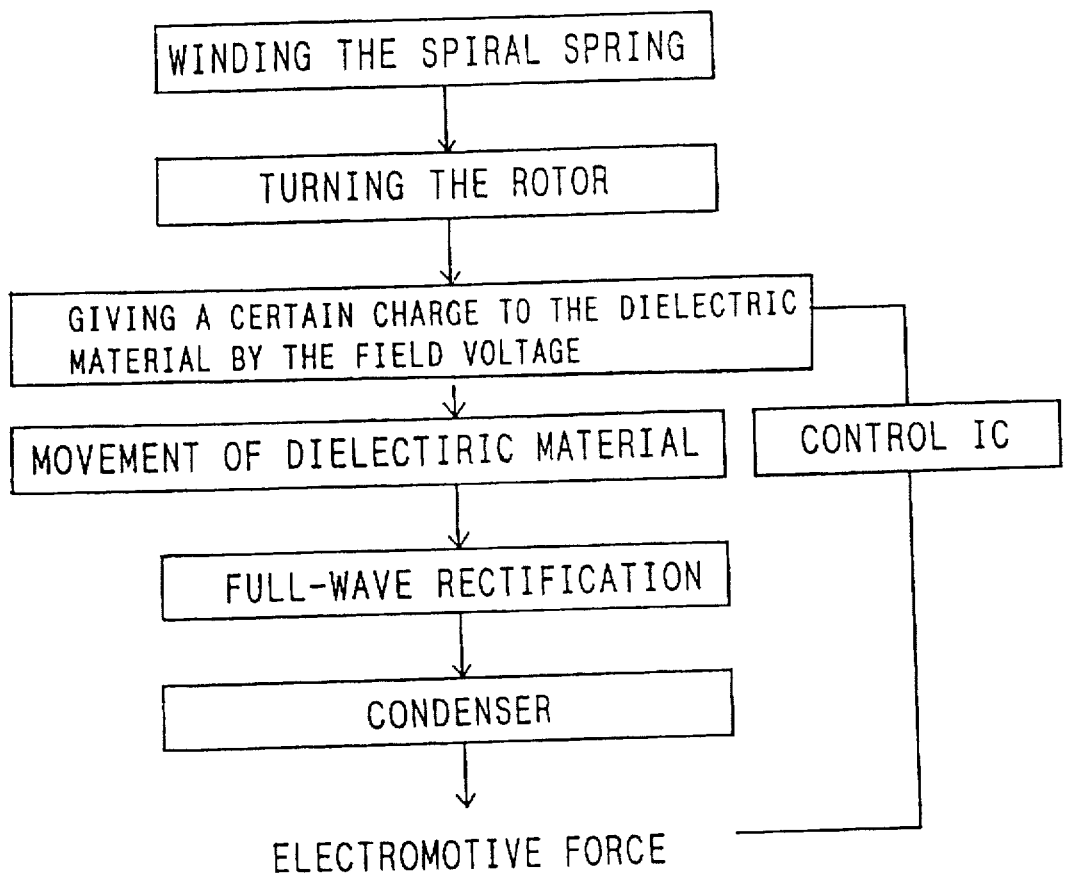
FIG. 68 is a flowchart for explaining the operation of the generator of the power unit of the sixth embodiment of the present invention.

FIG. 68 is a flowchart for explaining the operation of the generator of the power unit of the sixth embodiment of the present invention.

While examples in which the generators called as the DC generator or AC generator in the present invention are used have been explained so far in the present invention, an invention of an electrostatic generator will be disclosed in the present embodiment. Because it can be used in the same manner, in terms of its operation, with the AC generator described above, it can be implemented by replacing with the AC generator in Part 1 and thereafter of the fourth embodiment of the present invention and a variation of the structure as the power unit will not be repeatedly described. The present embodiment utilizes electrostatic induction. When the field electrode 6601 (it is named as such because it can function similarly to the field current of the AC generator of the present invention) which is a charged electrode gives a certain (+or −) charge to the rotor 6502 made of a dielectric material, a different kind of charge is induced on the other side of the dielectric material. When the polarity of the charge applied by the field electrode is changed alternately ((1) through (4) in FIG. 67) while moving (turning in reality) the rotor, AC-like charge may be taken out as a current from the take-out electrode. It is then rectified to DC and is taken out as $V_{OUT}$.

At this time, the following expression holds: When F is an electrostatic force applied to the dielectric rotor, $$F=(\epsilon_0 WV^2/2d)\times(k-1)$$

where, $\epsilon_0$ is a dielectric constant of air, $\epsilon$ i is a dielectric constant of the dielectric rotor, W is a width of an electrode plate, V is an applied voltage, d is a distance between the field electrode and the take-out electrode, and k is $\epsilon$ i/$\epsilon_0$. When a mass of the dielectric rotor is m and the rotor is moving with a velocity v, it follows:

$F = mv^2/2$

When it is solved with respect to the voltage V, it follows:

$$V = v \cdot \sqrt{\frac{dm}{\epsilon_0 w(k-1)}}$$

When a capacitance formed between each electrode is represented as C, a generated current i may be expressed as follows:

$$i = \frac{dQ}{dt} = \frac{d}{dt} CV = \frac{d}{dt} v \sqrt{\frac{dm}{\epsilon_0 w(k-1)}}$$

What is shown in FIGS. 65 and 66 is an example thereof constructed so that the circular dielectric roller rotates and a plurality of field electrodes and the take-out electrodes are laminated so as to sandwich it.

Figure 69:
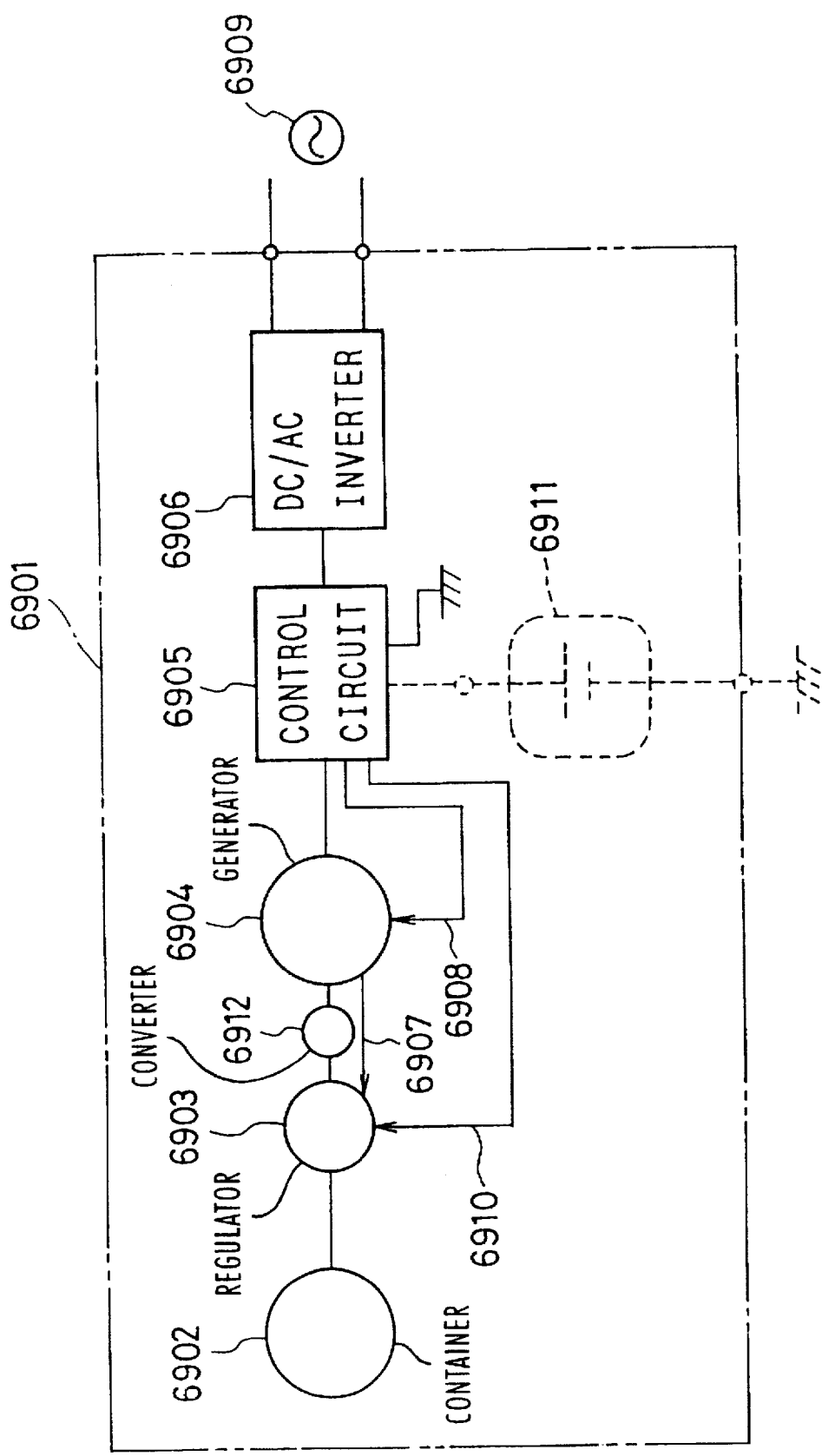
FIG. 69 is a system block diagram showing a power unit 6901 according to a seventh embodiment of the present invention.

FIG. 69 is a system block diagram showing a power unit 6901 according to a seventh embodiment of the present invention. It comprises a container 6902 (dam) for storing water as means for storing kinetic energy (potential energy), a discharging amount regulating function 6903 as means for regulating an amount of water (flow amount, discharging amount) used for turning a generator, an artificial water amount regulation control function 6907, means (water turbine) 6912 for converting the flow of water into a rotary motion, an AC generator 6904 of the present invention, a control circuit 6905 having a field current control function 6908 and an electrical water amount regulation control function 6910, a DC/AC inverter circuit 6906 for converting from DC to AC, and an AC output 6909. It may comprise a secondary battery 6911 indicated by dotted line. It may be constructed to have either one of the mechanical water amount regulation control function 6907 and the electrical water flow regulation control function 6910. It becomes possible to construct a truly on-demand type power generation facility if the inventive generator and the control mechanism are applied to hydraulic power generation in this form.

Figure 70:
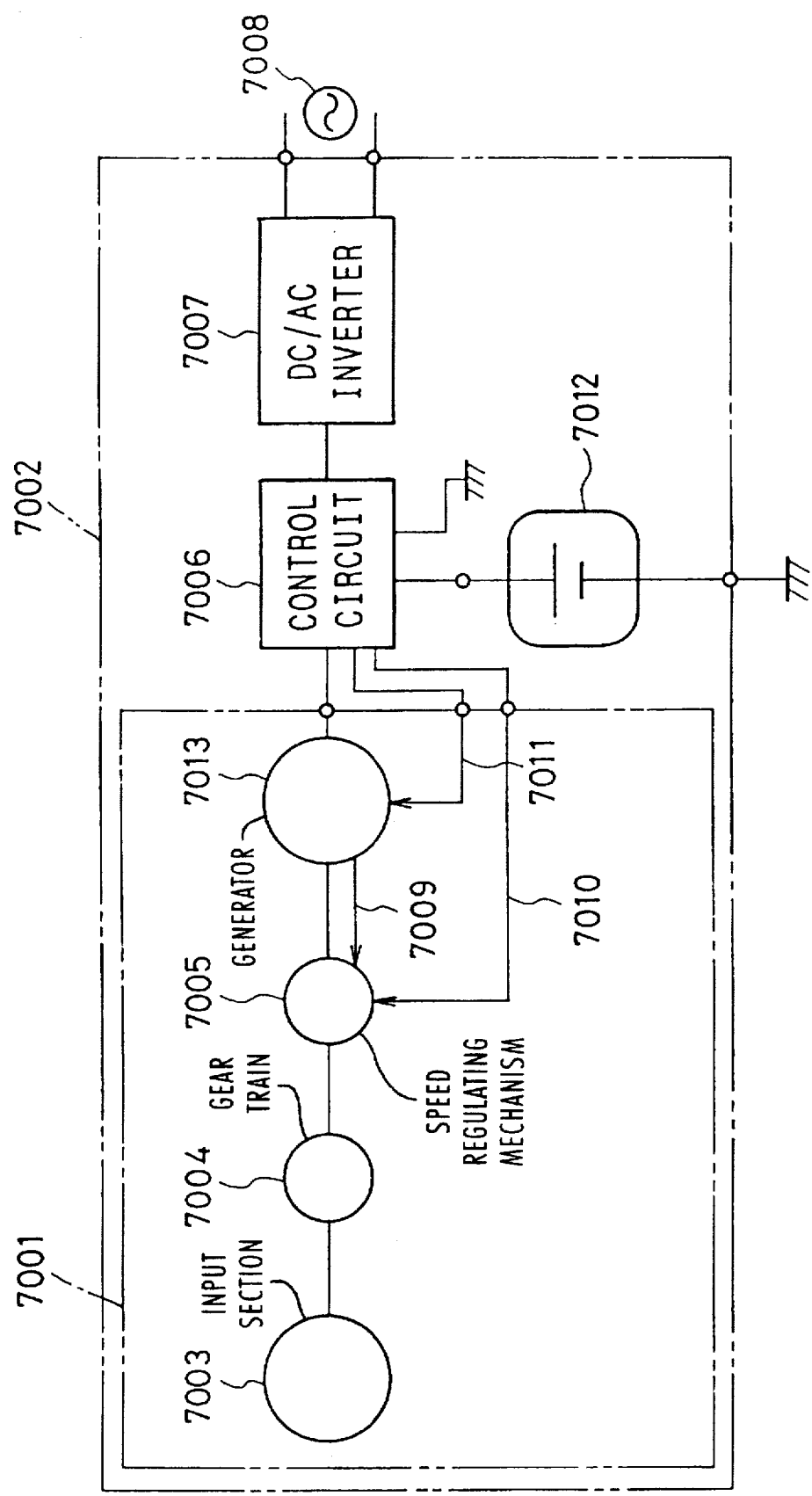
FIG. 70 is a system block diagram showing a power unit 7002 according to an eighth embodiment of the present invention.

FIG. 70 is a system block diagram showing a power unit 7002 according to an eighth embodiment of the present invention. It comprises a water turbine or wind mill 7003 as kinetic energy input means, gear train mechanism 7004, speed-changing mechanism as described before or a propeller angle (see propeller pitch 7101 in FIG. 71) changing mechanism 7005 as speed-changing means, an AC generator 7013 having a mechanical speed-changing mechanism control function 7009, a control circuit 7006 having a field current control function 7011 and an electrical speed-changing mechanism control function 7010, a secondary battery 7012, a DC/AC inverter circuit 7007, and an AC output 7008. It may comprise either 7009 or 7010.

Figure 71:
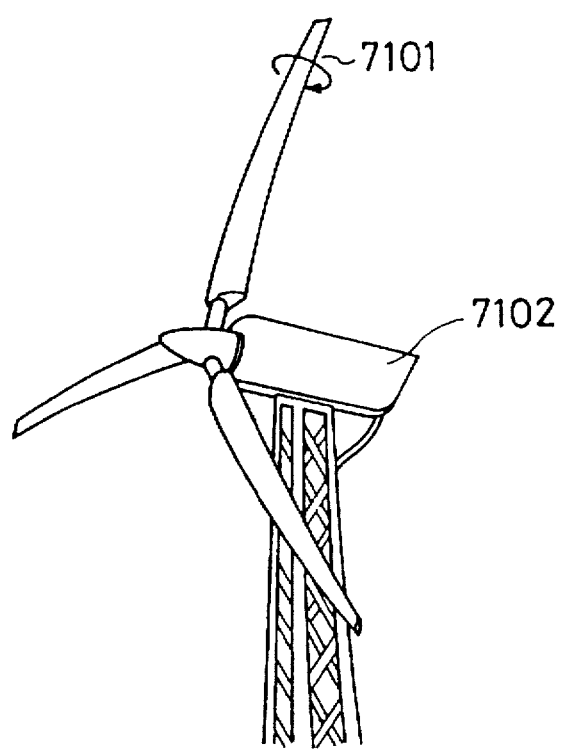
FIG. 71 is a stereographic view showing the power unit of the eighth embodiment of the present invention.

FIG. 71 is a stereographic view showing the power unit of the eighth embodiment of the present invention. Part 7001 to be installed at the top of tower is accommodated in the tower top portion 7102. It is useful for this embodiment to have the function of trickly charging light/radio to the secondary cell in the fifth embodiment of the present invention.

While the system of the present embodiment may be controlled and operated basically as described in Part 3 of the fourth embodiment of the present invention, it is preferable to keep a trickle charge charged to the battery variable and to control $I_F$, speed-changing ratio and propeller pitch, which allow to generate power at most, with wind at each time in each day. Because it is set so that charging current does not exceed the allowable maximum charging current of the secondary battery and it must be careful about overcharge and overdischarge, the system structure of Part 3 of the fourth embodiment may be a quite good reference. It may be preferable to use a lead battery because the secondary battery here requires a large capacity. The same applies also to the seventh embodiment.

Figure 72:
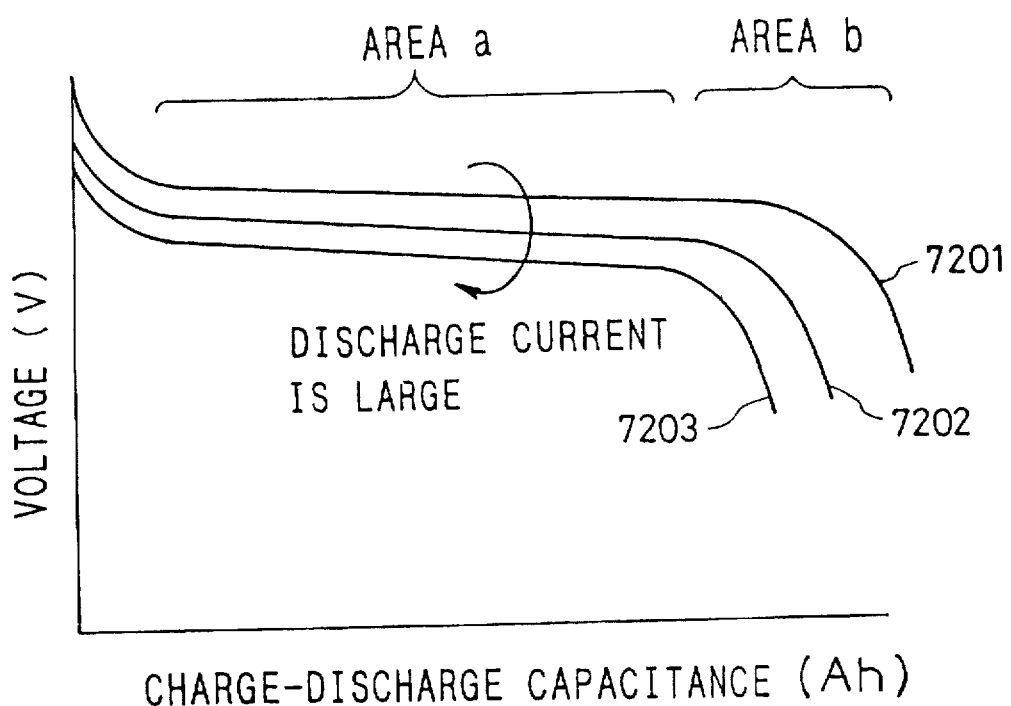
FIG. 72 is a graph showing a tendency of a discharge characteristic of a Ni-MH cell for explaining a power unit and an electronic equipment comprising the same according to a ninth embodiment of the present invention.

FIG. 72 is a graph showing a tendency of a discharge characteristic of the Ni-MH cell for explaining a power unit and an electronic equipment comprising the same according to a ninth embodiment of the present invention.

A plot line 7201 is obtained when a discharging current is 1 C-A (1 C-A means 1×rated capacity A of battery). A line 7202 is obtained when 2 C-A and a line 7203 when 3 C-A. While it may be natural that there is a difference in the voltage drop depending on the values of the discharging currents, the difference of the voltage drop is remarkable in a domain b as compared to that in a domain A because internal resistance increases along the discharge. The present embodiment actively utilizes this tendency.

Figure 73:
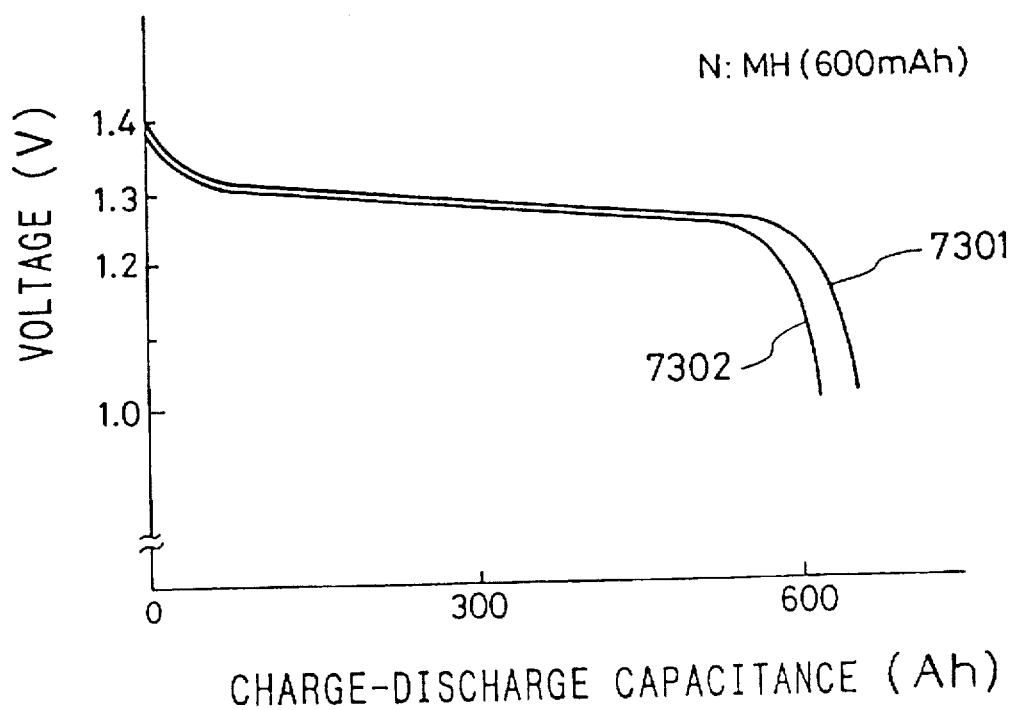
FIG. 73 is a graph showing a tendency of the discharge characteristic of the Ni-MH cell for explaining the power unit and the electronic equipment comprising the same according to the ninth embodiment of the present invention.

FIG. 73 is a graph showing a tendency of the discharge characteristic of the Ni-MH cell for explaining the power unit and the electronic equipment comprising the same according to the ninth embodiment of the present invention.

Using a Ni-MH rated 600 mA; one cell 1.2 gum type battery, a plot 7301 is obtained when the discharging current is 54 mA and a plot 7302 is obtained when the discharging current is 60 mA. These current values are supposed for one portable type cassette tape player (hereinafter referred to as an earphone stereo). An average power consumption during normal play was supposed to be 60 mA.

Figure 74:
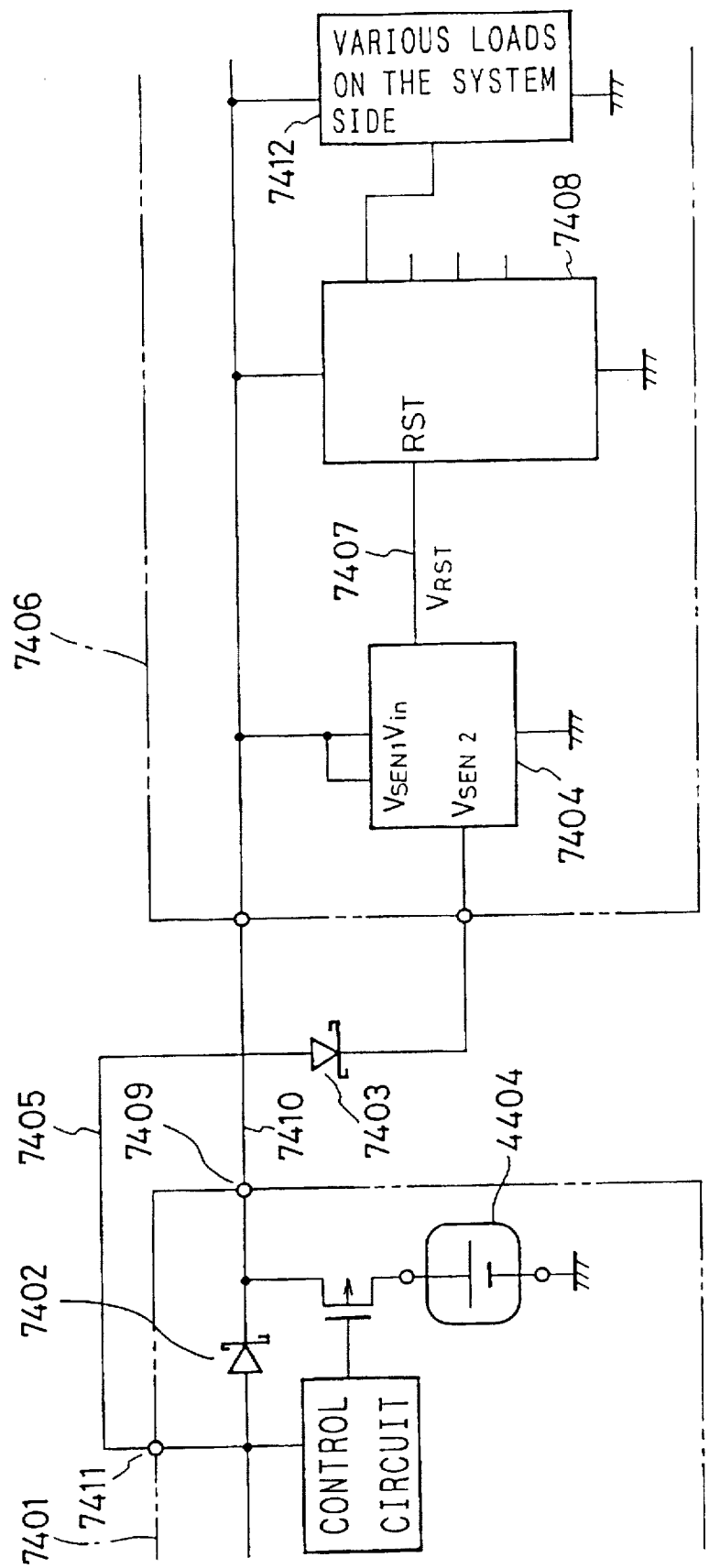
FIG. 74 is a system block diagram showing the power unit 7401 and the electronic equipment 7402 comprising the same according to the ninth embodiment of the present invention.

FIG. 74 is a system block diagram showing the power unit 7401 and the electronic equipment 7402 comprising the same according to the ninth embodiment of the present invention. The power unit 7401 comprises, in addition to those parts explained from the second embodiment to the sixth embodiment (Part 3 of the fourth embodiment or the like may be effective sometimes in the present embodiment), a power generation check output terminal Vgen 7411 as means for informing whether power is being generated by the spiral spring. The signal of the Vgen has a Schottky diode 7403 for preventing reverse current on the way in series.

It is constructed so as to be connected, via a signal line 7405, to a Vsen$_2$ 7404 terminal of a power voltage monitoring system reset circuit having a function of monitoring a power voltage and resetting a microcomputer (system) to prevent overrun of the microcomputer 7408 or the like when the voltage becomes lower than a certain set value.

When a certain set voltage value monitored so far by a Vsen$_1$ of the power voltage monitoring system reset circuit 7404 is assumed as reset voltage 1, it sets another reset voltage value (as Vdd line 7410) when a voltage near Vdd (active Hi) comes to the Vsen$_2$ (Vsen, terminal is not monitoring a voltage to be reset here. When Hi comes, it changes a set value by which a reset signal should be sent, while the Vsen$_1$ monitors Vdd). The reference numeral 7412 denotes a reset terminal of the microcomputer (it may be reset by active Lo). The reference numeral (7412) denotes various electrical loads on the system side.

Figure 75:
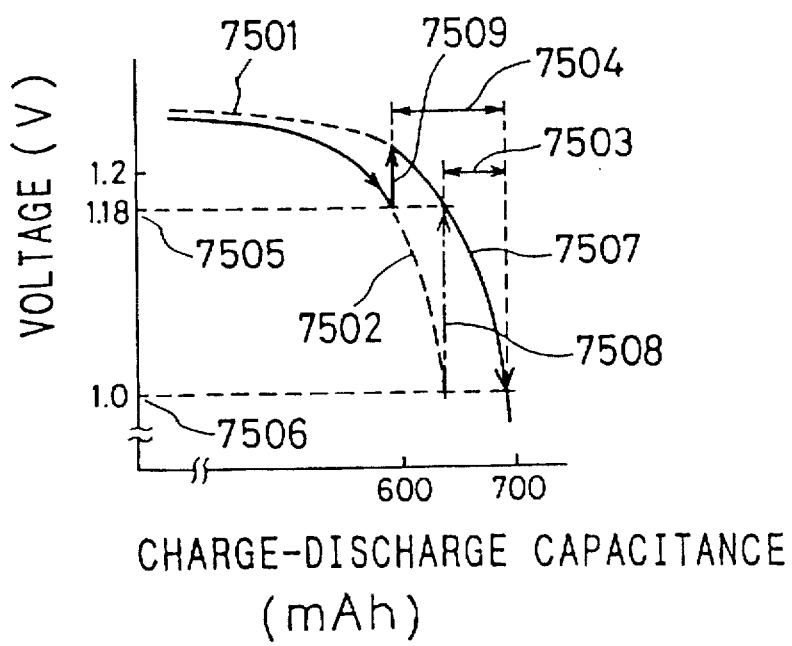
FIG. 75 is a graph showing an enlarged portion of the graph showing the concrete discharge characteristic of the Ni-MH cell for explaining the power unit and the electronic equipment comprising the same of the ninth embodiment of the present invention.

FIG. 75 is a graph showing an enlarged portion of the graph showing the concrete discharge characteristic of the Ni-MH cell for explaining the power unit and the electronic equipment comprising the same of the ninth embodiment of the present invention. It is a partially enlarged view of FIG. 73. A broken line 7501 in the figure represents that of 54 mA of discharging current and a broken line 7502 represents that of 60 mA of discharging current.

When only the secondary cell is used and the earphone stereo is playing normally with 60 mA and when the inventive power unit starts to generate 6 mA of power after when the battery voltage drops to 1.0 V of system reset voltage and the equipment stops, the load of the secondary cell becomes 54 mA this time, so that the equipment starts to operate by switching over the load curve like arrow indicated by a dashed line 7508 in the figure and operates by the remaining discharge capacity 7503. Further, when the reset voltage is set at about 1.18 V from the beginning (reset voltage 1 7505) and when the inventive power unit starts to generate power (7509) after the system reset and the equipment stops, the remaining capacity will be left as indicated by arrow 7504 in the figure, having close to 100 mAh, by changing the reset voltage (reset voltage 2 7502) and by switching over the load curve (solid line 7507).

When a capacity of the spiral spring is assumed to be that of kinetic energy of seven turns with 1 kgf.cm, then it becomes equivalent to $\frac{1}{60}$ mAh by winding up once (seven turns) and the earphone stereo of the present embodiment operates for about one minute when it has no secondary cell. However, it can be operated for about 10 minutes by winding up once by taking charge of 6 mA, which is 10% of 60 mA, as described before.

Figure 76:
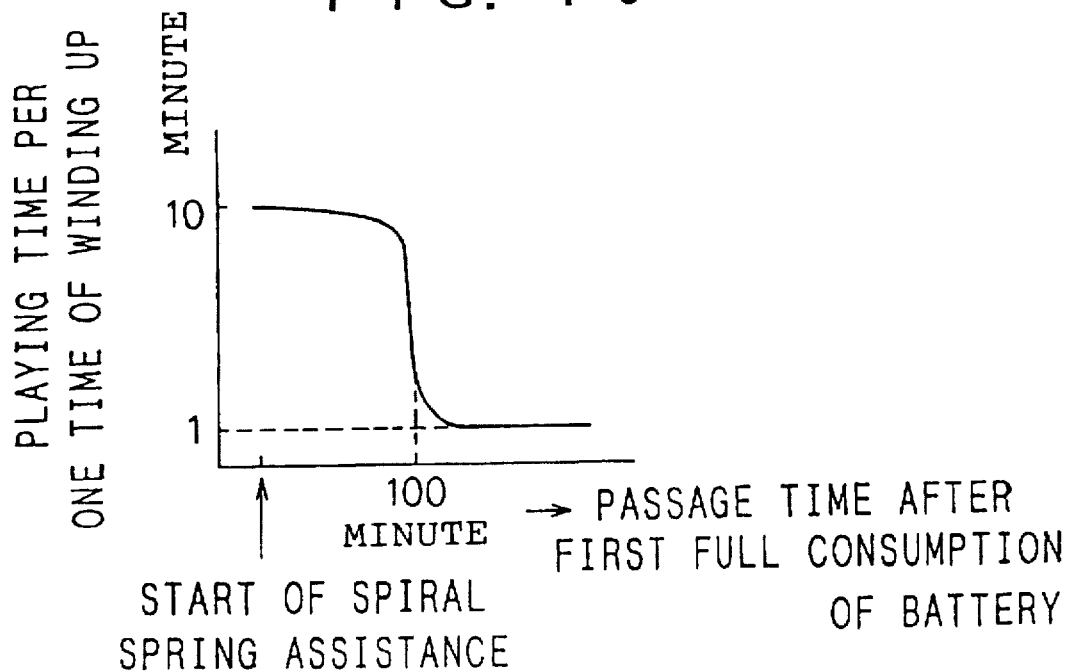
FIG. 76 is a schematic graph showing an operation of the electronic equipment of the ninth embodiment of the present invention.

It can be continued for the period of the remaining capacity of the secondary cell (close to 100 mAh in this case) [about 100 minutes in total (FIG. 76)]. FIG. 76 shows that.

FIG. 76 is a schematic graph showing the operation of the electronic equipment of the ninth embodiment of the present invention.

After truly using up the secondary cell, the player can be played for one minute per one time of winding up. When it is not played, the secondary cell may be charged by trickle charge. The secondary cell will be charged by a certain degree while winding up several times and then, it can be played in a lump.

Figure 78:
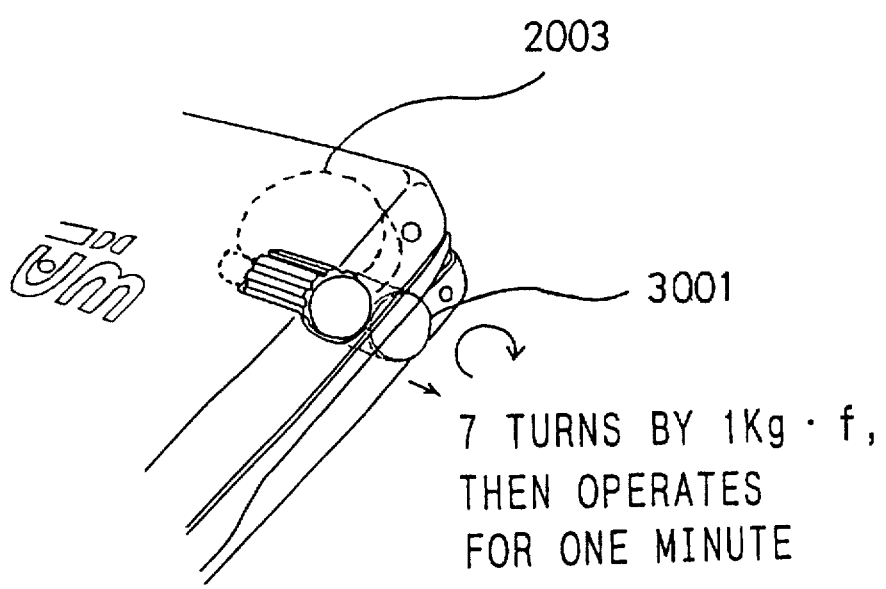
FIG. 78 is a partial stereographic view showing a portable tape player (earphone stereo) which is a portable equipment, i.e. the electronic equipment comprising the power unit of the ninth embodiment of the present invention.

FIG. 78 is a partial stereographic view showing a portable tape player (earphone stereo) which is a portable equipment, i.e. the electronic equipment comprising the power unit of the ninth embodiment of the present invention. According to the present embodiment, the size of the spiral spring may be reduced to about 20 mm Φ×5 mm in thickness, so that it has an effect that it can be readily stored within the equipment.

Figure 77:
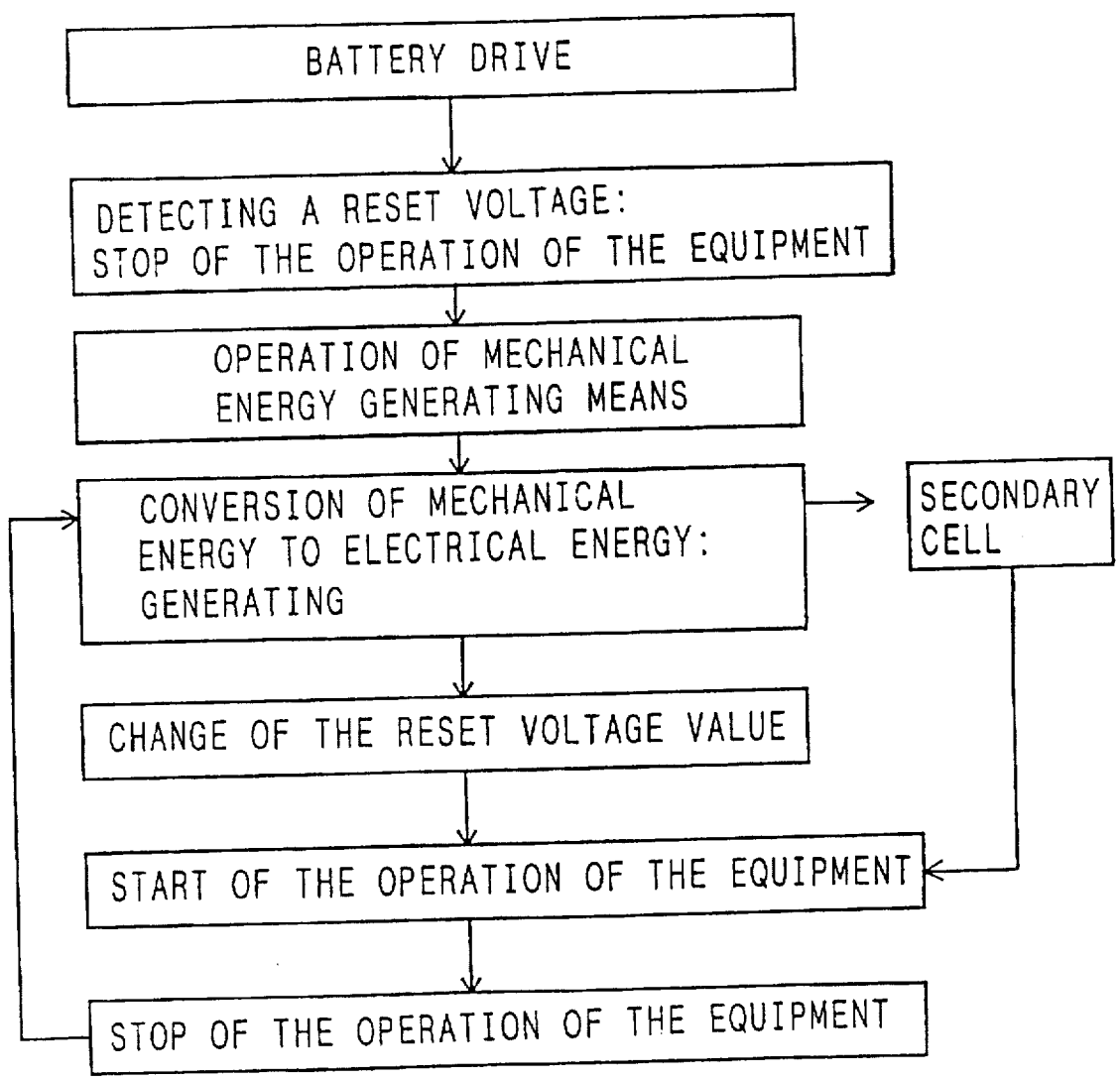
FIG. 77 is a flowchart showing the operation of the power unit and the electronic equipment comprising the same of the ninth embodiment of the present invention.

FIG. 77 is a flowchart showing the operation of the power unit and the electronic equipment comprising the same of the ninth embodiment of the present invention.

While the secondary cell has been explained so far in the present embodiment, it is apparent that the present invention is useful similarly even when it is adopted to a system using a non-chargeable cell (manganese cell, silver cell, mercury cell, coin cell, button cell, lithium cell, etc.) for emergency until such cell is replaced.

Because the present invention can convert spiral spring releasing energy into electricity efficiently by constructing it so as to have means for converting the releasing energy of the spiral spring into electricity as described above, it has the following effects:

1) it allows the equipment to be used on-site (very convenient in disaster);
2) it can charge immediately without requiring a charger;
3) it causes no safety problem;
4) it causes no disposal problem;
5) it costs less as compared to throwaway items such as a dry cell;
6) it may be used also as a multi-system power supply; and
7) it allows to obtain an equipment having an ideal discharge characteristic.

What is claimed is:

1. A power unit, comprising:
  an input mechanism for inputting kinetic energy as a rotary motion;
  a speed-regulating mechanism connected to the input mechanism for increasing the speed of the rotary motion;
  a converting mechanism connected to the speed-regulating mechanism for converting the rotary motion whose speed has been increased into electricity;
  a control circuit connected to the converting mechanism for controlling the generated electricity;
  a secondary cell connected to the control circuit; and
  a positive electrode output terminal and a ground electrode terminal connected to the control circuit;
  wherein a speed increasing factor in the speed-regulating mechanism is set at a value of from 50 to 100 times that of the input rotation;
  wherein the electricity generated by the converting mechanism is a direct current;
  wherein the control circuit comprises a series rectifier element having an anode terminal connected with an output of the converting mechanism and a cathode terminal connected with the positive electrode output terminal in series between the converting mechanism and the positive electrode output terminal, and a parallel rectifier element having a cathode terminal connected between the converting mechanism and the series rectifier element and an anode terminal connected to the ground electrode terminal; and
  wherein a positive electrode of the secondary cell is connected with the cathode terminal of the series rectifier element, and a negative electrode of the secondary cell is connected with the ground electrode terminal.

2. A power unit according to claim 1, wherein a reverse withstand voltage of the parallel rectifier element is 1.8±0.15 V.

3. A power unit according to claim 1; wherein at least one of the series rectifier element and the parallel element is composed of a MOS transistor.

4. A power unit according to claim 2; wherein at least one of the series rectifier element and the parallel element is composed of a MOS transistor.

5. A power unit according to claim 1; wherein the series rectifier element has a constant-voltage outputting mechanism comprising a reference voltage section, an error amplifying circuit, an output voltage feedback resistor, a MOS transistor having a floating transistor substrate, and a GND terminal.

6. An electronic apparatus comprising:
  a power unit according to claim 1;
  an electrical load connected to the positive electrode output terminal of the power unit; and
  a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

7. An electronic apparatus comprising:
  a power unit according to claim 5;

an electrical load connected to the positive electrode output terminal of the power unit; and a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

8. A power unit, comprising:

an input mechanism for inputting kinetic energy as a rotary motion;

a storing mechanism connected to the input mechanism for storing the kinetic energy as the rotary motion;

a first speed-regulating mechanism connected to the storing mechanism for increasing the speed of the rotary motion rotation released out of the storing mechanism;

a second speed-regulating mechanism connected to the first speed-regulating mechanism for braking the rotary motion to regulate the speed of the rotary motion;

a converting mechanism connected to the first speed-regulating mechanism for converting the rotary motion whose speed has been increased into electricity, the converting mechanism comprising an armature having opposite sides and a plurality of field magnetons magnetized into a plurality of poles for rotation and movement on the opposite sides of the armature, the armature comprising a semiconductor substrate, an insulating film disposed on the semiconductor substrate, and a plurality of wired layer coil elements disposed on the the insulating film;

a control circuit connected to the converting mechanism for controlling the generated electricity; and a positive electrode output terminal and a ground electrode terminal connected to the control circuit.

9. A power unit according to claim 8; wherein the control circuit electrically controls the first speed-regulating mechanism according to a voltage of the positive electrode output terminal.

10. A power unit according to claim 8; further comprising a secondary cell connected to the control means.

11. An electronic watch, comprising:

a power unit as set forth in claim 8;

an antenna;

a radio receiving circuit;

a time-indicating mechanism having hands for indicating time;

a detecting mechanism for detecting positions of the hands; and a correcting mechanism for correcting the positions of the hands according to a time signal from the radio receiving circuit after an electrical output is outputted from the positive electrode output terminal.

12. A power unit according to claim 8; further comprising a shaft mounted for rotation; and wherein the field magnetons have an inertia wheel mounted coaxially with the shaft for rotation therewith.

13. An electronic equipment comprising:

a power unit as set forth in claim 8; and an electrical load connected to the positive electrode output terminal.

14. An electronic equipment comprising:

a power unit as set forth in claim 8;

an electrical load connected to the positive electrode output terminal; and a time indicating mechanism for indicating time.

15. An electronic equipment according to claim 14; wherein the time-indicating mechanism comprises a time-indicating section; and wherein the input section inputs kinetic energy by rotating a peripheral portion of the time indicating section.

16. An electronic apparatus comprising:

a power unit according to claim 10;

an electrical load connected to the positive electrode output terminal of the power unit; and a first rectifier element in series with the converting mechanism and the electrical load, an anode terminal of the first rectifier element being output from a Vgen output terminal for simultaneously for monitoring a power voltage via a second rectifier element to stop the electronic apparatus when the power voltage becomes lower than a predetermined voltage, and changing a set value of a reset voltage corresponding to a voltage of the Vgen output terminal.

17. An electronic apparatus comprising:

a power unit according to claim 8;

a removable cell incorporated in the control circuit;

an electrical load connected to the positive electrode output terminal of the power unit; and a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

18. An electronic apparatus comprising:

a power unit according to claim 9;

a removable cell incorporated in the control circuit;

an electrical load connected to the positive electrode output terminal of the power unit; and a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

19. A power unit according to claim 8; wherein the storing mechanism comprises a spiral spring.

20. An electronic equipment comprising a power unit as set forth in claim 6; wherein the storing mechanism comprises a spiral spring.

21. A power unit, comprising:

an input mechanism for inputting kinetic energy as a rotary motion;

a storing mechanism connected to the input mechanism for storing the kinetic energy as the rotary motion;

a first speed-regulating mechanism connected to the storing mechanism for increasing the speed of the rotary motion released out of the storing mechanism;

a second speed-regulating mechanism connected to the first speed-regulating mechanism for changing a speed multiplying factor of the rotary motion;

a converting mechanism connected to the first steed-regulating mechanism for converting the rotary motion whose speed has been changed by the second speed-regulating mechanism into electricity;

a control circuit connected to the converting mechanism for controlling the generated electricity; and a positive electrode output terminal and a ground electrode terminal connected to the control circuit;

wherein the control circuit electrically controls the second speed-regulating mechanism according to a voltage of the positive electrode output terminal.

22. A power unit according to claim 21; further comprising a secondary cell connected to the control circuit.

23. An electronic watch, comprising:
a power unit as set forth in claim 21;
an antenna;
a radio receiving circuit;
a time-indicating mechanism having hands for indicating time;
a detecting mechanism for detecting positions of the hands; and
a correcting mechanism for correcting the positions of the hands according to a time signal from the radio receiving circuit after an electrical output is outputted from the positive electrode output terminal.

24. A power unit according to claim 21; further comprising a shaft mounted for rotation; and wherein the field magnetons have an inertia wheel mounted coaxially with the shaft for rotation therewith.

25. A power unit according to claim 22; wherein the control circuit has a switching circuit for switching a power output from the secondary cell to the positive electrode output terminal corresponding to a voltage of the positive electrode output terminal.

26. The power unit according to claim 21, wherein said control circuit controls said speed-changing mechanism or said speed-regulating mechanism by having a hysteresis in increasing/decreasing the speed and controls said hysteresis to be varied corresponding to a voltage of said secondary cell.

27. An electronic equipment comprising:
a power unit as set forth in claim 21; and an electrical load connected to the positive electrode output terminal.

28. An electronic equipment comprising:
a power unit as set forth in claim 21; an electrical load connected to the positive electrode output terminal; and
a time-indicating mechanism for indicating time.

29. An electronic equipment according to claim 28; wherein the time-indicating mechanism comprises a time-indicating section; and wherein the input section inputs kinetic energy by rotating a peripheral portion of the time indicating section.

30. An electronic apparatus comprising:
a power unit according to claim 22; an electrical load connected to the positive electrode output terminal of the power unit; and
a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

31. A power unit according to claim 21; wherein the storing mechanism comprises a spiral spring.

32. An electronic equipment comprising a power unit as set forth in claim 21; wherein the storing mechanism comprises a spiral spring.

33. A power unit, comprising:
an input mechanism for inputting kinetic energy as a rotary motion;
a storing mechanism connected to the input mechanism for storing the kinetic energy as the rotary motion;
a first speed-regulating mechanism connected to the storing mechanism for increasing the speed of the rotary motion released out of the storing mechanism;
a second speed-regulating mechanism connected to the first speed-regulating mechanism for changing the speed multiplying factor of the rotary motion;
a converting mechanism connected to the first speed-regulating mechanism for converting the rotary motion whose speed has been changed by the second speed-regulating mechanism into electricity, the converting mechanism comprising an armature having at least three coils connected in a Y connection, and a plurality of field magnetons magnetized upon application of a field current for rotation and movement against the armature;
a control circuit connected to the converting mechanism for controlling the generated electricity; and
a positive electrode output terminal and a ground electrode terminal connected to the control circuit;
wherein the control circuit controls the generated field current according to a voltage of the positive electrode output terminal.

34. A power unit according to claim 33; further comprising a secondary cell connected to the control circuit.

35. A power unit according to claim 33; wherein the converting mechanism controls the second speed-regulating mechanism in according to the generated field current.

36. A power unit according to claim 34; wherein the converting mechanism controls the second speed-regulating mechanism in according to the generated field current.

37. A power unit according to claim 33; wherein the control circuit electrically controls the second speed-regulating mechanism according to a voltage of the positive electrode output terminal.

38. A power unit according to claim 34; wherein the control circuit electrically controls the second speed-regulating mechanism according to a voltage of the positive electrode output terminal.

39. An electronic watch, comprising:
a power unit as set forth in claim 33;
an antenna;
a radio receiving circuit;
a time-indicating mechanism having hands for indicating time;
a detecting mechanism for detecting positions of the hands; and
a correcting mechanism for correcting the positions of the hands according to a time signal from the radio receiving circuit after an electrical output is outputted from the positive electrode output terminal.

40. A power unit according to claim 22; further comprising:
a light receiving section or a radio signal receiving section; and a light/radio-to-electricity transducing device for transducing light or radio signals into electricity;

wherein the control circuit controls the light/radio-to-electricity transducer to transduce light or radio signals into electricity and charges the electricity to the secondary cell.

41. A power unit according to claim 34; further comprising:

a light receiving section or a radio signal receiving section; and a light/radio-to-electricity transducing device for transducing light or radio signals into electricity;

wherein the control circuit controls the light/radio-to-electricity transducer to transduce light or radio signals into electricity and charges the electricity to the secondary cell.

42. A power unit according to claim 33; wherein the control circuit comprises a rectifying element comprised of a MOS transistor for rectifying the generated electricity.

43. A power unit according to claim 33; wherein the control circuit controls the field current by pulse width modulation.

44. A power unit according to claim 33; wherein the control circuit controls the field current by frequency modulation.

45. A power unit according to claim 35; wherein the field magnetons are disposed on a plane extending at an angle of 15° to 45° to the armature.

46. A power unit according to claim 36; wherein the field magnetons are disposed on a plane extending at an angle of 15° to 45° to the armature.

47. The power unit according to claim 35, wherein said speed-changing mechanism or said speed-regulating mechanism has a hysteresis in the speed increasing/decreasing operation.

48. The power unit according to claim 36, wherein said speed-changing mechanism or said speed-regulating mechanism has a hysteresis in the speed increasing/decreasing operation.

49. A power unit according to claim 33; further comprising a shaft mounted for rotation; and wherein the field magnetons have an inertia wheel mounted coaxially with the shaft for rotation therewith.

50. A power unit according to claim 34; wherein the control circuit has a switching circuit for switching a power output from the secondary cell to the positive electrode output terminal corresponding to a voltage of the positive electrode output terminal.

51. A power unit according to claim 35; further comprising a secondary cell connected to the control circuit; and wherein the control circuit has a switching circuit for switching a power output from the secondary cell to the positive electrode output terminal corresponding to a voltage of the positive electrode output terminal.

52. A power unit according to claim 36; wherein the control circuit has a switching circuit for switching a power output from the secondary cell to the positive electrode output terminal corresponding to a voltage of the positive electrode output terminal.

53. A power unit according to claim 40; wherein the control circuit has a switching circuit for switching a power output from the secondary cell to the positive electrode output terminal corresponding to a voltage of the positive electrode output terminal.

54. A power unit according to claim 41; wherein the control circuit has a switching circuit for switching a power output from the secondary cell to the positive electrode output terminal corresponding to a voltage of the positive electrode output terminal.

55. The power unit according to claim 33, wherein said control circuit controls said speed-changing mechanism or said speed-regulating mechanism by having a hysteresis in increasing/decreasing the speed and controls said hysteresis to be varied corresponding to a voltage of said secondary cell.

56. The power unit according to claim 35, wherein said control circuit controls said speed-changing mechanism or said speed-regulating mechanism by having a hysteresis in increasing/decreasing the speed and controls said hysteresis to be varied corresponding to a voltage of said secondary cell.

57. The power unit according to claim 36, wherein said control circuit controls said speed-changing mechanism or said speed-regulating mechanism by having a hysteresis in increasing/decreasing the speed and controls said hysteresis to be varied corresponding to a voltage of said secondary cell.

58. The power unit according to claim 40, wherein said control circuit controls said speed-changing mechanism or said speed-regulating mechanism by having a hysteresis in increasing/decreasing the speed and controls said hysteresis to be varied corresponding to a voltage of said secondary cell.

59. The power unit according to claim 41, wherein said control circuit controls said speed-changing mechanism or said speed-regulating mechanism by having a hysteresis in increasing/decreasing the speed and controls said hysteresis to be varied corresponding to a voltage of said secondary cell.

60. An electronic equipment comprising:

a power unit as set forth in claim 33; and an electrical load connected to the positive electrode output terminal.

61. An electronic equipment comprising:

a power unit as set forth in claim 33; an electrical load connected to the positive electrode output terminal; and a time-indicating mechanism for indicating time.

62. An electronic equipment according to claim 61; wherein the time-indicating mechanism comprises a time-indicating section; and wherein the input section inputs kinetic energy by rotating a peripheral portion of the time indicating section.

63. An electronic apparatus comprising:

a power unit according to claim 34;

an electrical load connected to the positive electrode output terminal of the power unit; and a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

64. An electronic apparatus comprising:

a power unit according to claim 33;

a removable cell incorporated in the control circuit;

an electrical load connected to the positive electrode output terminal of the power unit; and a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

65. An electronic apparatus comprising:
a power unit according to claim 35;
a removable cell incorporated in the control circuit;
an electrical load connected to the positive electrode output terminal of the power unit; and
a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

66. An electronic apparatus comprising:
a power unit according to claim 36;
a removable cell incorporated in the control circuit;
an electrical load connected to the positive electrode output terminal of the power unit; and
a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

67. An electronic apparatus comprising:
a power unit according to claim 37;
a removable cell incorporated in the control circuit;
an electrical load connected to the positive electrode output terminal of the power unit; and
a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

68. An electronic apparatus comprising:
a power unit according to claim 38;
a removable cell incorporated in the control circuit;
an electrical load connected to the positive electrode output terminal of the power unit; and
a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

69. A power unit according to claim 33; wherein the storing mechanism comprises a spiral spring.

70. An electronic equipment comprising a power unit as set forth in claim 33; wherein the storing mechanism comprises a spiral spring.

71. A power unit, comprising:
an input mechanism for inputting kinetic energy as a rotary motion;
a storing mechanism connected to the input mechanism for storing the kinetic energy as the rotary motion;
a first speed-regulating mechanism connected to the storing mechanism for increasing the speed of the rotary motion released out of the storing mechanism;
a second speed-regulating mechanism connected to the first speed-regulating mechanism for braking the rotary motion to regulate the speed of the rotary motion;
a converting mechanism connected to the first speed-regulating mechanism for converting the rotary motion whose speed has been increased by the first speed-regulating mechanism into electricity, the converting mechanism having an armature comprised of at least three coils connected in a Y connection, and a plurality of field magnetons magnetized upon application of a field current for rotation and movement against the armature;
a control circuit connected to the converting mechanism for controlling the generated electricity; and
a positive electrode output terminal and a ground electrode terminal connected to the control circuit;
wherein the control circuit controls the generated field current according to a voltage of the positive electrode output terminal.

72. A power unit according to claim 71; further comprising a secondary cell connected to the control circuit.

73. A power unit according to claim 71; wherein the converting mechanism controls the second speed-regulating mechanism according to the generated field current.

74. A power unit according to claim 72; wherein the converting mechanism controls the second speed-regulating mechanism according to the generated field current.

75. A power unit according to claim 71; wherein the control circuit electrically controls the second speed-regulating mechanism according to a voltage of the positive electrode output terminal.

76. A power unit according to claim 72; wherein the control circuit electrically controls the second speed-regulating mechanism according to a voltage of the positive electrode output terminal.

77. An electronic watch, comprising:
a power unit as set forth in claim 71;
an antenna;
a radio receiving circuit;
a time-indicating mechanism having hands for indicating time;
a detecting mechanism for detecting positions of the hands; and
a correcting mechanism for correcting the positions of the hands according to a time signal from the radio receiving circuit after an electrical output is outputted from the positive electrode output terminal.

78. A power unit according to claim 10; further comprising:
a light receiving section or a radio signal receiving section; and
a light/radio-to-electricity transducing device for transducing light or radio signals into electricity;
wherein the control circuit controls the light/radio-to-electricity transducer to transduce light or radio signals into electricity and charges the electricity to the secondary cell.

79. A power unit according to claim 72; further comprising:
- a light receiving section or a radio signal receiving section; and
- a light/radio-to-electricity transducing device for transducing light or radio signals into electricity;
- wherein the control circuit controls the light/radio-to-electricity transducer to transduce light or radio signals into electricity and charges the electricity to the secondary cell.

80. A power unit according to claim 71; wherein the control circuit comprises a rectifying element comprised of a MOS transistor for rectifying the generated electricity.

81. A power unit according to claim 71; wherein the control circuit controls the field current by pulse width modulation.

82. A power unit according to claim 71; wherein the control circuit controls the field current by frequency modulation.

83. A power unit according to claim 73; wherein the field magnetons are disposed on a plane extending at an angle of 15° to 45° to the armature.

84. A power unit according to claim 74; wherein the field magnetons are disposed on a plane extending at an angle of 15° to 45° to the armature.

85. The power unit according to claim 73, wherein said speed-changing mechanism or said speed-regulating mechanism has a hysteresis in the speed increasing/decreasing operation.

86. The power unit according to claim 74, wherein said speed-changing mechanism or said speed-regulating mechanism has a hysteresis in the speed increasing/decreasing operation.

87. A power unit according to claim 71; further comprising a shaft mounted for rotation; and wherein the field magnetons have an inertia wheel mounted coaxially with the shaft for rotation therewith.

88. A power unit according to claim 72; wherein the control circuit has a switching circuit for switching a power output from the secondary cell to the positive electrode output terminal corresponding to a voltage of the positive electrode output terminal.

89. A power unit according to claim 78; wherein the control circuit has a switching circuit for switching a power output from the secondary cell to the positive electrode output terminal corresponding to a voltage of the positive electrode output terminal.

90. A power unit according to claim 79; wherein the control circuit has a switching circuit for switching a power output from the secondary cell to the positive electrode output terminal corresponding to a voltage of the positive electrode output terminal.

91. The power unit according to claim 72, wherein said control circuit controls said speed-changing mechanism or said speed-regulating mechanism by having a hysteresis in increasing/decreasing the speed and controls said hysteresis to be varied corresponding to a voltage of said secondary cell.

92. The power unit according to claim 78, wherein said control circuit controls said speed-changing mechanism or said speed-regulating mechanism by having a hysteresis in increasing/decreasing the speed and controls said hysteresis to be varied corresponding to a voltage of said secondary cell.

93. The power unit according to claim 79, wherein said control circuit controls said speed-changing mechanism or said speed-regulating mechanism by having a hysteresis in increasing/decreasing the speed and controls said hysteresis to be varied corresponding to a voltage of said secondary cell.

94. An electronic equipment comprising:
- a power unit as set forth in claim 71; and an electrical load connected to the positive electrode output terminal.

95. An electronic equipment comprising: a power unit as set forth in claim 71; an electrical load connected to the positive electrode output terminal; and a time-indicating mechanism for indicating time.

96. An electronic equipment according to claim 95; wherein the time-indicating mechanism comprises a time-indicating section; and wherein the input section inputs kinetic energy by rotating a peripheral portion of the time-indicating section.

97. An electronic apparatus comprising:
- a power unit according to claim 72;
- an electrical load connected to the positive electrode output terminal of the power unit; and
- a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

98. An electronic apparatus comprising:
- a power unit according to claim 71;
- a removable cell incorporated in the control circuit;
- an electrical load connected to the positive electrode output terminal of the power unit; and
- a first rectifier element in series with the converting mechanism and the electrical load, an anode terminal of the first rectifier element being output from a Vgen output terminal for simultaneously monitoring a power voltage via a second rectifier element to stop the electronic apparatus when the power voltage becomes lower than a predetermined voltage, and changing a set value of a reset voltage corresponding to a voltage of the Vgen output terminal.

99. A power unit according to claim 71; wherein the storing mechanism comprises a spiral spring.

100. An electronic equipment comprising a power unit as set forth in claim 71; wherein the storing mechanism comprises a spiral spring.

101. A power unit, comprising:
- an input mechanism for inputting kinetic energy as a rotary motion;
- a speed-regulating mechanism connected to the input mechanism for regulating the speed of the rotary motion;
- a converting mechanism connected to the speed-regulating mechanism for converting the rotary motion whose speed has been regulated into electricity, the converting mechanism having a charged electrode for applying charges, a take-out electrode for taking out the charges, and a dielectric rotor disposed between the charged electrode and the take-out electrode, the dielectric rotor being rotated with the rotary motion whose speed has been regulated to convert the rotary motion into electricity;
- a control circuit connected to the converting mechanism for controlling the generated electricity; and a positive electrode output terminal and a ground electrode terminal connected to the control circuit.

102. A power unit, comprising:

a water storing mechanism for storing potential energy;

a water amount regulating mechanism for regulating an amount of water to be discharged from the water storing mechanism;

a first converting mechanism for converting the flow of the water discharged from the water storing mechanism into a rotary motion;

a second converting mechanism connected to the first converting mechanism for converting the rotary motion into electricity, the second converting mechanism having an armature comprised of at least three coils connected in a Y connection, and a plurality of field magnetons magnetized upon application of a field current for rotation and movement against the armature;

a control circuit connected to the second converting mechanism for controlling the generated electricity;

a DC/AC inverter connected to the control circuit for converting the generated electricity into an AC current having a constant frequency; and a plurality of AC output terminals having at least two poles connected to the DC/AC inverter;

wherein the control circuit controls the field current according to a voltage of the AC output terminals; and wherein either the control circuit electrically controls the water amount regulating mechanism according to the voltage of the AC output terminals or the second converting mechanism controls the water amount regulating mechanism according to the field current.

103. A power unit, comprising:

an input mechanism for inputting kinetic energy as a rotary motion;

a first speed-regulating mechanism connected to the input mechanism for increasing the speed of the rotary motion;

a second speed-regulating mechanism connected to first speed-regulating mechanism for changing a speed multiplying factor of the rotary motion;

a converting mechanism connected to first speed-regulating mechanism for converting the rotary motion whose speed has been changed into electricity;

a control circuit, connected to the converting mechanism for controlling the generated electricity;

a DC/AC inverter connected to the control circuit for converting the generated electricity into AC current having a constant frequency;

a secondary cell connected to the control circuit; and a plurality of AC output terminals having at least two poles connected to the DC/AC inverter;

wherein the converting mechanism has an armature comprised of at least three coils connected in a Y connection, and a plurality of field magnetons magnetized upon application of a field current for rotation and movement against the armature; and wherein either the control circuit electrically controls the water amount regulating mechanism according to the voltage of the AC output terminals or the converting mechanism controls the water amount regulating mechanism according to the field current.

* * * * *